United States Patent [19]

Martz et al.

[11] 4,028,884

[45] June 14, 1977

[54] CONTROL APPARATUS FOR CONTROLLING THE OPERATION OF A GAS TURBINE INLET GUIDE VANE ASSEMBLY AND HEAT RECOVERY STEAM GENERATOR FOR A STEAM TURBINE EMPLOYED IN A COMBINED CYCLE ELECTRIC POWER GENERATING PLANT

[75] Inventors: Lyle F. Martz, Verona; Jack R. Smith, Pittsburgh; Francis A. Lebonette, Swarthmore; Robert A. Putnam, Elverson; Paul A. Berman, Plymouth Meeting, all of Pa.

[73] Assignee: Westinghouse Electric Corporation, Pittsburgh, Pa.

[22] Filed: Dec. 27, 1974

[21] Appl. No.: 537,036

[52] U.S. Cl. .......................................... 60/39.18 B
[51] Int. Cl.² ........................................ F02C 7/02
[58] Field of Search .............. 60/39.18 B, 666, 676; 122/7 B, 7 R; 415/47, 48

[56] References Cited

UNITED STATES PATENTS

| | | | |
|---|---|---|---|
| 2,653,447 | 9/1953 | Heller | 60/39.18 B |
| 2,854,211 | 9/1958 | Bendersky | 415/160 |
| 2,946,187 | 7/1960 | Zoschak | 60/39.18 |
| 3,097,486 | 7/1963 | Roe | 60/39.18 |
| 3,356,288 | 12/1967 | Corsmeier | 415/160 |
| 3,367,565 | 2/1968 | Urban | 415/48 |
| 3,807,364 | 1/1974 | Schwartz | 122/7 R |
| 3,841,270 | 10/1974 | Sokolowski | 122/7 R |

Primary Examiner—Carlton R. Croyle
Assistant Examiner—L. J. Casaregola
Attorney, Agent, or Firm—E. F. Possessky

[57] ABSTRACT

A combined cycle electric power generating plant includes gas and steam turbines and a heat recovery steam generator recovering the heat in the exhaust gases exited from the gas turbine and for using the recovered heat to produce and supply steam to the steam turbine. The gas turbine includes a plurality of variably set guide vanes whose position may be set to determine the inlet flow to the gas turbine. Guide vane control apparatus is provided to limit the inlet guide vane position as a function of gas turbine compressor inlet temperature in accordance with a desired gas turbine exhaust flow, and to match the gas turbine exhaust flow to the steam requirements of the steam generator as in turn determined by the load placed upon its steam turbine. In addition, an afterburner is provided to supplementally heat the exhaust gas turbine gases before they are directed to the steam generator. During the startup, the afterburners are operated to supply supplemental heating to the gas turbine exhaust gases supplied to the steam generator whereby the temperature of the steam passed to the steam turbine is maintained at a minimum level. Further, the afterburners are fired to permit additional loading to be placed upon the steam turbine.

14 Claims, 30 Drawing Figures

FIG. I.

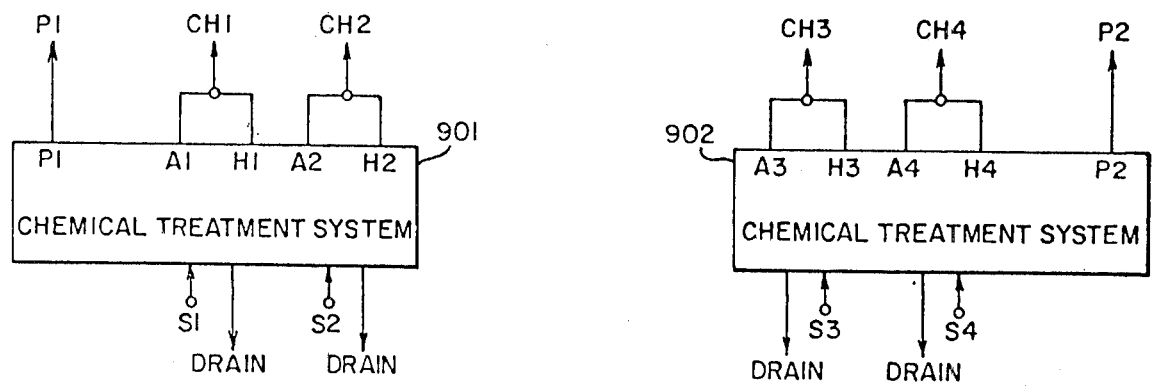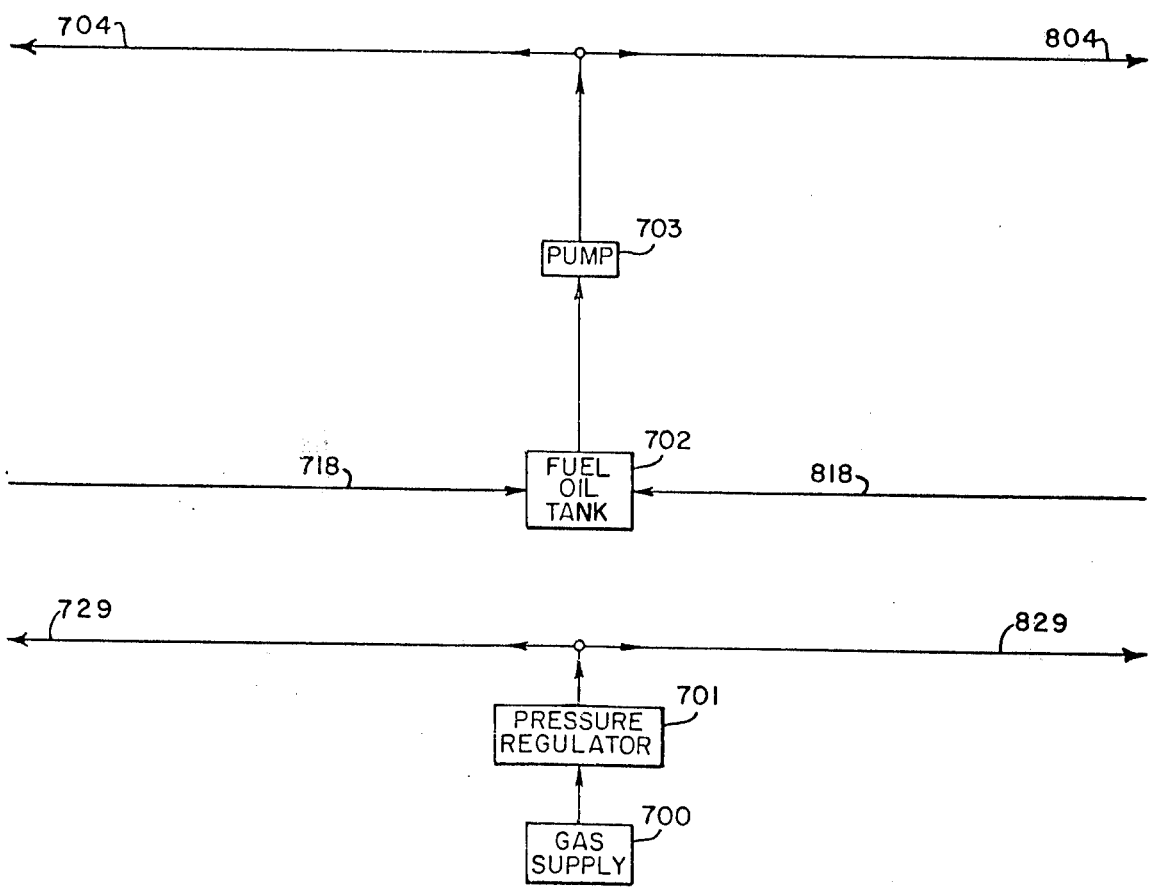
FIG.6E

CONTROL APPARATUS FOR CONTROLLING THE OPERATION OF A GAS TURBINE INLET GUIDE VANE ASSEMBLY AND HEAT RECOVERY STEAM GENERATOR FOR A STEAM TURBINE EMPLOYED IN A COMBINED CYCLE ELECTRIC POWER GENERATING PLANT

CROSS-REFERENCE TO RELATED APPLICATIONS

Reference is made to the following patent applications:

1. Ser. No. 399,790, filed on Sept. 21, 1973 by L.F. Martz, R.W. Kiscaden and R. Uram, entitled "An Improved Gas Turbine And Steam Turbine Combined Cycle Electric Power Generating Plan Having A Coordinated And Hybridized Control system And An Improved Factory Based Method For Making And Testing Combined Cycle And Other Power Plants And Control Systems Therefor", assigned to the present assignee and hereby incorporated by reference;

2. Ser. No. 319,115, filed by T. Giras and J. Ruether on Dec. 29, 1972 as a continuation of an earlier-field application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein;

3. Ser. No. 371,625 (now U.S. Pat. No. 3,911,285), filed on June 20, 1973 by R. Yannone and R.A. Shields, entitled "Gas Turbine Power Plant Control Apparatus Having A Multiple Backup Control System", and assigned to the present assignee, and related cases referred to therein;

4. Ser. No. 495,765, field on Aug. 8, 1974 by Lyle F. Martz and Richard J. Plotnick, entitled "Combined Cycle Electric Power Plant Having A Control System Which Enables Dry Steam Generator Operation During Gas Turbine Operation", assigned to the present assignee and hereby incorporated by reference;

5. Ser. No. 495,731, filed on Aug. 8, 1974 by J.R. Smith, entitled "Control Apparatus For Matching The Exhaust Flow Of A Gas Turbine Employed In A Combined Cycle Electric Power Generating Plant To The Requirements Of A Steam Generator Also Employed Therein", assigned to the present assignee and hereby incorporated by reference;

6. Ser. No. 323,593 (now U.S. Pat. No. 2,891,915), filed on Jan. 15, 1973 by R. Yannone and R.W. Kiscaden as a continuation of an earlier-field application Ser. No. 189,632, entitled "Improved Digital Computer Control System And Method For Monitoring And Controlling Operation Of Industrial Gas Turbine Apparatus To Drive Simultaneously An Electric Power Plant Generator And Provide Exhaust Gases To An Industrial Process", and assigned to the present assignee;

7. Ser. No. 495,736, filed Aug. 8, 1974 by Lyle F. Martz and Richard J. Plotnick, entitled "A Combined Cycle Electric Power Plant And A Heat Recovery Steam Generator Having Improved Temperature Control Of The Steam Generated", assigned to the present assignee and incorporated herein by reference;

8. Ser. No. 495,723, filed Aug. 8, 1974 by Lyle F. Martz and Richard J. Plotnick, entitled "A combined Cycle Electric Power Plant And A Heat Recovery Steam Generator Having Improved Temperature Control Of The Steam Generated", assigned to the present assignee and incorporated herein by reference;

9. Ser. No. 495,727, filed Aug. 8, 1974 by J.R. Smith and T.J. Reed, entitled "Control Apparatus For Modulating The Inlet Guide Vanes Of A Gas Turbine Employed In A Combined Cycle Electric Power Generating Plant As A Function Of Load Or Inlet Blade Path Temperature", assigned to the present assignee and incorporated herein by reference; and 10. Ser. No. 495,728, filed Aug. 8, 1974, by J.F. Barrett and R.W. Kiscaden, entitled "Synchronization System For A Combined Cycle Electric Power Plant", assigned to the present assignee and incorporated herein by reference.

BACKGROUND OF THE INVENTION

1. Field of the Invention

The present invention relates to a combined cycle electric power plant and more particularly to the coordinated control adapted for controlling the afterburners supplying additional heat to the gas turbine exhaust gases passing to the heat recovery steam generator and the inlet guide vane assembly for regulating the flow of air to the gas turbine and subsequently to the heat recovery steam generator.

2. State of the Prior Art

In the design of modern electric power plants, it is a significant object to achieve the greatest efficiency possible in the generation of electricity. To this end, steam generators are designed to extract heat efficiently from and to use the extracted heat to convert a fluid such as water into superheated steam at a relatively high pressure. Further, such steam generators have been incorporated into combined cycle electric power generating plants including both gas and steam turbines wherein the exhaust gases of the gas turbine are used to heat water into steam to be supplied to the steam turbine. Typically, steam generators include a water-heating or economizer tube, a high-pressure evaporator tube and finally a superheater tube, whereby water is gradually heated at increasing levels of pressure superheated steam from the superheated tube to the steam turbine. A condenser is associated with the steam turbine to receive the spent steam therefrom and for converting it into water condensate to be fed back to the steam generator.

In a combined cycle electric power plant, the steam turbine is combined with a gas turbine whereby the heated exhaust gases of the gas turbine, otherwise lost to the atmosphere, are used to heat the circulated fluid and to convert it into steam to drive the steam turbine. In this manner, a significant reduction in the fuel required to heat the steam is achieved and the heat contained in the gas turbine exhaust gases is effectively utilized. Further, an afterburner associated with the exhaust exit of the gas turbine serves to additionally heat the gas turbine exhaust gases, whereby the heat required to generate sufficient steam to meet steam turbine load requirements is provided. In particular under conditions of relatively high loads wherein the heat of the gas turbine exhaust gases is insufficient to supply the steam requirements, the afterburner is turned on to further heat the gas turbine exhaust gases.

In a combined cycle power plant as envisioned herein, it is a requirement that the associated gas turbine, steam generator and steam turbine be properly matched in order to optimize overall plant efficiency and prevent down time. With respect to such a requirement, one item that calls for special attention is the control of gas turbine exhaust flow. Generally, the gas turbine compressor operates at constant speed and compresses essentially a constant air volume. This produced a variable gas turbine exhaust flow, which varies as a function of changes in inlet conditions, e.g. pressure and temperature. Over the normal operating range, changes in the ambient pressure cause in one illustrative configuration a maximum of approximately 7% change in gas turbine exhaust gas flow, while changes in the inlet temperature from −40° to +120° F cause an approximate 30% change in gas turbine exhaust flow.

The quantity of and the temperature of the steam delivered by the steam generator to the steam turbine are determined by the exhaust flow from the gas turbine and the amount of afterburner firing. For a constant gas turbine exhaust flow and temperature, increasing afterburner firing rate will increase both the steam flow and temperature. For a constant afterburner firing rate, increasing the gas turbine exhaust flow will increase the steam flow and decrease the steam temperature.

As the gas turbine inlet temperature decreases, the gas turbine exhaust flow increases. If the steam temperature is to be held constant, the afterburner firing rate must be increased with the resulting increase in steam flow. If the afterburner firing rate is not increased, the steam flow will increase and the steam temperature will decrease. The steam turbine is designed for a certain steam flow at a specified pressure and temperature. Since, in an illustrative embodiment of this invention, the steam turbine is designed to operate in the turbine following mode (control valves open), the steam pressure must be increased in order to increase steam flow. However, reducing steam temperature results in moisture problems in the steam turbine.

Further, it is desirable to achieve maximized efficiencies or high heat rates in the operation of such combined cycle electric generating power plants. Ordinarily, gas turbines are operated at base load because of poor heat rates at reduced load. However, in the combined cycle plant or in the case of larger gas turbines, reduced load operation of the gas turbine is often a necessity since the full generating capability of the plant or turbine is not always required. Consequently, modulating the inlet guide vanes of the gas turbine at reduced loads is undertaken in order to improve heat rate and increase the gas turbine exhaust gas temperature, which increase is then utilized to supplement the afterburner and steam generator functions.

The modulation of the inlet guide vanes of a gas turbine for differing purposes is known. For example, in the aforementioned application Ser. No. 323,593, the inlet guide vanes are positionally controlled to hold gas turbine exhaust temperature at a constant value over its operating range in order to simultaneously generate power and drive an external, unrelated process. In particular, such operation is achieved as a function of a temperature control loop and the combustor sheel pressure. In U.S. Pat. No. 3,623,326, issued to C. Greune on Nov. 30, 1971, inlet guide vane modulation is utilized to maintain a constant, high exhaust gas temperature, both during acceleration and in steady-state performance of a gas turbine driven vehicle. In particular, such control is effected as a function of throttle position. Reference may also be had to commonly-assigned and co-pending application Ser. No. 319,114 and the related cases cited therein for a further example of inlet guide vane regulation as a function of speed.

None of these prior art arrangements is particularly suitable for use in a combined cycle generating plant. Neither are any of the known alternative schemes, as is perhaps exemplified by U.S. Pat. No. 3,097,486, issued to R. Roe on July 16, 1963. In the Roe patent, the entire exhaust of the gas turbine is delivered to a steam furnace for utilization therein as a function of speed or air flow control means which sense the plant power demands. Thus, as load demand on the system varies and the compressor output is regulated by speed or air flow control means, the rate of flow through the furnace is regulated such that the higher the loading, the higher the exhaust temperature of the turbine and, conversely, the lower the loading, the cooler the exhaust temperature.

In order to improve heat rates and increase the overall plant efficiency, it is necessary at lower gas turbine loading to utilize exhaust temperature as a supplemental heating source for steam generation. While the Roe patent comes closest to this, it and the other known prior art arrangements are not directed to achieving the desired result.

Also of interest is U.S. Pat. No. 2,946,187, issued on July 26, 1960 to R. Zorschak et al. While no particular inlet guide vane positioning control is disclosed therein, this patent does allude to the fact that there is a need in combined cycle power plants to respond to temperature changes at the gas turbine inlet in order to promote and improve overall plant efficiency. No particularized solution is presented herein or in any of the other noted prior art arrangements.

In the operation of a steam generator or a heat recovery steam generator as incorporated in the combined cycle electric power plant, it is particularly desirable to control within a minimum range the temperature of the superheated steam as supplied to the steam turbine, whereby the power generating efficiency of the electrical power plant is maintained at a relatively high level. In steam heaters of the prior art, there has been suggested that control of the superheated steam may be maintained by bypassing a portion of the steam derived from a steam drum of the steam generator, through a separate conduit about the superheater tube, whereby the relatively cold bypassed steam and the relatively hot superheated steam are recombined in selected proportions to achieve the desired temperature. For example, U.S. Pat. No. 1,779,706, such a steam generator is suggested whereby primary and secondary superheater tubes are provided with a bypass conduit disposed about the primary superheater. The temperature of the steam passing from the steam generator output is measured and applied to a controller whereby the flow through the bypass conduit is controlled. The noted U.S. Pat. No. 1,779,706 does not, however, disclose that such control may be incorporated into or adapted to solve the particular problems of a combined cycle electric power plant.

Further, there is known in the prior art to spray or otherwise inject condensate water as derived from the condenser associated with the steam turbine into the fluid part of the steam generator. For example, the condensate water as driven by the main feed pump may be sprayed into the steam generator at a point intermediate between a primary superheater tube and a secondary superheater tube. Thus, a valve may be selectively opened and closed to introduce the condensate water into the steam generator, whereby the temperature of the superheated steam may be correspondingly varied. In particular, the temperature of the superheated steam as derived from the steam generator and supplied to the steam turbine is measured and this variable is used to control the position of the condensate water inlet valve.

In the prior art systems where it is attempted to achieve superheated steam temperature control by solely bypassing a portion of the fluid about a heat exchange tube of the steam generator or to inject feedwater at an intermediate portion thereof, it has been found that such temperature control is relatively unstable and that wide ranges of superheated steam temperature result for a given load demand. For example, for a steady-state load demand, prior art superheated steam temperature controls are typically capable of achieving superheated steam temperatures that vary over a range of approximately 1%, whereby a corresponding deviation in the megawatt output will occur. Similarly, where the load demand signal is varying, the prior art superheater steam temperature controls are capable of maintaining regulation to only 2% with a corresponding drop in the power output.

The description of prior art herein is made on good faith, and no representation is made that any prior art considered is the best pertaining prior art or that the interpretation placed on it is unrebuttable.

SUMMARY OF THE INVENTION

A combined cycle electric power plant includes a gas turbine, a steam turbine, means for generating electric power under the driving power of the turbines, steam generating means for receiving the exhaust gases of the gas turbine and for using heat therein for converting a transfer fluid such as water into steam to be supplied to the steam turbine, and an afterburner disposed to supplementally heat the exhaust gases derived from the gas turbine to be directed to the steam generating means. Further, the gas turbine includes a variable inlet guide vane assembly and an actuating mechanism therefor, and inlet guide vane control apparatus for modulating the position of the vanes. Coordinated control is provided for the combined cycle plant whereby the temperature and flow of the turbine exhaust gases is controlled to meet the requirements placed upon the temperature of the steam generated by the steam generating means. Further, afterburner control is provided for maintaining gas turbine exhaust gases at a minimum temperature whereby a minimum temperature of steam is assured, and further is responsive to a load or gas temperature set point, whereby the afterburner fuel valve is opened and closed to provide supplemental heat to the transfer fluid to convert it to steam whereby the load place upon the steam turbine is met.

Further, the inlet guide vane control apparatus is provided with means for automatically controlling the position of the inlet guide vanes wherein two function generators, each characterized by a predetermined gas turbine parameter, to generate an inlet guide vane positioning control signal. During the AUTOMATIC mode of operation, the higher of the two control signals is selected for utilization. Further provision allows this apparatus to control guide vane positioning with respect to a third turbine parameter until such time as a predetermined loading or speed value is reached.

BRIEF DESCRIPTION OF THE DRAWINGS

These and other objects and advantages of the present invention will become more apparent by referring to the following detailed description and accompanying drawings in which:

FIGS. 6A to 6F show schematically in detail the fluid interconnections between the gas turbines, the steam turbine and the steam generators as generally shown in FIG. 1;

DESCRIPTION OF THE PREFERRED EMBODIMENT

A. General Plant Description

Figure 1:
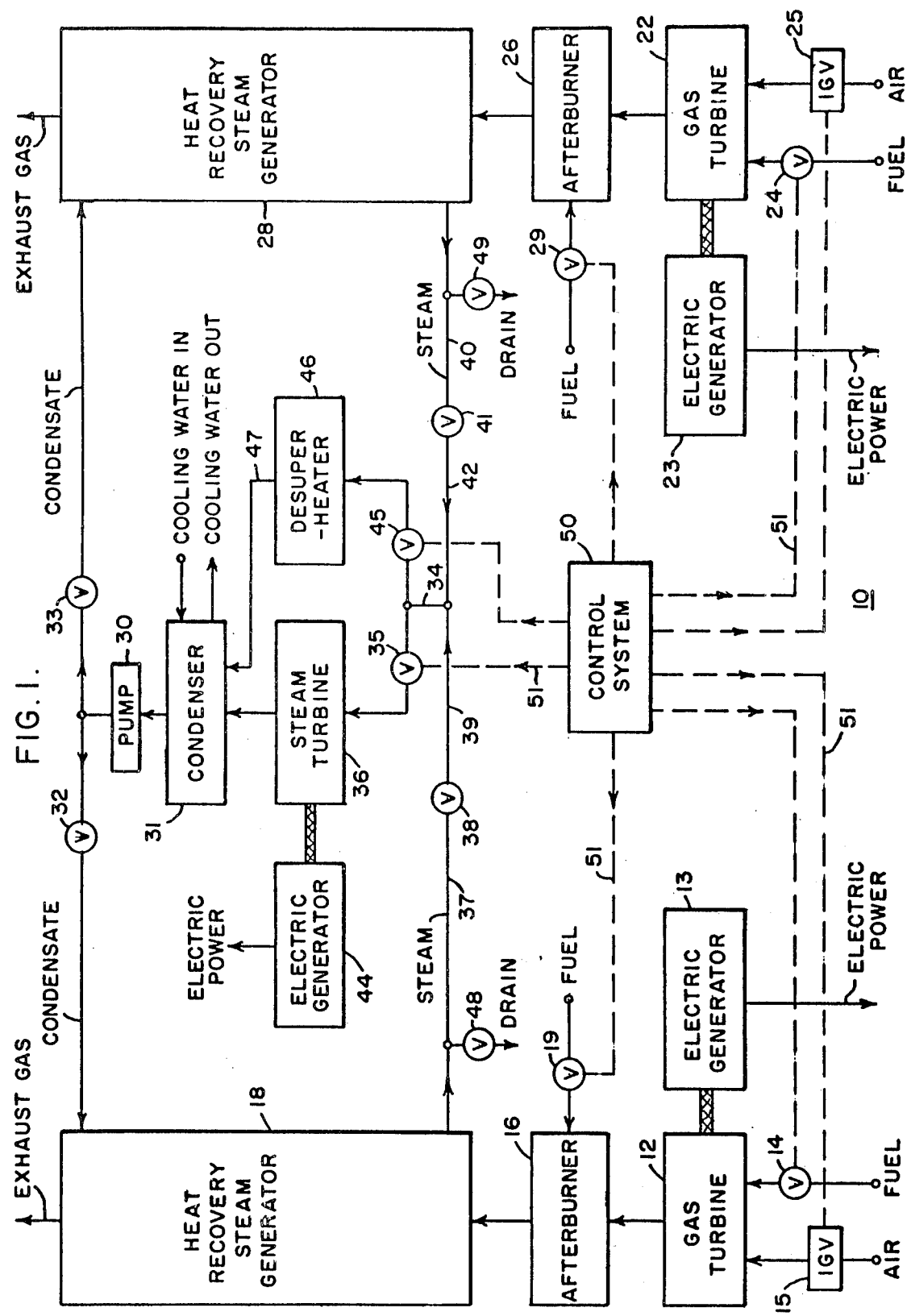
FIG. 1 shows a schematic view of a combined cycle electric power plant in which there is employed a heat recovery steam generator in accordance with the principles of this invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat receory steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condenstate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generatos 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam tubine 36 is passed to the condenser 31 wherein it is condensed or converted back into condenstate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. the control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in ay one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 magawatts. In such plant, each of the gas tubines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

Figure 2:
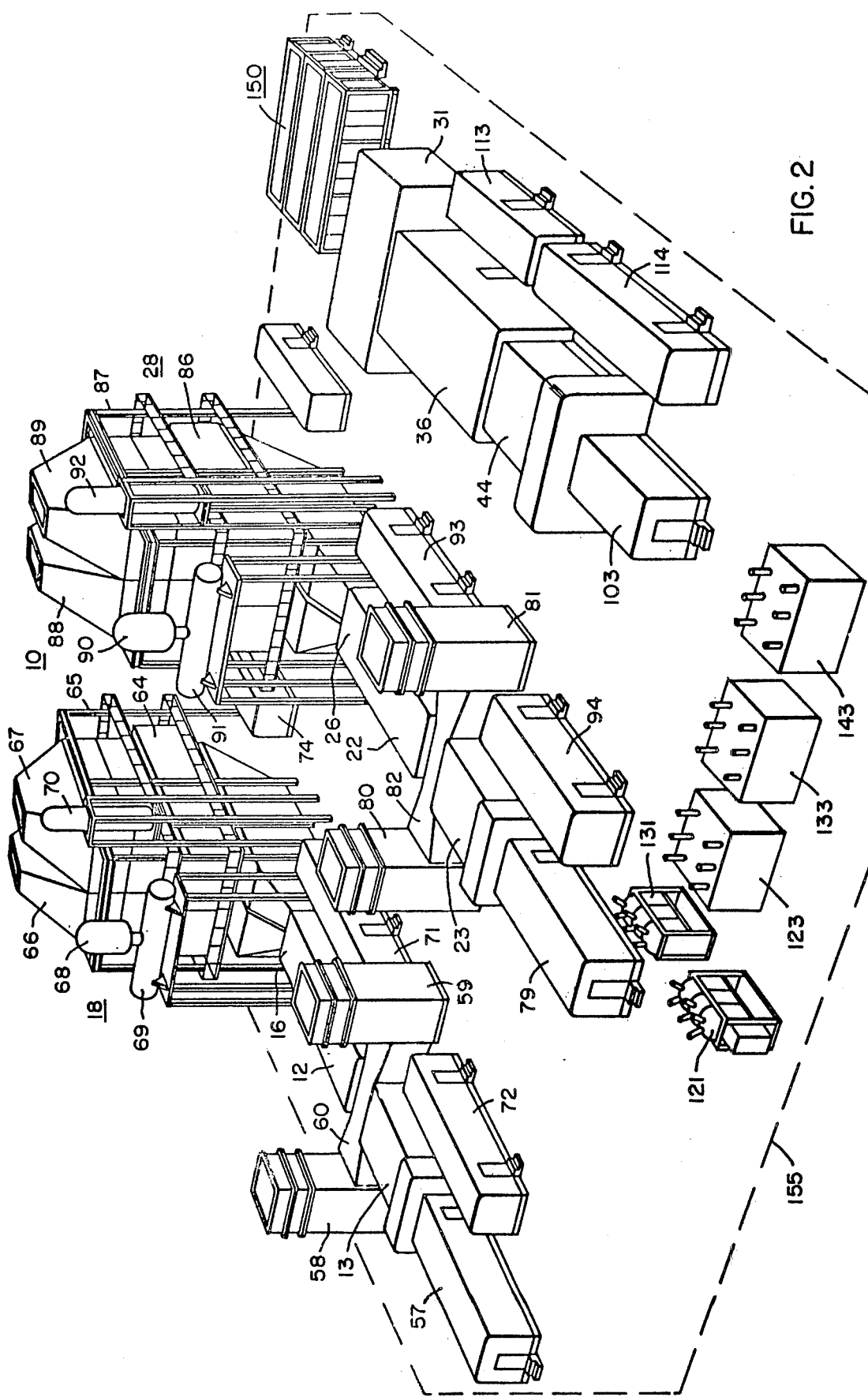
FIGS. 2 and 3 are, respectively, a perspective and top plan view of the arrangement of the combined cycle electric power plant as shown in FIG. 1.
Figure 3:
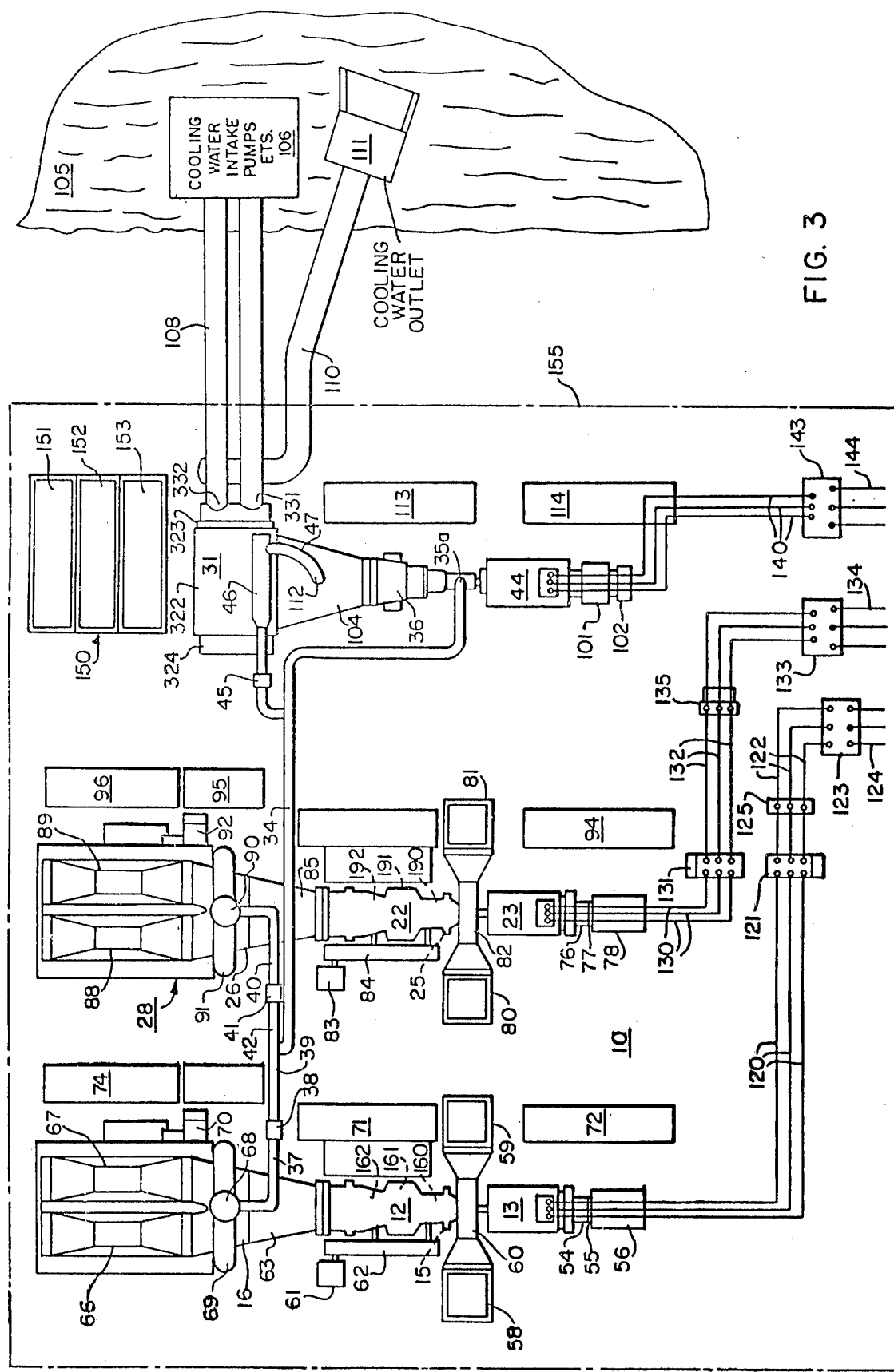

Referring now to FIGS. 2 and 3, there is shown the physical layout and overall structural nature of the apparatus included in the combined cycle electric power generating plant 10. FIG. 2 is a perspective view of the plant 10 and FIG. 3 is a plan view of the plant 10. FIG. 3 is somewhat more detailed and shows some additional structures not shown in FIG. 2. Thus, in the following description, reference will more frequently be had to FIG. 3.

As indicated in FIG. 3, the electric generator 13 is located in line with the gas turbine 12, the rotary shaft of the generator 13 being connected in tandem with the rotary shaft of the gas turbine 12. Also connected in tandem with the generator 13 on the end opposite turbine 12 is an exciter unit 54, a disengaging coupler or clutch mechanism 55 and an electric starting motor 56. Units 54–56 are located inside the enclosure 57 shown in FIG. 2. In the present embodiment, the electric generator 13 is of the three-phase alternating-current hydrogen-cooled type and is capable of generating better than 80 megawatts of electrical power at a voltage of 13.8 kilovolts. The rated speed of generator 13 is 3,600 rpm.

The physical structure associated with the gas turbine 12 includes a pair of vertically extending air intake ducts 58 and 59 which are open at the top and which communicate at their lower ends with a horizontal air intake duct 60. The duct 60, in turn, communicates with the air intake end of the compressor section of the gas turbine 12. In geographical locations having high ambient temperatures, evaporative coolers (not shown) are located in the vertical air intake ducts 58 and 59. The inlet guide vane mechanism 15 is located in the opening at the inlet end of the compressor section of the gas turbine 12. An air-to-air heat exchanger or air cooler 61 is located alongside of the gas turbine 12 and serves to cool some air which is extracted from an intermediate stage of the gas turbine compressor and then returned to the turbine section for purposes of cooling some of the turbine blades. Air cooler 61 is coupled to the gas turbine 12 by way of cooling pipes located in an enclosure 62.

The exhaust ene of the gas turbine 12 is connected by way of duct work 63 to the afterburner unit 16 which is, in turn, coupled to the intake or inlet opening of the No. 1 heat recovery steam generator 18. The steam generator 18 includes a stack structure 64 (FIG. 2) having a heavy outer steel causing, such stack structure 64 being tied to and supported by a structural steel framework 65 (FIG. 2). Located at the top of the stack structure 64 are a pair of exhaust sections 66 and 67 which serve to exhaust into the atmosphere the hot gas supplied to the steam generator 18 by the gas turbine 12. The steam generator 18 further includes a deaerator unit 68, a low pressure feedwater storage tank 69 and a vertical high pressure steam drum 70. The overall height of the steam generator 18 is approximately 52 feet or some 5 stories.

Located alongside of the gas turbine 12, the electric generator 13 and the steam generator 18 are a number of auxiliary equipment enclosures 71, 72, 73 and 74. For simplicity of illustration, enclosure 73 is not shown in FIG. 2. Enclosure 71 is a gas turbine mechanical auxiliary equipment enclosure which houses, among other things the fuel valves, fuel pumps, pressure regulators and the like for the fuel system which supplies the fuel to the gas turbine 12, the lube oil and seal oil equipment for the gas turbine 12 and various control system components such as actuators, control relays, sensors, signal transmitters and the like used in connection with the foregoing mentioned and other mechanisms associated with the gas turbine 12.

Enclosure 72 is a gas turbine and generator auxiliary equipment enclosure which, among other things, houses a motor control center for the gas turbine 12 and generator 13, a bank of storge batteries for providing emergency auxiliary power, a battery charger system for the storage batteries, hydrogen cooling equipment for the generator 13, lube and seal oil equipment for the generator 13 and various control system components such as actuators, control relays, sensors, signal transmitters and the like used in connection with the foregoing mentioned and other mechanisms associated with the gas turbine 12 and generator 13.

Enclosure 73 (FIG. 3) is an afterburner auxiliary equipment enclosure which, among other things, houses the fuel valves for the afterburner 16. Enclosure 74 is a steam generator auxiliary equipment enclosure which, among other things, houses a main boiler feed pump, a standby boiler feed pump, a chemical treatment system including storage tanks and pumps for phosphate, hydrazine and amine, a motor control center and various motors, valves and heater controls associated with the steam generator 18 and various control system components such as actuators, control relays, sensors, signal transmitters and the like used in connection with the foregoing mechanisms and other mchanisms associated with the steam generator 18.

The second electric generator 23 is located in line with the second gas turbine 22, the rotary shaft of the generator 23 being connected in tandem with the rotary shaft of the gas turbine 22. Connected in tandem with the generator 23 at the opposite end thereof is an exciter unit 76, a disengaging coupler or clutch mechanism 77 and an electric starting motor 78. Units 76–78 are located in the enclosure 79 shown in FIG. 2. Electric generator 23 is of the three-phase alternating-current hydrogen-cooled type and is capable of generating in excess of 80 megawatts of electrical power at a voltage of 13.8 kilovolts. The rated speed of generator 23 is 3,609 rpm.

The structure associated with the second gas turbine 22 includes a pair of vertical air intake ducts 80 and 81 which are open at the top and which communicates at the bottom with a horizontal air intake duct 82. Duct 82, in turn, communicates with the intake opening of the compressor section of the gas turbine 22. Air cooler 83 and cooling pipes in enclosure 84 serve to cool some air which is extracted from the compressor section of gas turbine 22 and is used to cool some of the blades in the turbine section of the gas turbine 22. The exhaust end of gas turbine 22 is coupled by way of a duct work 85 and the No. 2 afterburner unit 26 to the inlet opening of the No. 2 heat recovery steam generator 28.

The second steam generator 28 is of the same construction as the first steam generator 18 and, as such, includes a stack structure 86 (FIG. 2) having a heavy outer steel casing which is tied to and supported by a structural steel framework 87 (FIG. 2). Located at the top of the stack structure 86 are a pair of exhaust sections 88 and 89 which are open at the top. Steam generator 28 further includes deaerator unit 90, a low pressure feedwater storage tank 91 and a vertical high pressure steam drum 92.

Located alongside of the gas turbine 22, electric generator 23 and steam generator 28 are a gas turbine mechanical auxiliary equipment enclosure 93, a gas turbine and generator auxiliary equipment enclosure 94, an afterburner auxiliary equipment enclosure 95 (not shown in FIG. 2) and a steam generator auxiliary equipment enclosure 96. These auxiliary equipment enclosures 93–96 include the same kinds of equipment as is included in the auxiliary equipment enclosures 71–74, respectively. The equipment, mechanisms and components housed in enclosures 93–96 are used in connection with the operation of gas turbine 22, electric generator 23, afterburner 26 and steam generator 28 in the same manner that the corresponding auxiliary equipment in enclosures 71–74 is used in connection with the operation of gas tubine 12, electric generator 13, afterburner 16 and steam generator 18.

Considering now the steam turbine 36 and its associated electric generator 44, these units are, as indicated in FIG. 3, located in line with one another, the rotary shaft of the generator 44 being connected in tandem with the rotary shaft of the steam turbine 36. Coupled in tandem at the opposite end of the generator 44 is an exciter unit 101 and a turning gear 102. Units 101 and 102 are located in the enclosures 103 shown in FIG. 2. Electric generator 44 is of the three-phase alternating-current hydrogen-cooled type and is capable of generating in excess of 100 megawatts of electrical power at a voltage of 13.8 kilovolts. The rated speed of generator 44 is 3,600 rpm.

Steam tubine 36 receives superheated steam from the two steam generators 18 and 28 by way of steam pipes 34, 37, 39, 40 and 42. The exhaust end of the steam turbine 36 is connected by way of duct work 104 to the steam inlet of the condenser 31. The resulting condensed steam or condensate is collected in a hotwell (not shown) located below the condenser 31, from when it is pumped back to the steam generators 18 and 28 by way of condensate piping which, for sake of clarity, is not shown in FIGS. 2 and 3.

Cooling water or circulating water for the condenser 31 is obtained from a nearby body of water 105, such as a river or lake, at which is located a water intake station 106. Water intake station 106 includes appropriate circulating water pumps, cooling water pumps, traveling screens, trash racks, strainers, and the like for obtaining the water needed by the condenser 31 as well as the water needed by an auxiliary cooling water system to be described hereinafter. The water intake station 106 pumps circulating water by way of pipes 107 and 108 to the condenser 31 which, as will be seen, is of the divided water box type. Incoming water flowing by way of pipe 108 passes through one set of condenser tubes in the condenser 31 and is returned by way of a discharge pipe 110 and a water outlet station 111 to the body of water 105. Water flowing to the condenser 31 by way of the pipe 107 passes through a second set of condenser tubes in the condenser 31 and is returned to the body of water 105 by way of the discharge pipe 110 and the water outlet station 111. Where the body of water 105 is a river, the outlet station 111 is located on the downstream side of the intake station 106.

As is seen in FIG. 3, the desuperheater 46 in the steam bypass path is located above the condenser 31, the discharge end of the desuperheater 46 being connected by way of pipe 47 to a bypass inlet 112 in the duct work 104.

Located alongside of the steam turbine 36 is a steam turbine mechanical auxiliary equipment enclosure 113 which, among other things, houses a hydraulic system for the steam turbine valves, a lube oil system for the steam turbine 36 including a lube oil cooler and controller, a gland steam condenser, air ejector apparatus for the condenser 31 and various control system components such as actuators, control relays, sensors, signal transmitters and the like used in connection with the steam turbine 36 and the condenser 31. Located alongside of the electric generator 44 is a steam turbine and generator auxiliary equipment enclosure 114 which, among other things, houses a motor control center for the steam turbine 36 and generator 44, a bank of storage batteries for providing emergency auxiliary power, a battery charging system for the storage batteries, hydrogen cooling equipment for the generator 44, seal oil equipment for the steam turbine 36 and generator 44 and various control system components such as actuators, control relays, sensors, signal transmitters and the like used in connection with the foregoing mentioned and other mechanisms associated with the steam turbine 36, generator 44 and condenser 31.

Three-phase alternating-current electrical power is taken from the armature windings of the three-phase alternating-current generator 13 by means of power conductors 120 which run to oil-type circuit breakers 121. The output sides of circuit breakers 121 are connected by power conductors 122 to the primary windings of a three-phase main power transformer 123. The secondary windings of the main power transformer 123 are connected by means of power conductors 124 to an adjacent high-voltage transmission substation (not shown) of the electric utility system which receives the electricity generated by the electric power generating plant 10. An auxiliary transformer 125 is connected to the power conductors 122 and is used to tap off some of the electrical power produced by the generator 13 for use in operating the various electrical equipment and apparatus included in the plant 10.

Three-phase alternating-current power is taken from the armature windings of the second three-phase alternating-current generator 23 by means of power conductors 130 which run to oil-type circuit breakers 131. The output sides of circuit breakers 131 are connected by power conductors 132 to the primary windings of a second three-phase main power transformer 133. The secondary windings of the main power transformer 133 are connected by means of power conductors 134 to the adjacent high-voltage transmission substation (not shown) of the electric utility system which receives the power generated by the combined cycle plant 10. An auxiliary transformer 135 is connected to the power conductors 132 and is used to tap off some of the electrical power produced by the generator 23 for use in energizing the various electrical equipment and apparatus included in the plant 10.

Three-phase alternating-current power is taken from the armature windings of the third three-phase alernating-current generator 44 by means of power conductors 140 which run to the primary windings of a third three-phase main power transformer 143. The secondary windings of the main power transformer 143 are connected by means of power conductors 144 to the adjacent high-voltage transmission substation of the electric utility system which receives the power from the plant 10.

The adjacent high-voltage transmission substation (not shown) which is connected to the secondary windings of the three main power transformers 123, 133 and 143 via conductors 124, 134 and 144 is, in turn, connected to the electric power transmission system which is used to carry the electrical power generated by the plant 10 to the various industrial, commercial and residential customers of the electric utility system. By way of example only, the magnitude of the voltage generated by each of the generators 13, 23, and 44 may have a value of, for example, 13.8 kilovolts and the magnitude of the voltage appearing across the secondary windings of each of the main power transformers 123, 133 and 143 may have a value of, for example, 230 kilovolts.

B. Gas Turbine Mechanical Structure

Figure 4A:
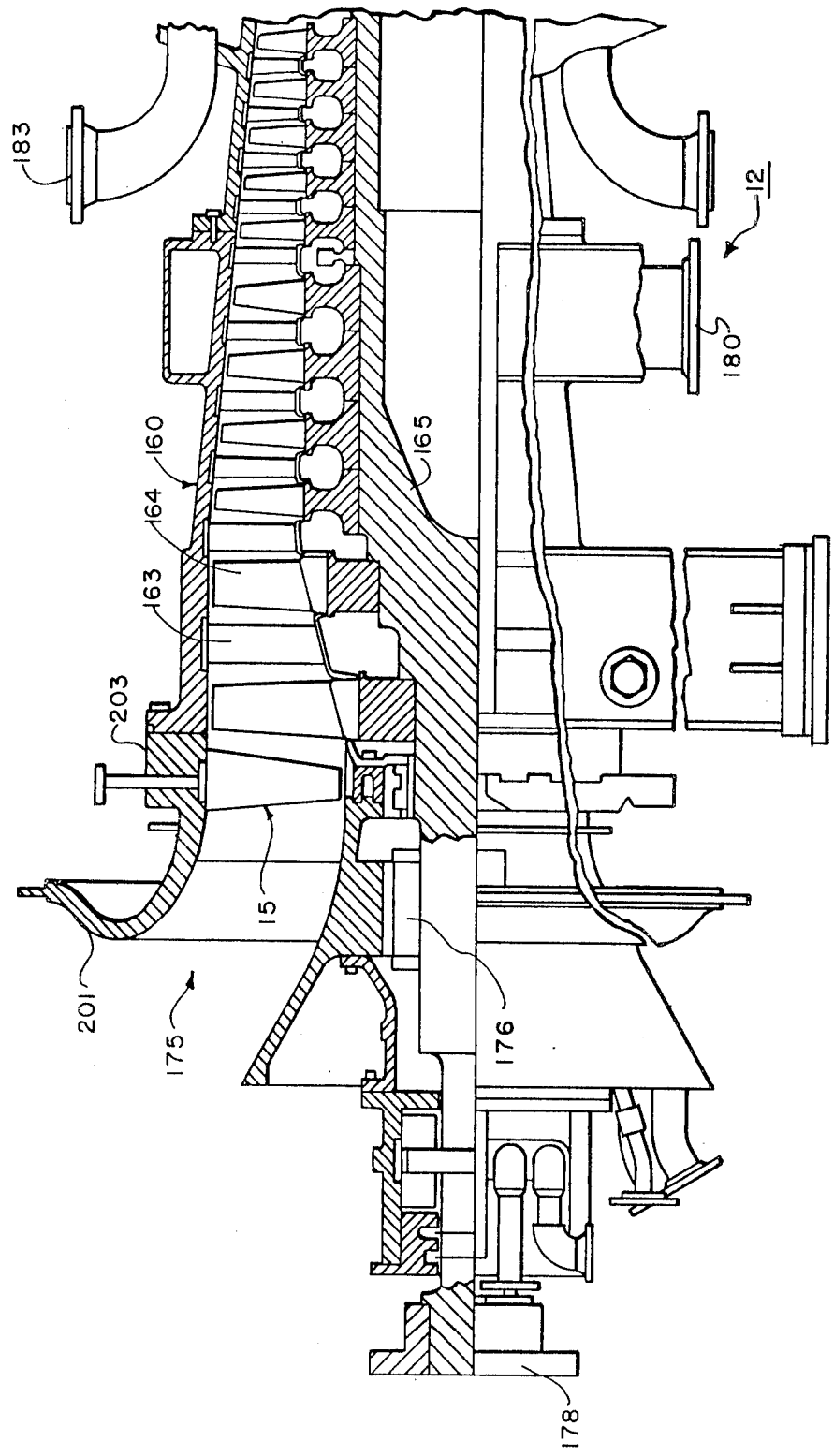
FIGS. 4A and 4B are partially-sectioned showings of a side view of a gas turbine included within the power plant shown in FIG. 2.
Figure 4B:
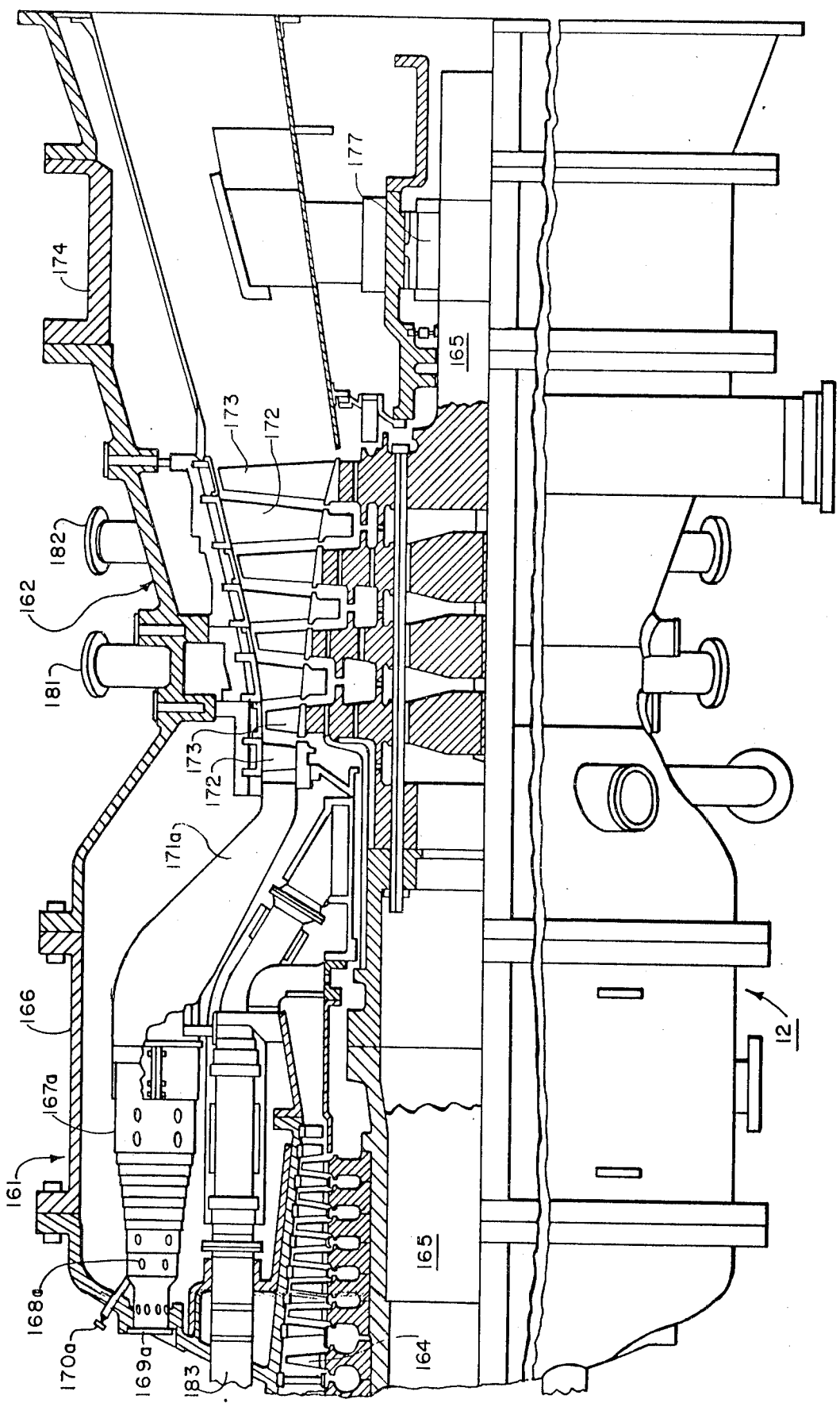

Referring now to FIGS. 4A and 4B, there is shown a longitudinal, partially cross-sectional, elevational view of the No. 1 gas turbine 12. FIG. 4A shows the left-hand half of the view and FIG. 4B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high-pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of fuel nozzle 169a, a spark plug 170a serving to provide for the initial ignition of the fuel. This fuel is burned in the combustor 167a and the resulting high-temperature, high-presssure gas is supplied by way of a combustor outlet duct 171a to the inlet of the turbine section 162.

The turbine section 162 is a four stage turbine having interspersed sets of stationary blades 172 and rotary blades 173, the latter bein located on the rotor structure 165. The high-temperature high-pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct 63 for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency. This guide vane mechanism 15 is described in greater detail in connection with FIGS. 5 and 6.

The two bearings which support the single rotor structure 165 of the gas turbine 12 are indicated at 176 and 177. As seen, these bearings 176 and 177 are located outside of any high-pressure high-temperature zone. The electric generator 13 is coupled to the cold or compressor end 178 of the rotor structure 165 to avoid potential misalignment problems. Some air is removed from the compressor 160 by way of outlet 180, externally cooled and filtered by the air cooler 61 (FIG. 3) and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

As mentioned, the No. 2 gas turbine 22 is of the same construction as the No. 1 gas turbine 12. As such, the No. 2 gas turbine 22 includes a compressor section 190, a combustion section 191 and a turbine section 192, the locations of which are indicated in FIG. 3. These sections 190, 191 and 192 are identical in construction to the corresponding sections 160, 161 and 162 of the first gas turbine 12, the latter being shown in detail in FIGS. 4A and 4B.

C. Heat Recovery Steam Generator Mechanical Structure

Referring now to FIG. 4, there is shown in greater detail the manner of construction of the first heat recovery steam generator 18. FIG. 4 is a partially broken away perspective view of the main body portion or stack structure 64 of the steam generator 18. As there seen, the stack structure 64 is split into two separte parallel structures 250 and 251, this being done to facilitate shop assembly and transportability to the plant site. A Y shaped diffuser duct 252 directs the hot gas from the afterburner 16 into the lower portions of each of the stack structures 250 and 251. Each of the stack structures 250 and 251 includes a turning vane module 253, a lower tube module 254, an upper tube module 255 and an exhaust transition section, the exhaust transition section for the stack structure 250 being item 66 and that for the stack structure 251 being item 67.

Located in each of the two turning vane modules 253 is a number of curved turning vanes 256 which serve to turn the hot gas flow upwardly through the remainder of the stack structure. Located inside each of the lower tube modules 254 are two separate sets or bundles of boiler tubes 260 and 261, the lower set 260 being a superheater section and the higher set 261 being a high-pressure evaporator section. The upper tube module 255 also includes two bundles or sets of boiler tubes 262 and 263, the lower set 262 being an economizer section and the upper set 263 being a low-pressure evaporator section. A typical one of the various headers for the tube sets is indicated at 264, this being the outlet header for the superheater section 260.

The tubes in all four sections 260–263 are of the serrated fin type wherein the fin is in the form of a slotted metal strip which is continuously welded to the tube. The tubes in the superheater and high-pressure evaporator sections 260 and 261 are approximately 2 inches in diameter, while the tubes in the economizer and low-pressure evaporator sections 262 and 263 are approximately 1.5 inches in diameter The tubes and tube fins in the high-pressure evaporator section 261, the economizer section 262 and the low-pressure evaporator section 263 are made of carbon steel, while the tubes and tube fins in the superheater section 260 are made of chromium stainless steel. All the tubes in each of the modules 254 and 255 are supported interlocking tube supports 265. These tube supports 265 are hung from carbon steel I-beams 266 located across the top of each of the modules 254 and 255. These I-beams 266 protrude through the module walls and are bolted to the structural steel framework 65 (FIG. 2) during plant erection.

The hot exhaust gas from the gas turbine 12 passes through the afterburner 16, is turned upwardly by the turning vanes 256 and passes through the various tube bundles 260–263. During this passage, the steam and water in the various tubes absorbs most of the heat from the turbine exhaust gas. The turbine exhaust gas is thereafter exhausted to the atmosphere by way of the exhaust transition sections 66 and 67. The temperature of the hot gas leaving the afterburner 16 and entering the steam generator 18 may, under peak load conditions, be as high as 1200° Fahrenheit, in which case, th temperature of the gas exhausted to the atmosphere by way of exhaust sections 66 and 67 will, under normal operating conditions, be on the order of approximately 340° Fahrenheit.

The exhaust openings at the tops of the transition sections 66 and 67 are provided with stack covers (not shown) having adjustable louvers which may be closed when the steam generator 18 is not in use. The diffuser duct 252 and the outer shell of each of the modules 253, 254 and 255 and the exhaust transition sections 66 and 67 are constructed of carbon steel and are internally lined with insulation material made of hydrous calcium silicate bonded with asbestos fibers. This insulation material is covered with metal lagging to prevent erosion.

A primary purpose of the turning vanes 256 is to provide a uniform distribution of gas flow through the tube bundles 260–263 and to dissipate hot spots in the gas steam caused by the afterburner 16. A further advantage is to produce an arrangement where the superheater tubes 260 absorb almost no heat by direct radiation. This latter feature enables superheater performance and tube metal temperatures to be more accurately controlled.

The construction of the steam generator 18 is such that it can be drained and vented without shutting down the gas turbine 12 and operated dry for extended periods of time with no adverse effect on the equipment. The steam generator 18, like other components in the combined cycle plant 10, is prepackaged and shipped to the plant site as factory assembled modules. In other words, each of the modules 253, 254 and 255, as ell as the diffuser duct 252 and the exhaust sections 66 and 67, are completely preassembled at the factory and are individually shipped by rail or the like to the plant erection site. These various modules and sections are then bolted or welded together at the plant site to provide the complete steam generator structure. This modular approach considerably reduces the overall cost of the steam generator and holds the field erection work to a minimum.

The second heat recovery steam generator 28 is of the same construction as shown in FIG. 4 for the first heat recovery steam generator 18.

D. Inlet Guide Vane Mechanical Structure

Figure 5:
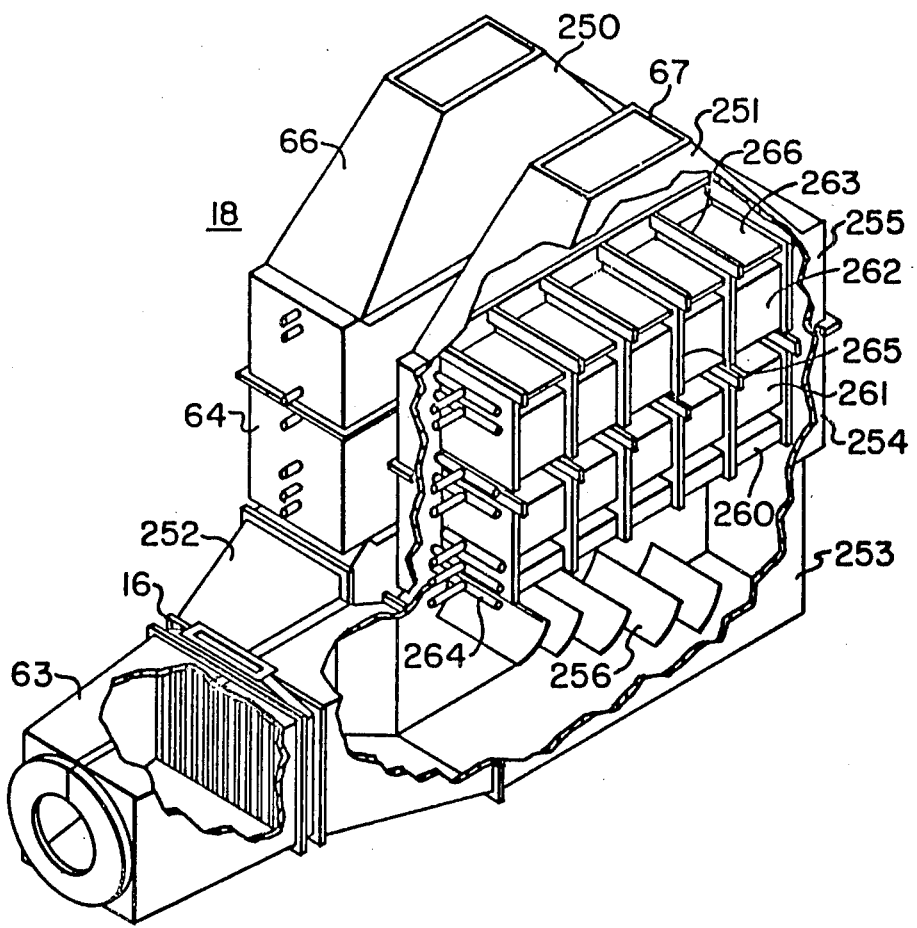
FIG. 5 shows a perspective view of a heat recovery steam generator as incorporated in the combined cycle electric power plant of FIG. 2.
Figure 7:
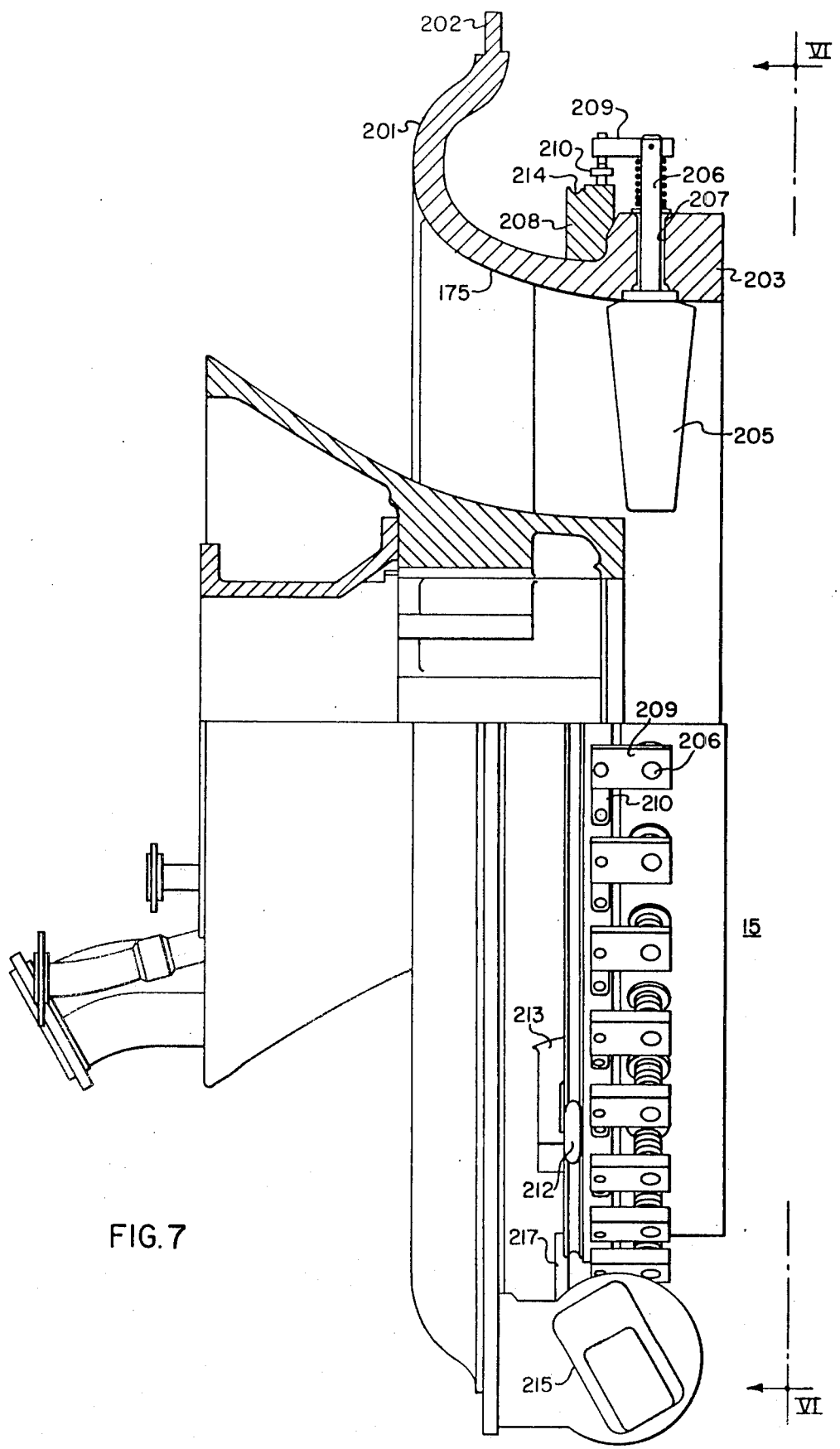
FIGS. 7 and 8 illustrate the details of the variable inlet gas vane mechanism associated with the gas turbine of FIGS. 4A and 4B.
Figure 8:
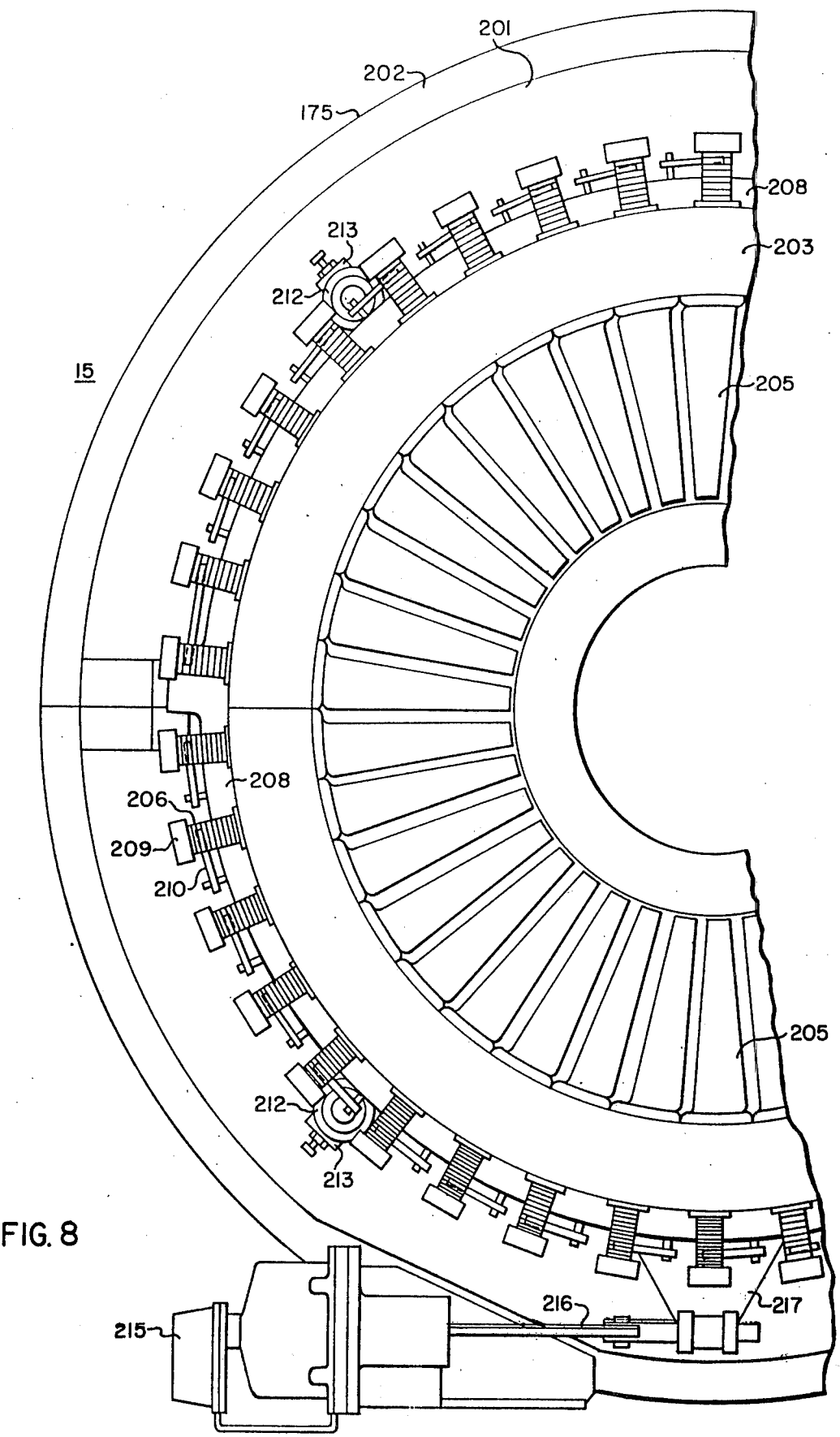

Referring now to FIGS. 7 and 8, there is shown in greater detail the manner of construction of the variable inlet guide vane mechanism 15 located at the air intake end of the gas turbine 12. FIG. 5 is a partially broken away side elevational view of the guide vane mechanism 15 taken in the same direction as the gas turbine view shown in FIGS. 4A and 4B. FIG. 8 is a partial rear elevational view of the guide vane mechanism 15, taken at right angles to the view of the FIG. 5 and from a point located downstream of the mechanism 15 and looking in a direction opposite to the direction of air flow.

As indicated in FIGS. 5 and 8, the gas turbine air intake structure 175 is of a circular ring-like shape having a curved lip portion 201 on the air inlet side thereof. A circular flange 202 is provided at the outer extremity of the curved lip portion 201, such flange 202 being used to fasten the air intake structure 175 to the outlet opening in the horizontal air intake duct 60 (FIG. 3). The intake structure 175 further includes a circular body portion 203 on the outlet side thereof which is adapted to be fastened to the main casing of the gas turbine 12.

The inlet guide vane mechansim 15 includes a set of 38 radially extending blades or vanes 205 which are evenly spaced around the inner periphery of the body portion 203 and which extend inwardly therefrom toward the longitudinal center axis of the gas turbine 12. Each of these vanes 205 is rotatably mounted in and supported by the body portion 203 by means of its own individual radially extending shaft 206 which is attached to the outer end of the vane and is journaled in a bearing passageway 207 formed in the body portion 203. Each of the 38 vane shafts 206 is coupled to a common movable ring 208 by means of links 209 and 210. One end of link 209 fits over the top of the shaft 206 and is pinned to the shaft 206 so that movement of the other end of the link 209 will cause rotation of the shaft 206 and, hence, rotation of the vane 205. This other end of link 209 is pivotally connected to one end of the second link 210, the other end of the second link 210 being pivotally connected to the movable ring 208.

The movable ring 208 encircles the intake structure 175 just ahead of the body portion 203 and is supported in place by rollers 212 having support brackets 213 which are attached to the outer side of the intake structure 175. Rollers 212 engage a groove 214 formed in the outer periphery of the movable ring 208. The construction and linkage is such that a rotational movement of the movable ring 208 around the longitudinal center axis of the gas turbine 12 will cause a simultaneous and in-step rotation of all 38 of the vanes 205 about their radial axes.

Rotational movement of the movable ring 208 is produced by an actuator mechanism 215 having a piston 216 (FIG. 6) which is coupled to a bracket 217 which is attached to and extends outwardly from the movable ring 208 at the lower extremity thereof.

The construction of the inlet guide vane mechanism 15 is such that the vanes 205 may be rotated through an angle of 40° relative to their radially extending axes. The maximum open position of the vanes 205, wherein the vanes 205 offer the least resistance to the flow of air through the intake structure 175, is denoted as the zero degree position. Conversely, the maximum closed position of the vanes 205, wherein the vanes 205 present the greatest resistance to the flow of air through the intake structure 175, is denoted as the 40° position. The dimensions and shape of the vanes 205, as well as the limit on the amount of rotation of the vanes 205, is such that the air flow passage through the intake structure 175 can never be completely closed. In particular, with the vanes 205 in the maximum closed position, there will still be enough air flow through the intake structure 175 to keep the gas turbine 12 operating. As previously indicated, the purpose of the variable inlet guide vane mechanism 15 is to adjust compressor air flow during the starting cycle and to increase part load efficiency of the gas turbine 12.

The inlet guide vane mechanism 25 associated with the second gas turbine 22 is of the same construction as shown in FIGS. 7 and 8 for the inlet guide vane mechanism 15 associated with the first gas turbine 12.

E. Detailed Plant Description

FIGS. 6A–6F constitute a detailed flow or piping and instrumentation diagram for the combined cycle electric power generating plant 10 of FIG. 3. As such, FIGS. 6A–6F show in greater detail the various valves, pumps, measurement devices and other items associated with the heat recovery steam generators 18 and 28, the condenser 31 and the steam turbine 36, as well as the various fluid pipes and lines which interconnect these units and their associated items. FIGS. 6A–6F also show in considerable detail the piping, valves, pumps and so forth for the fuel systems for the gas turbines 12 and 22 and the afterburners 16 and 26. At times herein, the compostie figure formed by FIGS. 6A–6F will simply be referred to as FIG. 6.

The same reference numerals used in the earlier figures will be used in FIGS. 6A–6F for elements previously described in these earlier figures. In some cases, an item previously described as a single element will be described in FIGS. 6A–6F as two or more identical elements performing the same function, usually in parallel with one another. In such cases, the same reference numeral will be used but with suffix letters $a$, $b$, $c$, etc. added thereto to distinguish the different ones of the identical multiple elements. For example, there is shown in FIG. 1 a single condensate pump 30 whereas, in FIG. 6B, there is shown a pair of condenste pumps 30$a$ and 30$b$. During normal operation, the two pumps 30$a$ and 30$b$ are equivalent to the single pump 30.

Figure 6A:
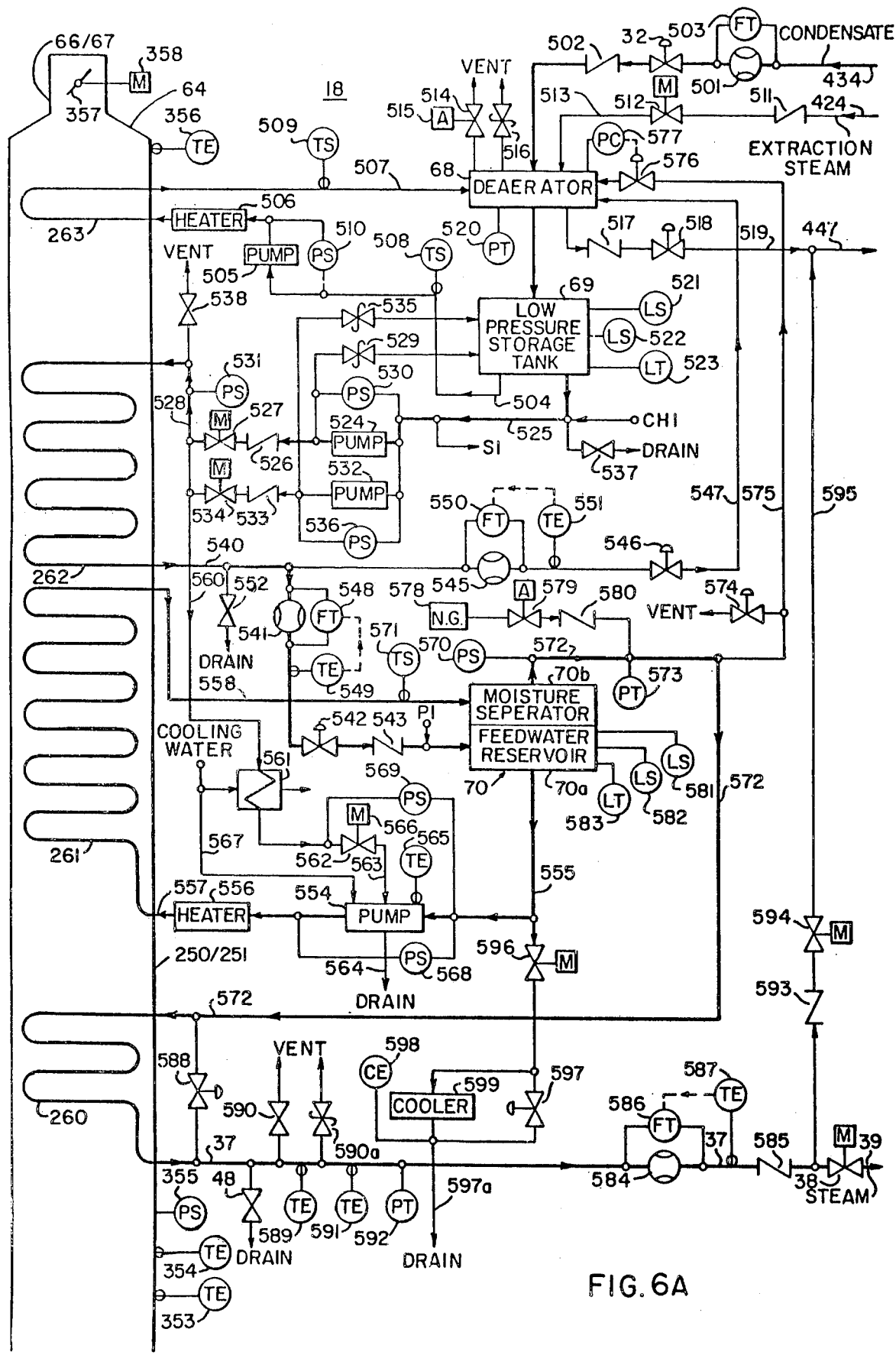
Figure 6B:
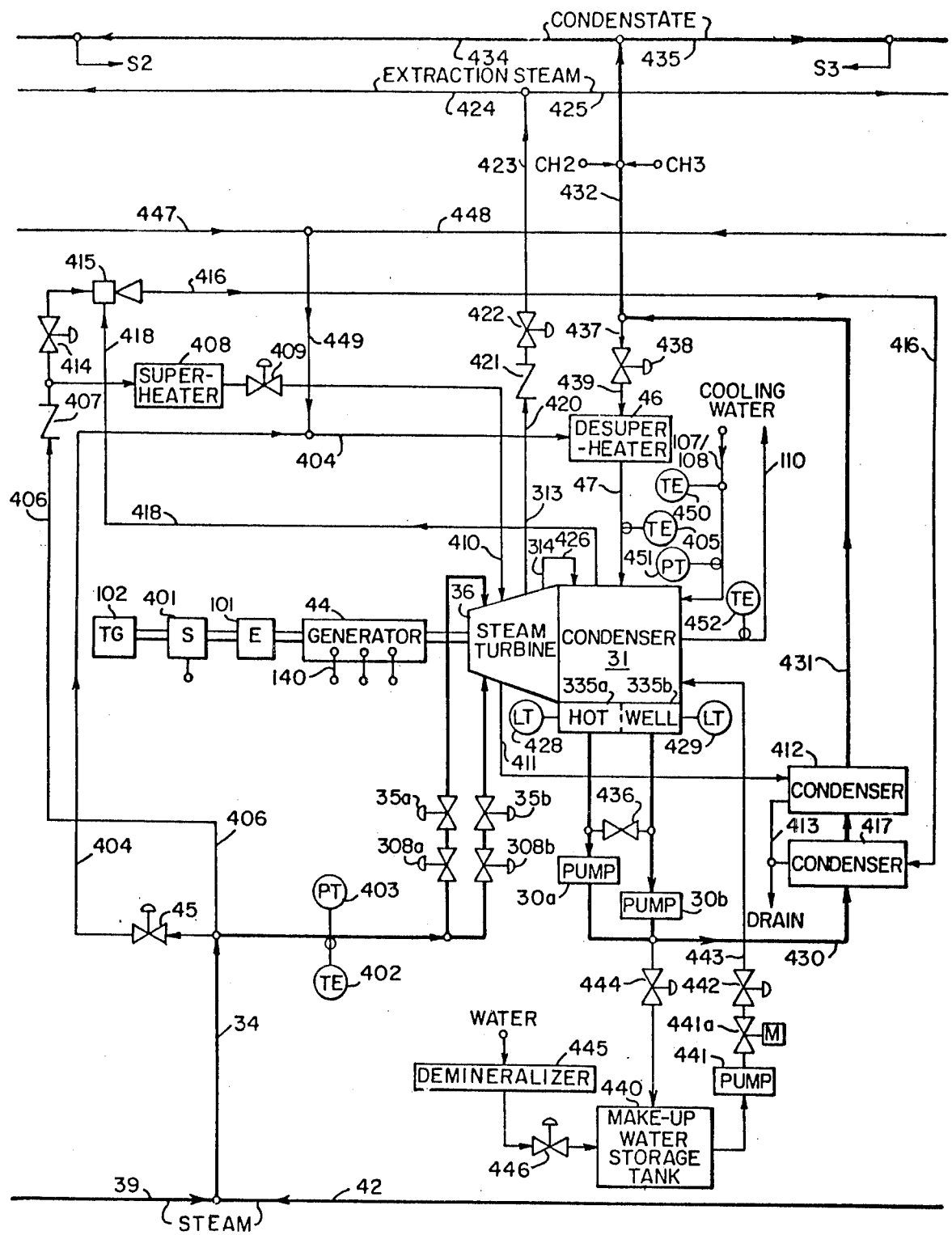

In other instances, items shown as multiple elements in earlier figures will, for simplicity of illustration, be shown as single elements in FIGS. 6A–6F. For example, the stack structure 64 of the first steam generator 18 is shown as being comprised of a pair of parallel stack structures 250 and 251. In FIG. 6A, only a single stack structure 64 is shown, it being understood that this single structure in FIG. 6A represents, in a schematic manner, the two parallel structures 250 and 251. Thus, the superheater tubes 260 shown in FIG. 6A comprise and include the superheater tubes 260 in both of the parallel stack structures 250 and 251. The superheater tubes 260 in the two structures 250 and 251 are, in fact, operated in parallel to function, from a process flow standpoint, as a single set of tubes. This same consideration applies to the other tube sets 261, 262 and 263 included in the stack structures 250 and 251.

Various elements in FIGS. 6A–6F are identified by letter symbols. The meanings of these letter symbols are set forth in the following table:

| LETTER SYMBOL | ELEMENT DESCRIPTION |
|---|---|
| A | Actuator |
| C | Clutch |
| CC | Conductivity Controller |
| CE | Conductivity Element |
| CT | Conductivity Transmitter |
| E | Exciter |
| F | Filter |
| FC | Flow Controller |
| FE | Flow Element |
| FT | Flow Transmitter |
| LC | Level Controller |
| LS | Level Switch |
| LT | Level Transmitter |
| M | Motor |
| NG | Nitrogen Gas Supply |
| PC | Pressure Controller |
| PS | Pressure Switch |
| PT | Pressure Transmitter |
| S | Speed Transducer |
| TC | Temperature Controller |
| TE | Temperature Element |
| TG | Turning Gear |
| TS | Temperature Switch |
| TT | Temperature Transmitter |

The various conductivity elements (CE), conductivity transmitters (CT), flow transmitters (FT), level switches (LS), level transmitters (LT), pressure switches (PS), pressure transmitters (PT), speed transducers (S), temperature elements (TE), temperature switches (TS) and temperature transmitters (TT) shown in FIG. 5G develop various electrical signals which provide measurements of various parameters and which, in most cases, are transmitted to the digital and analog control system equipment located in the plant control center building 150 (FIG. 3) for turbine and plant control and monitoring purposes. The actuators (A), motors (M) and most of the valves shown in FIG. 5G, on the other hand, are responsive to and are controlled by control signals which, for the most part, are produced by the digital and analog control system equipment located in the plant control center building 150.

It is noted at this point that most of the valves shown in FIG. 6 are diaphragm valves of either the pneumatic or the hydraulic type. The pneumatic valves are actuated by pressurized air obtained from the plant instrument air supply. They are controlled, however, by electrical signals which are applied to electrical-to-pneumatic converters associated with the valve pneumatic mechanisms. Most of the valves associated with the heat recovery steam generators 18 and 28 and the gas turbines 12 and 22 are of the pneumatic type. On the other hand, most of the valves associated with the steam turbine 36 are hydraulic valves which are operated by electrohydraulic controls. In this case, the valve actuating fluid is high pressure oil with the hydraulic actuator mechanism being controlled by an electrical control signal. For simplicity of illustration and description, the pneumatic and hydraulic mechanisms will, for the most part, not be shown or described herein and the valves will be spoken of more or less as though they were being driven directly by the electrical control signals.

Reference is made to a printed technical paper entitled "Electro-Hydraulic Control For Improved Availability and Operation of Large Steam Turbines," presented by M. Birnbaum and E. G. Noyes at the ASME-IEEE National Power Conference at Albany, New York during Sept. 19–23, 1965 for further description of typical hydraulic valves and electrohydraulic actuators.

Considering now the No. 1 gas turbine 12 (FIG. 5D), there is associated therewith, in addition to the other elements previously considered, a turning gear 349 which is coupled to the rotary shaft structure 165 and which is used to rotate such gas turbine structure at a speed of approximately 5 rpm just prior to a gas turbine startup and during the cool down period following a gas turbine shutdown. A speed pick-up device or speed transducer 350 is also coupled to the rotary shaft structure 165 and produces an electrical signal indicative of the speed of rotation (rpm) of the gas turbine 12 and the electric generator 13. During normal operation under load conditions, the gas turbine speed will be the synchronous value of 3,600 rpm and, during startup, it will normally be a controlled value as the turbine is accelerated to synchronous speed. Further, there is coupled to the turbine combustor shell 166 which surrounds the 16 combustors 167a–167p a pressure transmitter 351 which produces an electrical signal indicative of the magnitude of the pressure within the combustor shell. There is located in the turbine section 162 in the gas flow path at a point immediately following the last row of turbine blades an array of 16 temperature sensors or temperature elements 352a which provide signals indicative of the gas turbine blade path temperature. There is also located in the exhaust duct 63 leading from the turbine section 162 to the afterburner 16 an array of 16 temperature sensors or temperature elements 352b which provide signals indicative of the gas turbine exhaust temperature. Under peak load conditions, this exhaust temperature will be somewhere on the order of 900° to 1000° Fahrenheit.

As shown in FIG. 6A, there are located at the lower end of the stack structure 64 of the first steam generator 18 a plurality of temperature elements, including temperature elements 353 and 354, which provide indications of the steam generator inlet gas temperature. Under typical peak load conditions, this temperature will be on the order of approximately 1200° Fahrenheit as a result of added afterburner heat. A pressure swtich 355 monitors the steam generator inlet gas pressure and produces a warning signal if such pressure exceeds a desired limit. Located at the top of the stack structure 64 is a further temperature element 356 which produces a signal indicative of the gas top temperature at the top of the stack. Under typical peak load conditions, this temperature will be approximately 340° Fahrenheit. Thus, under typical peak load conditions, the gas temperature varies from about 1200° Fahrenheit at the bottom of the stack 64 (temperature element 353) to about 340° Fahrenheit at the top of the stack 64 (temperature element 356). The gas temperature intermediate the superheater tubes 260 and the high pressure evaporator tubes 261 is about 1000° Fahrenheit. The gas temperature intermediate the high pressure evaporator tubes 261 and the economizer tubes 262 is about 600° Fahrenheit. The gas temperature intermediate the economizer tubes 262 and the low pressure evaporator tubes 263 is about 360° Fahrenheit.

Located at the top of the stack structure 64 is a stack cover louver structure 357 which can be closed when the gas turbine 12 is not in service. This stack cover mechanism 357 is operated by a motor 358. In passing, it is noted that there are actually two of these stack cover mechanisms 357, one being located at the top of each of the two parallel stack structures 250 and 251 (FIG. 4).

Considering now the second heat recovery steam generator 28 (FIG. 6C), there is located within the stack structure 86 thereof superheater tubes 360, high pressure evaporator tubes 361, economizer tubes 362 and low pressure evaporator tubes 363. These tubes 360–363 correspond in purpose and function to the tubes 260–263, respectively, located in the stack structure 64 of the first steam generator 18. Located at the lower end of the second stack structure 86 (FIG. 5F) are turning vanes 366 which turn the turbine exhaust gas upwardly though the tube sections 360–363.

Figure 6C:
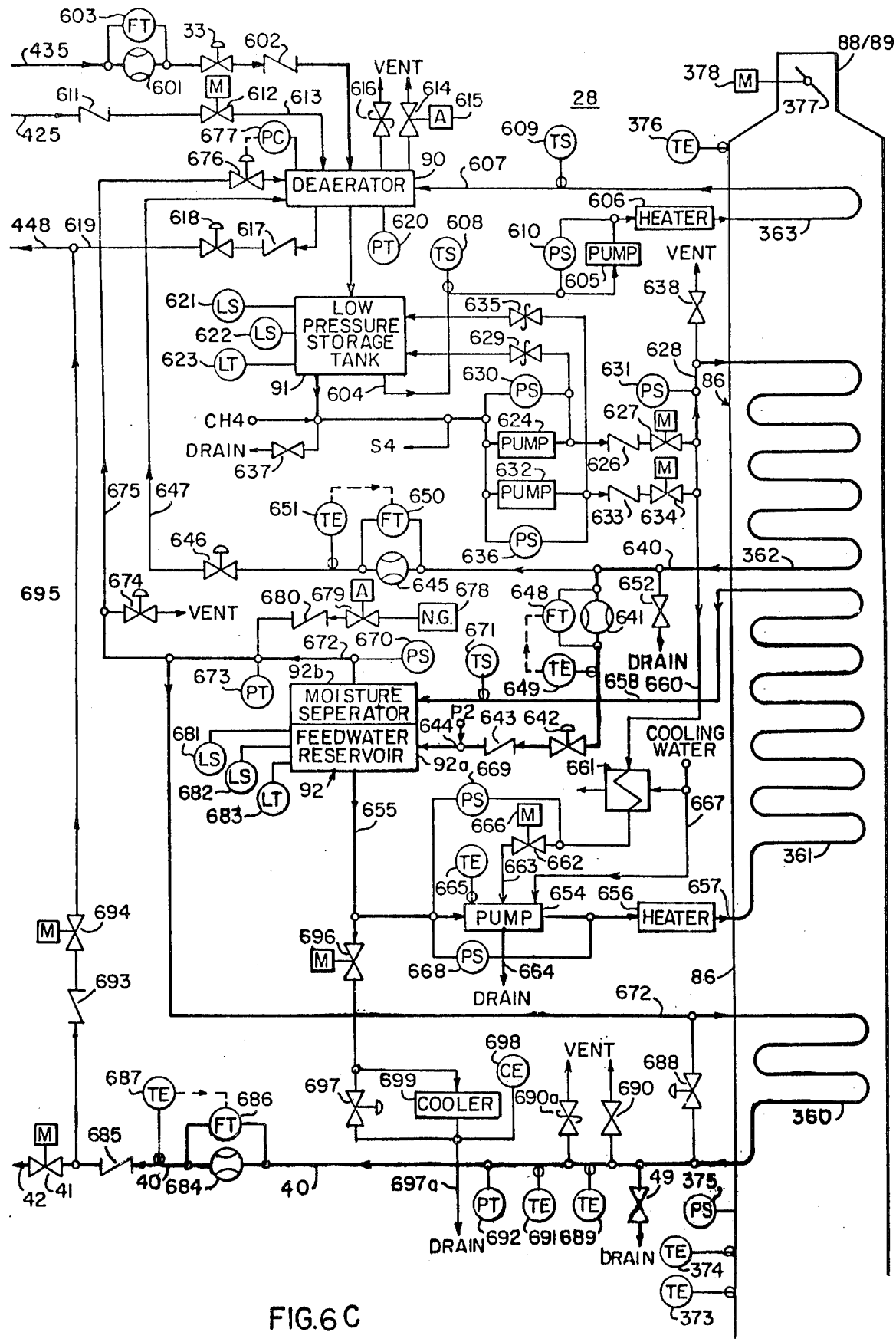
Figure 6D:
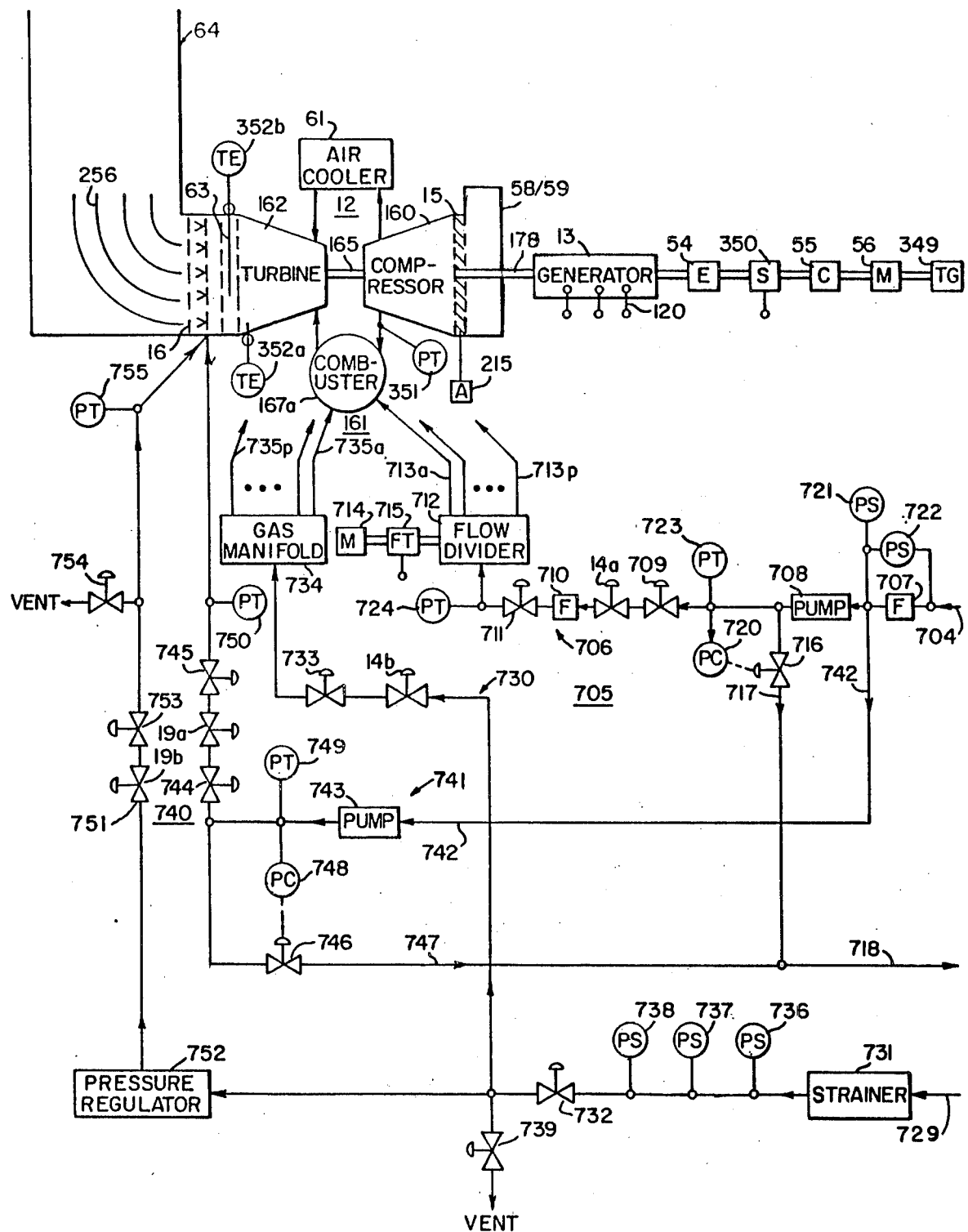
Figure 6F:
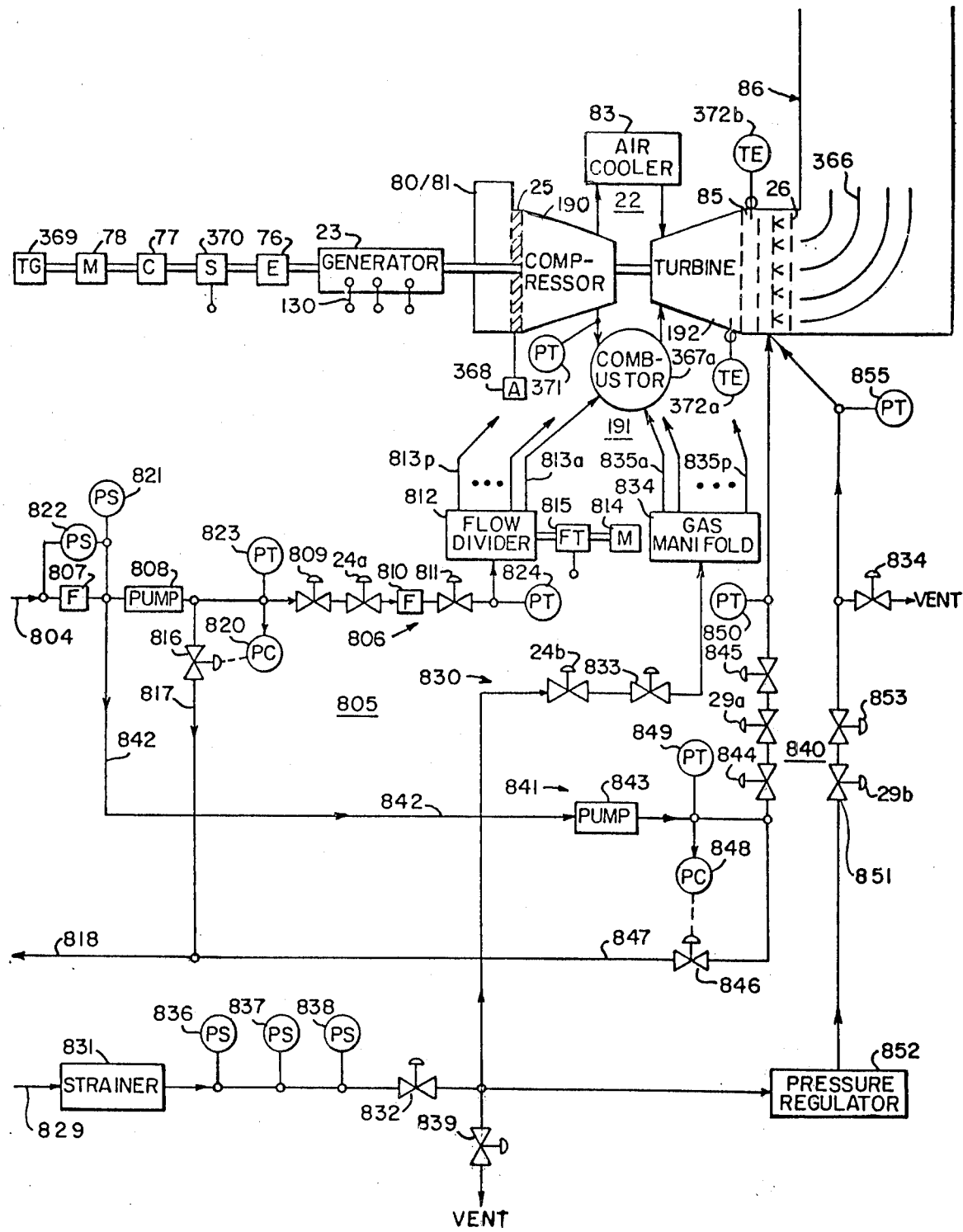

The combustion section 191 of the second gas turbine 22 (FIG. 6F) includes a concentric array of 16 combustors 367a–367p with only the combustor 367a being shown in FIG. 6F. The inlet guide vane mechanism 25 associated with the second gas turbine 22 is controlled by an actuator mechanism 368. A turning gear 369 is coupled to the rotary shaft structure of the electric generator 23 for turning the gas turbine rotor structure at a speed of approximately 200 rpm just prior to a gas turbine startup and during the cool down period following a gas turbine shutdown. A speed transducer 370 is coupled to the rotary shaft structure of the electric generator 23 and produces an electrical signal which indicates the speed of rotation or rpm of the rotary structures of generator 23 and gas turbine 22. A pressure transmitter 371 produces an electrical signal which indicates the magnitude of the pressure within the combuster shell which forms the outer housing of the gas turbine combustion section 191.

An array of 16 temperature elements 372a measure the blade path temperature at the outlet of the blade section in turbine portion 192 of the gas turbine 22. An array of 16 temperature elements 372b measure the exhaust gas temperature of the gas turbine 22. As shown in FIG. 6C, temperature elements 373 and 374 measure the inlet gas temperature for the stack structure 86, while a pressure switch 375 monitors the inlet gas pressure. A temperature element 376 measures the stack top gas temperature for the stack structure 86. Typical temperature values are the same as for the first stack structure 64. An adjustable louver type stack cover mechanism 377 is located at the top of the stack structure 86 (there being one of these mechanisms for each of the exhaust sections 88 and 89) and it is controlled by a motor 378.

Considering now the steam turbine 36, electric generator 44 and condenser 31 (FIG. 6B) in greater instrumentation detail, a speed transducer 401 is coupled to the rotary shaft structure of the generator 44 and produces an electrical signal indicating the rotary speed or rpm of the rotor structures of the steam turbine 36 and generator 44. Under normal load conditions, the steam turbine speed will be the synchronous value of 3,600 rpm and, during startup, the steam turbine speed will normally be a controlled value as the turbine accelerates to snychronous speed. A temperature element 402 and a pressure transmitter 403 generate electrical signals which indicate the throttle temperature and the throttle pressure of the steam entering the inlet of the steam turbine 36. Under typical peak load conditions, the turbine inlet steam temperature will be approximately 952° Fahrenheit and the turbine inlet steam pressure will be approximately 1,277 pounds per square inch (absolute). The outlet side of the steam turbine bypass valve 45 is connected to the desuperheater 46 by way of a steam pipe 404. A temperature element 405 generates an electrical signal which indicates the temperature of any steam flow from the desuperheater 46 to the condenser 31 by way of steam pipe 47. Under typical load conditions with both of the gas turbines 12 and 22 in operation, the bypass valve 45 is fully closed and no steam flows to the desuperheater 46.

Some of the steam in the incoming main steam pipe 34 is removed by way of a steam pipe 406 and supplied by way of a check valve 407, a superheater 408, a control valve 409 and a steam pipe 410 to the gland seals inside the steam tubrine 36 to provide the desired sealing action therein. Superheater 408 is an electric heater having a rating of, for example, 45 kilowatts and is included in the steam turbine motor control center located in the auxiliary equipment enclosure 114 (FIG. 2). After passage through the gland seal structure, this gland steam is removed by way of a pipe 411 and passed to a gland steam condenser 412, the resulting condensate being passed to a drain tank (not shown) by way of a drain line 413.

Some of the steam in main steam line 34 is also supplied by way of a control valve 414 to an air ejector mechanism 415. Air ejector mechanism 415 is a Venturi type air ejector which is used to evacuate the condenser 31. The steam leaving the air ejector 415 passes by way of a steam line 416 to an air ejector steam condenser 417, the resulting condensate being passed to the drain line 413. Air is removed from the condenser 31 by way of a line 418 which runs to the air ejector 415. The Venturi effect occurring in the air ejector 415 serves to suck the air out of the condenser 31 by way of the air line 418. Under typical operating conditions, this evacuates the condenser 31 to a pressure of approximately 2 inches of mercury.

Extraction steam for feedwater heating purposes is removed from the steam turbine 36 between the 10th and 11th stages thereof by way of turbine outlet 313 and is supplied by way of a steam pipe 420, a check valve 421, a control valve 422 and steam pipe 423 to a pair of branch steam pipes 424 and 425. The branch steam pipe 424 supplies extraction steam to the deaerator 68 included in the first steam generator 18 (FIG. 6A), while the branch steam pipe 425 supplies extraction steam to the deaerator 90 included in the second steam generator 28 (FIG. 5C). The "internal water removal" steam removed between the 12th and 13th stages via the steam turbine outlet 314 is supplied by way of steam pipe 426 to the condenser 31. Level transmitters 428 and 429 produce electrical signals which indicate the water levels in hotwell portions 335a and 335b, respectively.

Condensate is pumped from the two hotwell portions 335a and 335b of the divided hotwell 335 by means of condensate pumps 30a and 30b, respectively. The inlet side of pump 30a is connected to the hotwell condensate outlet, while the inlet side of pump 30b is connected to the hotwell condensate outlet. The condensate pumped by pumps 30a and 30b is supplied by way of a condensate pipe 430, the air ejector steam condenser 417, the gland steam condenser 412, a condensate pipe 431 and a condensate pipe 432 to a pair of branch condensate pipes 434 and 435. Branch condensate pipe 434 runs to the deaerator 68 located in the first steam generator 18, while the second branch condensate pipe 435 runs to the deaerator 90 located in the second steam generator 28. The condensate as it leaves the pumps 30a and 30b is at a temperature of approximately 110° Fahrenheit. This condensate flows through the coolant tubes in the air ejector condenser 417 and the gland steam condenser 412 to provide the cooling action which occurs in these condensers 417 and 412. A normally-open manual crossover valve 436 is connected between the two hotwell outlets and can be closed if half the condenser 31 is shut down for maintenance purposes or the like. Each of the condensate pumps 30a and 30b has sufficient capacity to enable either pump alone to carry the full flow load in the event the other pump should fail.

Some of the condensate flowing in the pipe 431 is also supplied by way of a pipe 437, a desuperheater control valve 438 and a pipe 439 the desuperheater 46. This condensate provides the cooling medium in the desuperheater 46. The desuperheater 46 is of the water spray type such that the relatively cool condensate entering by way of pipe 439 is sprayed into the relatively hot steam flow entering by way of the pipe 404. Under typical conditions for such steam flow, this lowers the steam temperature to about 350° Fahrenheit. The temperature signal produced by the temperature element 405 coupled to the desuperheater outlet pipe 47 is supplied by way of a temperature transmitter (not shown) and a temperature controller (not shown) to the desuperheater control valve 438 for purposes of regulating same to hold the temperature of the desuperheater outlet steam in pipe 47 fairly constant.

If the condensate level in the hotwell portions 335a and 335b becomes too low, than makeup water from a makeup water storage tank 440 is supplied to the hotwell portions 335a and 335b by means of a makeup water pump 441, a makeup block valve 441a, a makeup control valve 442 and a makeup water pipe 443 which runs to the makeup water inlet 340 on the condenser 31. Conversely, if the condensate level in hotwells 335a and 335b becomes too high, then condensate is returned to the makeup water storage tank 440 by way of a condensate return valve 444. In other words, the pump 441 is operated and the valves 442 and 444 are opened and closed as needed in order to hold the condensate level in hotwells 335a and 335b fairly constant. This is accomplished by means of level sensing switches (not shown) associated with the hotwells 335a and 335b which operate the appropriate control circuits (not shown) to control the pump 441 and the valves 442 and 444. Block valve 441a is fully open during normal operation. When needed, additional water is supplied to the makeup water storage tank 440 from an external water source by way of a demineralizer 445 and a control valve 446.

A pair of auxiliary steam bypass lines 447 and 448 are connected by way of a common bypass line 449 to the bypass steam pipe 404 which runs to the desuperheater 46. Bypass line 447 enables steam from the first steam generator 18 (FIG. 6A) to be passed directly to the desuperheater 46 under certain operating conditions, while the bypass line 448 does likewise for the second steam generator 28 (FIG. 6C).

As previously indicated in connection with FIG. 3, cooling water or circulating wter is taken from the river or lake 105 (FIG. 3) and supplied to the condenser tubes in the condenser 31 by way of circulating water intake pipes 107 and 108. Circulating water pumps located at the intake station 106 (FIG. 3) serves to move the water through the intake pipes 107 and 108. Temperature elements 450 and pressure transmitters 451 generate electrical signals which serve to monitor the temperature and pressure of the incoming circulating water. The circulating water leaves the condenser 31 by way of the outlet pipe 110 and is returned to the river or lake 105. A further temperature element 452 generates an electrical signal to monitor the temperature of the outgoing circulating water.

Various additional temperature elements, pressure transmitters, level transmitters and other measurement devices are associated with the condenser 31 and the steam turbine 36, these items being omitted from FIG. 5B for sake of simplicity.

Considering now the details of the first heat recovery steam generator 18 (FIG. 6A), condensate from the condenser hotwells 335a and 335b is supplied to the deaerator 68 by way of the condensate pipe 434, a flow element 501, the condensate control valve 32 (Cf. FIG. 1) and a check valve 502. A flow transmitter 503 cooperates with the flow element 501 to provide an electrical signal which indicates the value of the condensate flow rate through the flow element 501. Flow element 501 provides a restriction in the flow path and flow transmitter 503 measures the pressure difference across the restriction. As is well known, this pressure difference is indicative of the flow rate. Thus, flow element 501 and flow transmitter 503 constitute a well-known type of flowmeter for measuring fluid flow.

Deaerator 68 provides a feedwater heating action as well as a deaerating action, and it is of the spray tray or jet tray type. The condensate entering from check valve 502 is sprayed by way of spray nozzles into a tray structure which also receives steam from the low pressure evaporator tubes 263. More particularly, the water or condensate collected in the deaerator 68 flows to a low pressure feed water storage tank 69 which, among other things, serves as a storage reservoir for the deaerator 68. Water from this storage tank 69 flows by way of a pipe 504, a low pressure circulation pump 505, a standby electric heater 506, the low pressure evaporator tubes 263 and a pipe 507 to a steam inlet into the tray structure inside the deaerator 68. Low pressure circulation pump 505 provides the desired fluid flow and the low pressure evaporator tubes 263 in the stack structure 64 serve to convert the water into steam. This steam is supplied to the deaerator 68 by way of pipe 507 to heat the condensate entering the deaerator 68 from check valve 502. This provides a substantial portion of the desired feedwater heating.

Electric heater 506 is used for standby heating purposes when the gas turbine 12 is not in service. If the gas turbine 12 is not in operation and if it is desired to maintain the steam generator 18 in a hot standby condition, then the heater 506 is controlled by a temperature switch 508 so as to maintain the temperature of the water in the storage tank 69 at a value of approximately 250° Fahrenheit. If, on the other hand, it is desired that the steam generator 18 be shut down for an extended period of time but not drained, then electric heater 506 is used to provide feeze protection. In this latter case, the heater 506 is controlled by a temperature switch 509 so as to prevent the temperature of the water in this part of the system from falling below a value of 40° Fahrenheit. In both of these cases, the low pressure circulation pump 505 must be turned on and operating. A pressure switch 510 monitors the operation of the pump 505 and produces a warning signal if the pressure differential across the pump 505 becomes too low.

For total plant loads above approximately 80% of the total plant capacity, supplemental feedwater heating is provided by the extraction steam taken from the steam turbine 36. This extraction steam is supplied to the deaerator 68 by way of the extraction steam pipe 424, a check valve 511, a motor operated isolation valve 512 and a steam pipe 513. The extraction steam control valve 422 is opened for plant loads above the 80% figure. Below this figure, the steam used for feedwater heating is obtained from the low pressure evaporator tubes 263 and the economizer recirculation flow.

Deaerator 68 is provided with a low pressure vent valve 514 which is controlled by an actuator 515. Actuator 515 is of the solenoid type and is controlled by an appropriate control signal from the main operator control board in the plant control center building 150 (FIG. 3). During normal operation, the vent valve 514 is kept fully open to allow air to escape from the deaerator 68. the deaerator 68 is also provided with a pressure safety valve 516. Deaerator 68 is provided with a further pressure release mechanism which includes a check valve 517 and a dump valve 518, the outlet side of the latter being connected by way of a pipe 519 to the auxiliary steam bypass pipe 447 by way of which steam may be returned to the desuperheater 46 and condenser 31. If the pressure within the deaerator 68 exceeds 160 pounds per square inch, dump valve 518 opens to dump steam in the deaerator 68 back to the condenser 31. Among other things, this prevents a popping of the safety valve 516.

A pressure transmitter 520 senses the pressure within the deaerator 68 and provides a signal indicative of the value thereof. Level switches 521 and 522 monitor the water level within the low pressure storage tank 69, switch 521 producing an electrical warning signal if the water level is too high and switch 522 producing an electrical warning signal if the water level is too low. A level transmitter 523 produces an electrical signal indicative of the actual water level in the tank 69.

Boiler feedwater stored in the low pressure storage tank 69 is pumped through the economizer tubes 262 in the stack structure 64 by means of a main boilder feed pump 524. The intake side of boiler feed pump 524 is connected to the storage tank 69 by means of a feedwater pipe 525. The outlet side of boiler feed pump 524 is connected to the inlet side of economizer tube 262 by means of a check valve 526, a motor operated block valve 527 and a feedwater pipe 528. Valve 527 is open during normal operation. The electric motor which runs the boiler feed pump 524 has a nominal rating of 1250 horsepower. A pressure safety valve 529 is connected between the outlet side of pump 524 and the low pressure storage tank 69. A pressure switch 530 monitors the pressure difference across the boiler feed pump 524 and produces an electrical warning signal if such pressure difference fall below a desired lower limit. A further pressure switch 531 monitors the pressure in the feedwater pipe 528 and produces an electrical warning signal if such pressure falls below a desired lower level.

A standby boiler feed pump 532 is connected in parallel with the main boiler feed pump 524 and the valves 526 and 527, the outlet side of this standby pump 532 being connected by way of a check valve 533 and a motor-operated block valve 534 to the feedwater pipe 528 which runs to the inlet of the economizer tubes 262. During normal operation of the steam generator 18, the standby pump 523 is turned off and the block valve 534 is closed. The electric motor which runs the standby pump 532 has a nominal rating of 25 horsepower. The standby pump 532 is used when the steam generator 18 is in either the hot standby mode or the freeze protection mode. At such time, the main boiler feed pump 524 is turned off and its block valve 527 is closed. A pressure safety valve 535 is connected to the outlet side of the standby pump 532 and is connected back to the low pressure storage tank 69. A pressure switch 536 monitors the pressure difference across the standby boiler feed pump 532 and produces an electrical warning signal when the pressure difference is too low.

A manually-operated drain valve 537 is provided for draining the deaerator 68 and low pressure storage tank 69 when the steam generator 18 is to be shut down for maintenance purposes or other desired reasons. A manually-operated vent valve 538 is connected to the economizer feedwater pipe 528 for venting air from the system when the steam generator 18 is being shut down and the system filled with a nitrogen blanket. During normal operation, the drain valve 537 and the vent valve 538 are closed.

During normal load operation, the main boiler feed pump 524 pumps boiler feedwater through the economizer tubes 262, such feedwater being obtained from the low pressure storage tank 69. Under typical peak load conditions, the feedwater leaving the storage tank 69 will be at a temperature of approximately 250° Fahrenheit. As feedwater flows through the economizer tubes 262, it is heated to within 5° Fahrenheit of the saturation temperature, that is, the temperature at which it will boil at the pressure at hand. Under typical peak load conditions, the feedwater leaving the economizer tubes 262 will be at a temperature of approximately 570° Fahrenheit.

The hot feedwater leaving the economizer tubes 262 goes to two different places. Firstly some of this feedwater flows by way of a pipe 540, a flow element 541, a feedwater control valve 542, a check valve 543 and a pipe 544 to the feedwater reservoir section 70a of the vertical steam drum 70. The remainder of the hot feedwater leaving economizer tubes 262 flows by way of pipe 540, a flow element 545, a recirculation control valve 546 and a pipe 547 back to the deaerator 68, wherein it serves to provide some of the heating of the condensate entering the deaerator 68.

During normal load operation, the feedwater control valve 542 and the recirculation control valve 546 are automatically controlled in a coordinated manner to keep constant the water flow rate through the economizer tubes 262. For example, if less water is required by the feedwater reservoir 70a (lower load level), then more water is recirculated back by way of the valve 546 to the deaerator 68, the proportions being such as to hold constant the water flow in the pipe 540. As the power generated by steam turbine 36 increases, more economizer water flow is directed to the feedwater reservoir 70a.

Constant water flow through the economizer tubes 262 is important in order to minimize steaming and prevent stagnation in some of the economizer tube 262 at part loads. If the flow rate were not constant but instead were allowed to vary with load, then the flow rate would decrease as the load decreased. At the lower flow rates, the likelihood of steaming would be greater. The problem with steaming is that it produces an increased pressure drop in the tube wherein it is occurring. This leads to less flow and more steaming and ultimately stagnation or a complete absence of flow in such tube.

In the present embodiment, the flow rate is maintained constant at a relatively high value such that the same high water velocities are provided in the various economizer tubes at all load levels. Thus, the pressure drop across the entire economizer section 262 is relatively high at all load levels. Consequently, any increase in pressure drop caused by steaming in certain tubes in small compared to the total pressure drop, resulting in insignificant changes in water flow and thereby preventing stagnation in any of the economizer tubes 262. In addition, the higher pressure drops produced by the higher water velocities through the economizer tubes 262 promotes a more uniform distribution of water flow through the economizer tubes which, among other things, results in higher heat transfer coefficients on the inside of the tubes.

A further advantage of the constant water flow rate through the economizer tubes 262 is that the main boiler feed pump 524 operates at a constant and optimum rate in terms of pump efficiency for all plant load levels.

A flow transmitter 548 and a temperature element 549 are associated with the feedwater flow element 541, with the flow transmitter 548 providing an electrical signal indicative of the feedwater flow rate through the flow element 541 and the temperature element 549 providing temperature compensation for the flow rate signal. Similarly, a flow transmitter 550 and a temperature element 551 are associated with the recirculation path flow element 545, with the flow transmitter 550 providing an electrical signal indicative of the value of the flow rate of the water flowing back to the deaerator 68 and the temperature element 551 providing temperature compensation for the flow rate signal. A manually-operated drain valve 552 is connected to the feedwaer pipe 540 for purposes of draining the economizer tubes 262 when the steam generator 18 is to be shut down. During normal operation, the drain valve 552 is closed.

The hot, nearly boiling feedwater in the feedwater reservoir 70a is pumped through the high pressure evaporator tubes 261 by a high pressure circulation pump 554. The electric motor associated with this pump 554 has a nominal rating of 60 horsepower. The inlet side of the pump 554 is connected to the feedwater reservoir 70a by way of pipe 555. The outlet side of pump 554 is connected to the high pressure evaporator tubes 261 by way of a standby electric heater 556 and a pipe 557. As the hot feedwater flows through the high pressure evaporator tubes 261 it is converted into steam which is then supplied by way of a pipe 558 to the moisture separator section 70b of the steam drum 70. Under typical peak load conditions, the steam leaving the high pressure evaporator tubes 261 will be at a temperature of approximately 575° Fahrenheit.

The high pressure circulation pump 554 is of a type which employs floating ring type seals. The water required for these seals is obtained from the economizer inlet pipe 528 by way of a pipe 560, a water-to-water heat exchanger or cooler 561, a motor-operated control valve 562 and a pipe 563. Heat exchanger 561 cools the 250° Fahrenheit water coming from the feedwater pipe 528 to a temperature of approximately 150° Fahrenheit. The water leaving the pump seals is carried to a drain by way of a pipe 564.

With floating ring type seals, it is necessary to control the flow of water through the seals such that flashing will not occur since flashing of the water through the seals would result in erosion of the labyrinth elements in the seals. To this end, a temperature element 565 is located in the atmospheric collection chamber at the exit of the seals to sense the temperature of the seal water leaving the seals. This temperature element 565 produces an electrical signal which is supplied to a temperature transmitter (not shown) which drives a temperature controller (not shown) which, in turn, controls the motor 566 which operates the seal water control valve 562. This control loop modulates the control valve 562 to assure that only the required amount of water is provided to the pump seals.

Water for the stuffing box in the high pressure circulation pump 554 is supplied thereto from the cooling water source for heat exchanger 561 by way of a pipe 567. The stuffing box water is drained by way of the drain pipe 564. A pressure switch 568 monitors the pressure difference across the pump 554 and produces an electrical warning signal if this pressure becomes too low. A further pressure switch 569 monitors the differential pressure across the seals in pump 554 to provide an electrical warning signal if this pressure differential becomes too low.

The electric heater 556 is used for standby and freeze protection purposes when the gas turbine 12 is not in service. When the gas turbine 12 is not in operation and the stam generator 18 is in the hot standby mode, the heater 556 is controlled by a pressure switch 570 to maintain the proper steam pressure in the steam drum 70. In other words, pressure switch 570 turns on the heater 556 if the steam drum pressure falls below the desired minimum value. On the other hand, if the plant 10 is shut down for an extended period of time and the plant operator chooses not to generate steam in the steam generator 18, then the heater 556 is controlled by a temperature switch 571 to maintain the water in the steam drum 70 above the freezing point. The high pressure circulation pump 554 must be kept on and operating during either of these operating modes for the heater 556.

The moisture separator section 70b of the steam drum 70 receives the wet steam from the high pressure evaporator tubes 261 and removes practically all of the remaining water from such steam. The resulting dry steam leaves the moisture separator 70b and is supplied by way of a steam pipe 572 to the superheater tubes 260 located in the stack structure 64. Under typical peak load conditions, the dry steam leaving the moisture separator 70b is at a temperature of approximately 575° Fahrenheit and a pressure of approximately 1300 pounds per square inch (absolute).

A pressure transmitter 573 generates an electrical signal which indicates the steam pressure at the outlet of the moisture separator 70b. A high pressure vent valve 574 is connected to the steam line 572 for purposes of, among other things, venting some of the steam if it appears that the steam pressure inside the steam drum 70 is becoming too large. During normal operation, the vent valve 574 is closed. The steam drum 70 is also provided with one or more pressure safety valves which for simplicity of illustration, are not shown.

A steam line 575 is connected from the main steam pipe 572 to a deaerator pressure control valve 576 which is, in turn, connected to an additional steam inlet of the deaerator 68. The control valve 576 is controlled by a pressure controller 577 which is responsive to the pressure within the deaerator 68. Pressure controller 577 and control valve 576 function to maintain the desired steam pressure in the deaerator 68 at part loads for the plant 10. If the steam pressure within the deaerator 68 falls below the desired value, then pressure controller 577 opens the valve 576 to bring the pressure back up to the desired value. This is most likely to occur at part loads of less than about 80% because, in such cases, the extraction steam control valve 422 (FIG. 6B) is closed and no extraction steam is being supplied to the deaerator 68.

A nitrogen gas supply 578 is connected to the main steam pipe 572 by way of an actuator-operated nitrogen admission valve 579 and a check valve 580. During normal operation, the nitrogen admission valve 579 is closed and no nitrogen is admitted into the steam system. Valve 579 is opened during the process of draining and venting the steam generator 18 and transferring it to a dry status. The nitrogen valve 579 is opened as more or less the final step in this process. The nitrogen gas is admitted into the steam system for purposes of replacing steam which condenses in the system during the draining and venting process. Among other things, this minimizes subsequent rusting or scaling in the steam drum 70 and the evaporator and superheater tubes 261 and 260. As mentioned elsewhere herein, the gas turbine 12 can be operated for prolonged periods of time with the steam generator 18 in a dry condition without causing serious damage to the boiler tubes 260-263 and other parts of the steam generator 18.

The feedwater reservoir section 70a of the steam drum 70 is provided with a high-indicating level switch 581, a low-indicating level switch 582 and a level transmitter 583. Switch 581 produces an electrical warning signal when the water level in the reservoir 70a gets too high, while switch 582 produces an electrical warning signal when the water level gets too low. Level transmitter 583 produces an electrical signal indicating the actual water level in the reservoir 70a. The water level signal from the transmitter 583 is supplied to a controller (not shown) which controls the feedwater control valve 542 to maintain a fairly constant water level in the feedwater reservoir 70a.

As the dry steam from the steam drum 70 flows through the superheater tubes 260, it is further heated to raise its temperature another 300° to 400° Fahrenheit.

Under typical peak load conditions, the superheated steam flowing in the main steam outlet line 37 is at a temperature of 952° Fahrenheit and a pressure of approximately 1277 pounds per square inch (absolute). During normal operation of the plant 10, this superheated steam flows by way of main steam outlet line 37, isolation valve 38, steam pipe 34 and steam turbine valves 35a, 35b, 308a and 308b to the main steam inlet of the steam turbine 36 (FIG. 5B). Connected in series in the main steam outlet line 37 are a flow element 584 and a check valve 585. A flow transmitter 586 and a temperature element 587 (for temperature compensation of flow transmitter 586) are associated with the flow element 584, the flow transmitter 586 producing an electrical signal indicating the value of the output steam flow rate for the steam generator 18. During normal load operation, the main steam isolation valve 38 is, of course, fully open.

The final output steam temperature for the steam generator 18 is the temperature of the superheated steam flowing in the steam generator outlet line 37. This temperature is primarily determined by the temperature rise of the steam in the superheater tubes 260, this temperature rise being dependent on the temperature of the exhaust gas leaving gas turbine 12 and the amount of supplemental heat added to the turbine exhaust gas by the afterburner 16. The final steam temperature in outlet line 37 is also controlled in part by means of a superheater bypass valve 588 which is connected between the inlet and outlet of the superheater tube section 260. More specifically, the outlet side of bypass valve 588 is connected to the superheater outlet header 264 (FIG. 4) to which is connected the steam generator outlet line 37.

Superheater bypass valve 588 controls the output steam temperature by bypassing some of the lower temperature steam coming from the steam drum 70 around the superheater tubes 260 and then mixing this lower temperature bypassed steam with the higher temperature superheated steam emerging from the superheater tubes 260. Other things being constant, the greater the degree of opening of the bypass valve 588, the greater the amount of the lower temperature steam which is bypassed and, hence, the lower the temperature of the steam flowing to the steam turbine 36. The maximum amount of steam that can be bypassed by the bypass valve 588 is about 20% of the total steam flow from the steam drum 70.

The superheater bypass valve 588 is the final control element in a temperature control loop which is used to regulate the output steam temperature to hold it fairly constant at a predetermined setpoint value. In the present embodiment, this predetermined setpoint value is 952° Fahrenheit. Also included in this temperature control loop is a temperature element 589 which senses the temperature of the steam flowing in the outlet steam line 37 downstream of the bypass valve 588. Temperature element 589 cooperates with a temperature transmitter (not shown) to produce an electrical signal which is transmitted to a temperature controller (not shown) which controls the degree of opening of the superheater bypass valve 588. If the steam temperature in the outlet line 37 is greater than the 952° Fahrenheit setpoint value, then the temperature controller sends a signal to the bypass valve 588 to increase the degree of opening of such valve. This reduces the steam temperature in outlet line 37 to bring it back to the 952° value. Conversely, if the steam temperature in outlet line 37 is less than 952° Fahrenheit, the temperature controller decreases the degree of opening of the bypass valve 588. This causes more steam to pass through the superheater tubes 260 and thus increases the temperature of the steam in the outlet line 37.

This type of temperature control system has several advantages. It is superior to a system in which water is injected into the superheated steam to cool it because such a system could also send slugs of water into the steam turbine if its control valve failed. Since the present system injects dry steam, this is not a problem. The present system is also better than a system which controls steam temperature by varying the afterburner firing rate because it will respond more rapidly to load changes.

There is also connected to the main steam outlet line 37 a normally-closed manually-operated vent valve 590, a pressure safety valve 590a, a temperature element 591 and a pressure transmitter 592. During normal operation, the vent valve 590 and the previously considered drain valve 48 are closed. Temperature element 591 and pressure transmitter 592 generate electrical signals which indicate the temperature and pressure of the steam in the outlet line 37 and transmit such signals to the plant control center building 150.

In certain situations, the main steam isolation valve 38 is closed and the steam produced by the steam generator 18 is bypassed to the condenser 31 by way of an auxiliary steam bypass path with includes a check valve 593, a motor-operated block valve 594 and a steam line 595 which runs to and connects with the auxiliary steam bypass line 447 which communicates with the desuperheater 46 by way of pipes 449 and 404 (FIG. 5B). This particular arrangement wherein the main steam isolation valve 38 is closed and the auxiliary bypass block valve 594 is open is employed, for example, to drain the outlet steam line 37 of water when the No. 1 steam generator 18 is to be started up after the No. 2 steam generator 28 has already been put into operation and is busy supplying steam to the steam turbine 36.

The steam generator 18 further includes an automatic "blowdown" mechanism for minimizing the buildup of mineral deposits on the inner walls of the high pressure evaporator tubes 261. This blowdown mechanism includes a motor-controlled blowdown block valve 596 and a blowdown control valve 597 which are connected in series between the feedwater outlet pipe 555 of the steam drum 70 and an appropriate drain or sewer outlet 597a. During normal operation, the block valve 596 is full open.

The blowdown control valve 597 is controlled by a signal developed by a conductivity element 598 which continuously measures the conductivity of a sample portion of the steam drum feedwater, which sample portion flows by way of the block valve 596 and a cooler 599 to the drain outlet 597a. Conductivity element 598 is connected to the outlet side of the cooler 599, the function of the cooler 599 being to cool the feedwater sample to a temperature suitable for the conductivity element 598. The conductivity element 598 cooperates with a conductivity transmitter (not shown) to generate an electrical signal indicative of conductivity, which signal is transmitted to a conductivity controller (not shown) which controls the blowdown control valve 597.

The conductivity element 598 provides an electrical signal which indicates the electrical conductivity of the feedwater flowing in the steam drum outlet pipe 555. The "hardness" or mineral content of th feedwater in the steam drum outlet pipe 555 determines the conductivity of this feedwater. The greater the "hardness" or mineral content, the greater the conductivity.

The conductivity element 598 and its associated conductivity controller operate the adjust the degree of opening of the blowdown control valve 597 so as to keep the feedwater mineral content below a desired limit. If the feedwater mineral content increases above the desired limit, then the blowdown control valve 597 is opened to a greater degree to dump a greater amount of the steam drum feedwater into the drain outlet 597a. This tends to lower the water level in the system. This, in turn, signals the makeup water pump 441 and the makeup water valve 442 (FIG. 5B) to add fresh demineralized water to the system. This brings the mineral content of the water in the system back down to the desired level.

As seen from the foregoing description, the heat recovery steam generator 18 includes not only the stack structure 64 and the various boiler tubes 260-263 located therein, but also the deaerator 68, the low pressure storage tank 69, the steam drum 70 and the various other items 501-599 considered in connection therewith.

The normal operation of the heat recovery steam generator 18 will now be briefly summarized for the case where the combined cycle plant 10 is operating under typical peak load conditions. In this case, both of the gas turbines 12 and 22, both of the afterburners 16 and 26, both of the heat recovery steam generators 18 and 28 and the steam turbine 36 are in operation. The condensate pumps 30a and 30b pump condensate at a temperature of approximately 110° Fahrenheit from the condenser hotwell sections 335a and 335b via pipes 430, 431, 432 and 434 to the deaerator 68 wherein such condensate is deaerated and heated to a temperature of approximately 250° Fahrenheit by heat from the steam from the low pressure evaporator tubes 263, the extraction steam from the steam turbine 36 (via steam pipe 424) and the hot water being recirculated from the economizer tubes 262 by way of the recirculation control valve 546 and the pipe 547. This heated 250° water is supplied to the low pressure storage tank 69. At this point, the water is referred to as boiler feedwater.

The boiler feedwater in the storage tank 69 is pumped through the economizer tubes 262 by the main boiler feed pump 524. As this feedwater flows through the economizer tubes 262, heat from the turbine exhaust gas raises its temperature to within 5° Fahrenheit of the saturation temperature, that is, the temperature at which it will boil at the particular pressure at hand. Typically, the hot feedwater leaving the economizer tubes 262 will be at a temperature of approximately 570° Fahrenheit. This hot feedwater flows to the feedwater reservoir 70a of the steam drum 70, the water level in the reservoir 70a being controlled by the feedwater control valve 542.

The hot feedwater in the reservoir 70a is pumped through the high pressure evaporator tubes 261 by the high pressure circulation pump 554. As the feedwater flows through the high pressure evaporator tubes 261, more heat from the turbine exhaust gas converts it into steam having a temperature of approximately 575° Fahrenheit. This steam is supplied to the moisture separator 70b which serves to remove practically all of the remaining moisture from such steam.

The resulting dry steam leaving moisture separator 70b flows by way of steam pipe 572 to the superheater tubes 260. As this steam flows through the superheater tubes 260, heat from the turbine exhaust gas at the gas entry end of the stack structure 64 raises its temperature to a value of approximately 952° Fahrenheit. The resulting superheated steam leaving superheater tubes 260 flows by way of steam generator outlet line 37 and steam pipes 39 and 34 to the steam turbine 36, wherein it is used to drive the rotor blades of the steam turbine 36. At the same time, the second steam generator 28 (FIG. 6C) is similarly making superheated steam which is also flowing to the steam turbine 36 by way of steam pipes 42 and 34, this steam combining with the steam from the first steam generator 18 to produce the total driving force for the steam turbine 36.

As will be considered in greater detail hereinafter, when the combined cycle plant 10 is operating above a minimum load level with both steam generators 18 and 28 in operation, the steam turbine 36 is operated in a pure turbine following mode. In this mode, the steam turbine bypass valve 45 (FIG. 6B) is fully closed and the steam turbine governor or control valves 35a and 35b and throttle or stop valves 308a and 308b are all fully open. In this case, the power developed by the same turbine 36 is determined entirely by the steam generated by the steam generators 18 and 28 which is, in turn, determined by the operating levels of the gas turbines 12 and 22 and the afterburners 16 and 26.

The hot gas produced by the gas turbine 12 and the afterburner 16 (FIG. 6D) flows vertically upward in the stack structure 64 (FIG. 6A). On the other hand, the fluid in the superheater tubes 260 and the economizer tubes 262 flows in a downward direction, counter to the direction of gas flow. This downflow or counterflow in the superheater and economizer sections 260 and 262 provides better heat transfer for the steam and water moving through these sections. In the evaporator sections, namely, the high pressure evaporator 261 and the low pressure evaporator 263, the water and steam flow is in the upward direction which is the same direction as that of the hot gas flow. This is of particular importance with respect to the high pressure evaporator 261. Since the process of evaporation is isothermal, the temperature advantage is the same for either an upflow or a downflow design. The upflow design used for the high pressure evaporator section 261 is, however, more advantageous in that it permits operation at part loads by means of natural circulation should there be a failure of the high pressure circulation pump 554.

Considering now the No. 2 heat recovery steam generator 28 (FIG. 6C), it is noted that this steam generator 28 includes, in addition to the elements previously considered, various elements bearing reference numerals 601 through 699, inclusive. These elements 601–699 are the same as elements 501–599, respectively, previously considered for the first steam generator 18 (FIG. 6A). These elements 601–699 serve the same purposes and function in the same manner as do the corresponding ones of counterpart elements 501–599 in the first steam generator 18. Thus, the second steam generator 28 is of the same construction as and operates in the same manner as does the first steam generator 18. For this reason, a detailed description of the second steam generator 28 will not be given herein.

As shown in FIGS. 6D–6F, the combined cycle plant 10 further includes means for supplying fuel to the two gas turbines 12 and 22 and to the two afterburners 16 and 26. In the present embodiment, this fuel may be either natural gas or distillate type No. 2 grade fuel oil. Natural gas is obtained from a gas supply 700 (FIG. 6E) which may be, for example, a gas distribution line tied to a natural gas utility system. This gas is supplied to the combined cycle plant 10 by way of a gas pressure regulator 701. The fuel oil, on the other hand, is obtained from a fuel oil storage tank 702 located off of but immediately adjacent to the plant site 155. This fuel oil is pumped to the plant site 155 proper by means of a fuel forwarding pump 703. Appropriate control mechanisms are provided so that the plant operator may readily select the particular fuel to be used.

Associated with the first gas turbine 12 is a fuel system 705 (FIG. 6D) for supplying the gas and oil fuels thereto. The gas turbine fuel system 705 includes an oil delivery system 706 which is connected between the outlet of the fuel forwarding pump 703 and the combustion section 161 of the gas turbine 12. As previously indicated, the combustion section 161 includes an array of 16 combustion chambers of combustors 167a–167p. For simplicity of illustration, only the combustor 167a is shown in FIG. 6D. Starting with the fuel forwarding pump 703, the oil fuel system 706 includes, in the order named, a low pressure filter 707, a main fuel pump 708, an overspeed trip valve 709, an oil throttle valve 14a, a high pressure filter 710, an isolation valve 711 and a fuel distributor or flow divider 712. Connected to the 16 outlets of the flow divider 712 are 16 outlet lines 713a–713b which run to the different individual combustors 167a–167p, respectively. During normal operation on oil fuel, the overspeed trip valve 709 and the isolation valve 711 are full open.

Flow divider 712 includes a rotary mechanism which serves to divide and distribute the oil fuel in an equal manner to the 16 outlet lines 713a–714p. During normal operation, the flow divider 712 operates under its own power, so to speak, the flow of the high pressure oil through the flow divider 712 serving to cause the rotation of the rotary distributor mechanism therein. An electric starting motor 714 is coupled to the rotary shaft of the flow divider 712 for purposes of insuring a proper initial startup of the flow divider 712. Once the oil flow exceeds a predetermined relatively low value such as, for example, 4%, the starting motor 714 is turned off and the flow divider 712 operates on its own.

Also coupled to the rotary shaft of the flow divider 712 is a speed pick-up device or speed transducer 715 which produces an electrical signal indicative of the rotary speed of the flow divider 712. Since this rotary speed is proportional to the fuel flow rate through the divider 712, the signal generated by the transducer 715 is also indicative of the fuel flow rate. For this reason, the transducer 715 will hereinafter be referred to as a flow transmitter and will be thought of as providing a signal indicative of the fuel flow rate.

The inlet side of a pressure regulating valve 716 is connected to the oil line intermediate the main fuel pump 708 and the overspeed trip valve 709, the outlet side of this valve 716 being connected by way of oil return lines 717 and 718 to an oil return inlet on the fuel oil tank 702. A pressure controller 720 measures the oil pressure on the output side of the main fuel pump 708 and adjusts the pressure regulating valve 716 in accordance therewith so as to hold the oil pressure at this point in the system substantially constant.

A pressure switch 721 monitors the oil pressure on the output side of the low presure filter 707, while a differential pressure switch 722 monitors the pressure difference across the low pressure filter 707. Pressure switch 722 produces an electrical warning signal when the pressure difference becomes too high. A pressure transmitter 723 produces a signal indicative of the oil pressure on the ouput side of the main fuel pump 708.

A further pressure transmitter 724 generates a signal indicative of the oil pressure of the oil being supplied to the flow divider 712.

The gas turbine fuel system 705 further includes a gas delivery system 730 for supplying natural gas from the gas supply 700 to the turbine combustors 167a–167p. Starting with the pressure regulator 701 (FIG. 6E), this gas system 730 includes, in the order named, a strainer 731, an overspeed trip valve 732, a gas throttle valve 14b, an isolation valve 733 and a gas manifold 734. The 16 outlets of the gas manifold 734 are connected by way of fuel outlet lines 735a–735b to different individual ones of the 16 combustors 167a–167p, respectively. During normal operation on natural gas, the overspeed trip valve 732 and the isolation valve 733 are fully open, the flow of the gas fuel being controlled by the degree of opening of the throttle valve 14b.

Electrical type pressure switches 736, 737 and 738 are connected to the gas delivery line intermediate the strainer 731 and the overspeed trip valve 732 and are used to monitor the gas pressure at this point in the system. Pressure switch 736 is closed if the gas pressure is above a predetermined value, while pressure switches 737 and 738 are open if the pressure is above a predetermined value. A vent valve 739 is connected to the gas delivery line on the outlet side of the overspeed trip valve 732. This valve 739 is closed during normal operation but can be opened to vent the system when the overspeed trip valve 732 is closed.

A further fuel system 740 is provided for the afterburner 16. This fuel system 740 includes an oil delivery system 741 for supplying fuel oil from the tank 702 to the burner elements in the afterburner 16. Starting with the fuel forwarding pump 703 (FIG. 6E), this afterburner oil system 741 includes, in the order named, the low pressure filter 707, a fuel delivery line 742, a main afterburner fuel pump 743, an overspeed trip valve 744, an oil throttle valve 19a and an isolation valve 745. A pressure regulating valve 746 is connected to the oil delivery line on the outlet side of the main fuel pump 743 to maintain a constant oil pressure at this point in the system. The outlet sides of the pressure regulating valve 746 is connected by way of an oil return line 747 and the oil return line 718 to the return inlet on the fuel oil tank 702. Pressure regulating valve 746 is controlled by a pressure controller 748 which responds to the oil pressure in the oil delivery line coming from pump 743.

During normal operation on oil, the overspeed trip valve 744 and the isolation valve 745 are full open, the flow of oil to the afterburner 16 being controlled by the throttle valve 19a. A pressure transmitter 749 generates a signal indicative of the oil pressure in the delivery line from pump 743, while a further pressure transmitter 750 generates a signal indicative of the oil pressure at the inlet to the afterburner 16.

The afterburner fuel system 740 further incudes a gas delivery system 751 for delivering natural gas from the gas supply 700 to the burner elements in the afterburner 16. Starting with the pressure regulator 701 (FIG. 6E), this afterburner gas system 751 includes, in the order named, the strainer 731, the overspeed trip valve 732, a pressure regulator 752, a gas throttle valve 19b and an isolation valve 753. It is noted that the gas overspeed trip valve 732 is common to both the turbine gas system 730 and the afterburner gas system 751. A vent valve 754 is connected on the outlet side of the isolation valve 753 for venting the latter portion of the system when the isolation valve 753 is closed. A pressure transmitter 755 senses the gas pressure at the inlet of the afterburner 16 and produces a signal indicative of the value thereof.

There is associated with the second gas turbine 22 a fuel system 805 (FIG. 6F) which is identical in construction to the fuel system 705 for the first gas turbine 12. This No. 2 gas turbine fuel system 805 includes items 806–839 which are identical in construction and purpose to the corresponding respective ones of items 706–739 in the No. 1 gas turbine fuel system 705. In a similar manner, there is associated with the second afterburner 26 a fuel system 840 (FIG. 6F) which is identical in construction to the fuel system 740 for the first afterburner 16. This No. 2 afterburner fuel system 840 includes items 841–855 which are identical in construction and purpose to the corresponding respective ones of items 741–755 in the No. 1 afterburner fuel system 740. The No. 2 gas turbine fuel system 805 and the No. 2 afterburner fuel system 840 are connected to the gas supply 700 and the fuel oil storage tank 702 in the same manner as the No. 1 gas turbine and afterburner fuel systems 705 and 740.

The second gas turbine and afterburner fuel systems 805 and 840 are operated independently of the first gas turbine and afterburner fuel systems 705 and 740. Thus, among other things, the second gas turbine 22 and the second afterburner 26 can be in operation while the first gas turbine 12 and the first afterburner 16 are out of service, or vice versa.

As shown in FIG. 6E, the combined cycle plant 10 further includes a pair of chemical treatment systems 901 and 902 for injecting various chemicals into the condensate/feedwater/steam systems associated with the first and second heat recovery steam generators 18 and 28 for minimizing corrosion and the buildup of mineral deposits in the boiler tubes, steam drums, storage tanks and the like. The first chemical treatment system 901 is primarily associated with the first steam generator 18 and the second chemical treatment system 902 is primarily associated with the second steam generator 28 though, as will be seen, there is some degree of overlap. The particular chemicals which are injected in the present embodiment are amine (or ammonia), hydrazine and phosphates. As used in FIG. 6E, the letter A denotes amine (or ammonia), the letter H denotes hydrazine and the letter P denotes phosphates.

The first chemical tretment system 901 takes a first fluid sample from a first sample outlet S1 (FIG. 6A) which is located on the feedwater pipe 525 coming from the low pressure storage tank 69, analyzes it and then automatically injects the proper amount of amine (A1) and hydrazine (H1) into the system via the chemical injection inlet CH1 (FIG. 6A) which is also located on the feedwater pipe 525, but upstream of the sample outlet S1. The first chemical treatment system 901 also takes a second fluid sample from the system by way of sample outlet S2 (FIG. 6B) which is connected to the condensate pipe 434 running to the deaerator 68, analyzes it and and then automatically injects the appropriate amounts of amine (A2) and hydrazine (H2) into the system via the chemical injection inlet CH2 (FIG. 6B) which is connected to the condensate pipe 432 located immediately upstream of the condensate pipe 434. Phosphate (P1) is injected into the system by way of a phosphate injection inlet P1 (FIG. 6A) which is located on the feedwater pipe 544 at the inlet to the feedwater reservoir 70a of the steam drum 70. The phosphate injection control is manually in nature. The injection rate is adjusted at periodic intervals by the plant operator after studying the results of the chemical analyses which are automatically performed and recorded by equipment included in the chemical treatment system 901.

The second chemical treatment system 902 (FIG. 5E) is of the same construction as the first chemical treatment system 901. Sample outlet S3 (FIG. 6B) is located on the condensate pipe 435 running to the deaerator 90, while sample outlet S4 (FIG. 6C) is located on the feedwater pipe 625 coming from the storage tank 91. The chemical injection inlet CH3 is located on the condensate pipe 432 (FIG. 6B), while the chemical injection inlet CH4 is located on the feedwater pipe 625 (FIG. 6C). The phosphate injection inlet P2 is located on the feedwater pipe 644 at the inlet of the feedwater reservoir 92a (FIG. 6C).

F. Plant Control System

The plant control system 50 is organized to operate the plant equipment safely through startup and loading with high reliability so that the plant is highly and quickly available to meet power demand from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 9:
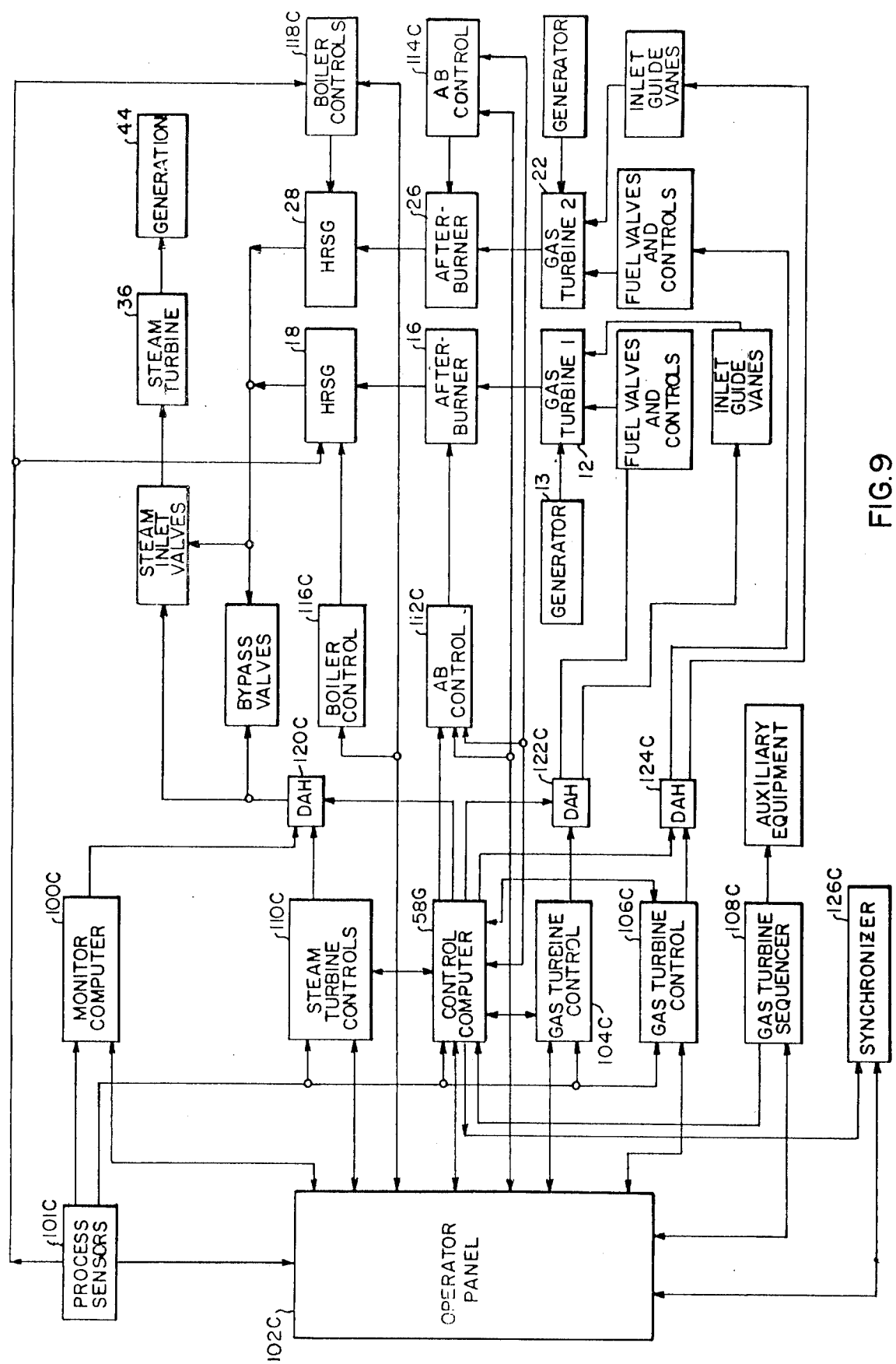
FIG. 9 shows a schematic view of the overall control system arranged to operate the plant shown in FIG. 2.

As shown in FIG. 9, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

Figure 10:
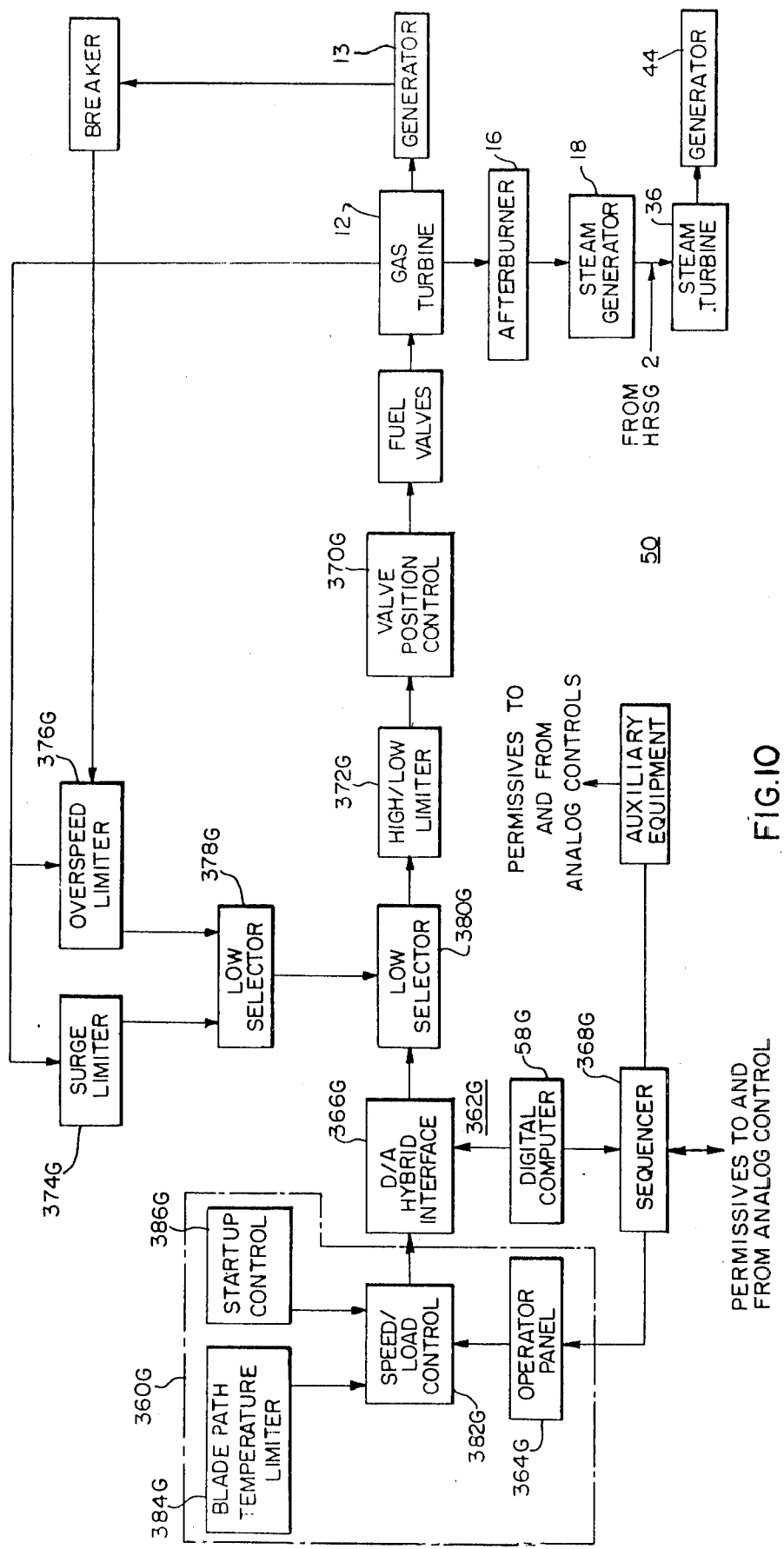
FIG. 10 schematically illustrates the plant control system of FIG. 9.

As shown in FIG. 10, a backup control indicated by box 360G is preferably included with a programmed digital computer automatic control 362G in the plant control system 50 to provide for turbine and plant operation in the event the operator selects the manual or operator analog mode of operation or in the event the computer 58G rejects to backup control. Transfer to backup control can be transacted any time after ignition during startup or load operation.

The manual/automatic status of the plant control system 50 is fixed by operator selection at an operator panel 364G or by a computer rejection to manual. A digital/analog hybrid interface 366G includes manual/automatic logic circuitry to detect when the gas turbine 12 is to be on backup control and to make switching operations which implement the applicable control mode.

In automatic control, the digital computer 58G generates a fuel reference when operating in the coordinated and the operator automatic control levels during speed and load control to function as an automatic speed/load controller, and it initiates turbine startup by a sequencing system 368G under coordinated control. Generally, the sequencer 368G sequences the gas turbine 12 through the startup process by starting and stopping auxiliary equipment when sequencing permissives are generated, and it trips the turbine if certain conditions develop. Further, the sequencer 368G generates logicals for the turbine control, i.e. a master relay on signal, a fuel on signal, a breaker status signal, a fuel select and transfer signal, and a flame on signal.

The digital/analog hybrid interface 366G generates an output fuel demand signal as a valve position reference for a valve position control 370G comprising electropneumatic circuitry which operates a throttle valve included in the fuel supply system for the gas turbine 12. In automatic control, the computer generated fuel demand is based on an automatic startup fuel scheduling program subject to limit action by a computer blade path temperature limit control during startup and further it is based on a computer load control subject to the computer blade path temperature limit control during load operation. A high/low limiter 372G prevents the fuel demand signal from rising to levels which would cause excessive fuel flow and from falling to levels which could cause outfire.

A surge limit control 374G and an overspeed limit control 376G function in all modes of operation directly through the fuel valve positioning control 370G to limit the fuel demand reference for the purpose of avoiding surge operating conditions and turbine overspeed. For more detail on the surge protection system and the overspeed protection system, reference is made to copending and coassigned patent applications Ser. No. 495,739 entitled "A combined Cycle Electric Power Plant and A Gas Turbine Having An Improved Overspeed Protection System" and filed by J. Smith and T. Reed concurrently herewith and Ser. No. 495,715 entitled "A Combined Cycle Electric Power Plant And A Gas Turbine Having An Improved Surge Protection System" filed by J. Smith concurrently herewith.

A low select function 378G transmits the lowest of the surge and overspeed protection limit signals as a limit on the fuel demand from the hybrid 366G. Thus, another low select function 380G imposes a limit on the hybrid fuel demand by transmitting the lowest of the low limit signal from the low select function 378G and the hybrid fuel demand to the throttle valve position control 54. Through low selector operation, surge and overspeed limit control action is imposed bumplessly on the fuel control channel.

In the operator analog mode, a speed/load control 382G functions in response to pushbutton increase or decrease signals from the operator panel 364G to generate the fuel demand signal at the output of the hybrid interface 366G. The speed/load control 382G thus functions in the backup mode as a feedforward fuel reference generator without integrator or other controller acton like that often employed in feedback type speed/load controls for power plant gas turbines. The feedforward fuel demand from the backup speed/load control 382G is applied substantially directly to the valve position control 370G to provide direct turbine responses proportional to fuel demand changes made by the operator. Accordingly, the plant operator is provided with a good feel for the plant operation. Further, protection system actions are imposed at points in the control circuitry between the operator and the turbine to prevent unsafe operator actions. Preferably, the limit controls are adjusted to produce the limit actions needed for safe turbine operation while permitting the speed/load control 382G to be the controlling element under normal operating conditions in the manual or operator analog mode.

A blade path temperature limit control 384G functions only in the manual or operator analog mode to limit bumplessly the output signal from the speed/load control 382G as required to prevent excessive blade path temperature and in turn excessive turbine inlet gas temperature. For more detail on the preferred blade path temperature protection system, reference is made to a copending and coassigned patent application entitled "A Combined Cycle Electric Power Plant And A Gas Turbine Having Improved Exhaust Temperature Limit Control" and filed by J. Smith and T. Reed concurrently herewith.

If the turbine is to be started in the manual or operator analog mode or if the automatic control rejects to manual during the startup mode, the gas turbine startup is smoothly completed by the operation of a startup control 386G which generates a feedforward speed reference function. More disclosure on that subject is set forth in another copending and coassigned patent application W.E. 44,523 entitled "A Combined Cycle Electric Power Plant And A Gas Turbine Having An Improved Startup Control Especially Useful In A Backup Control System" filed by J. Smith and T. Reed concurrently herewith.

As a result of the functioning of the feedforward speed/load control 382G in the control system 50, the gas turbine 12 can be safely, reliably and flexibly started and loaded by the operator on operator selection of the manual or operator analog mode or on computer rejection to the backup mode. Direct coupling of the speed/load control 382G to the valve position control 370G with substantially only signal transmittal functions therebetween helps to make this possible. Thus, no controller delays are introduced into the forward control channel functioning by the switching and converting functions provided by the hybrid interface 366G nor by the switching functions provided by the selector 380G and the high/low limiter 372G.

The plant apparatus elements all can function more continuously to have better availability for power generation because gas turbine can function as a more available heat source and power generator for the plant through the functioning of the control system 50 with the backup control 360G.

G. Inlet Guide Vane Control Apparatus

Figure 11:
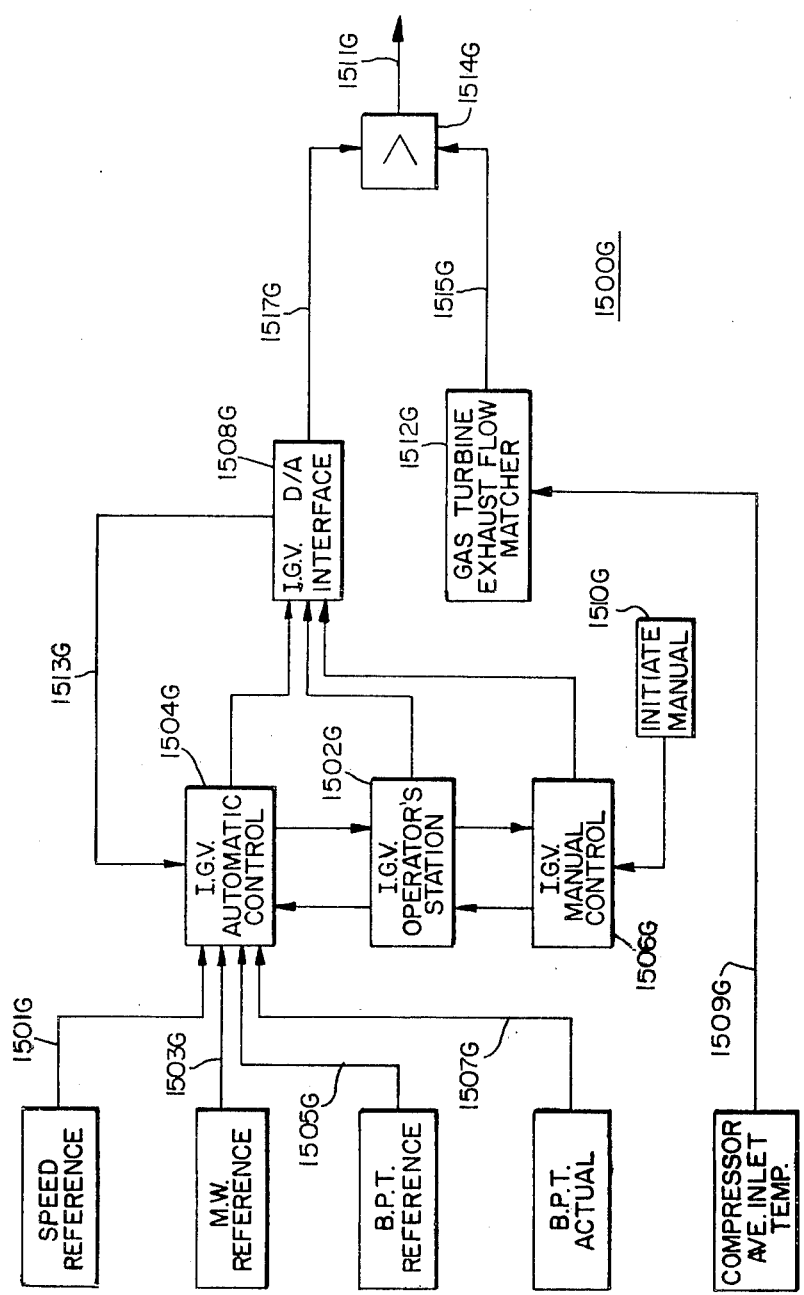
FIG. 11 schematically illustrates the functional relationships of inlet guide vane control apparatus arranged in accordance with the principles of the coordinated control of the present invention.
Figure 14:
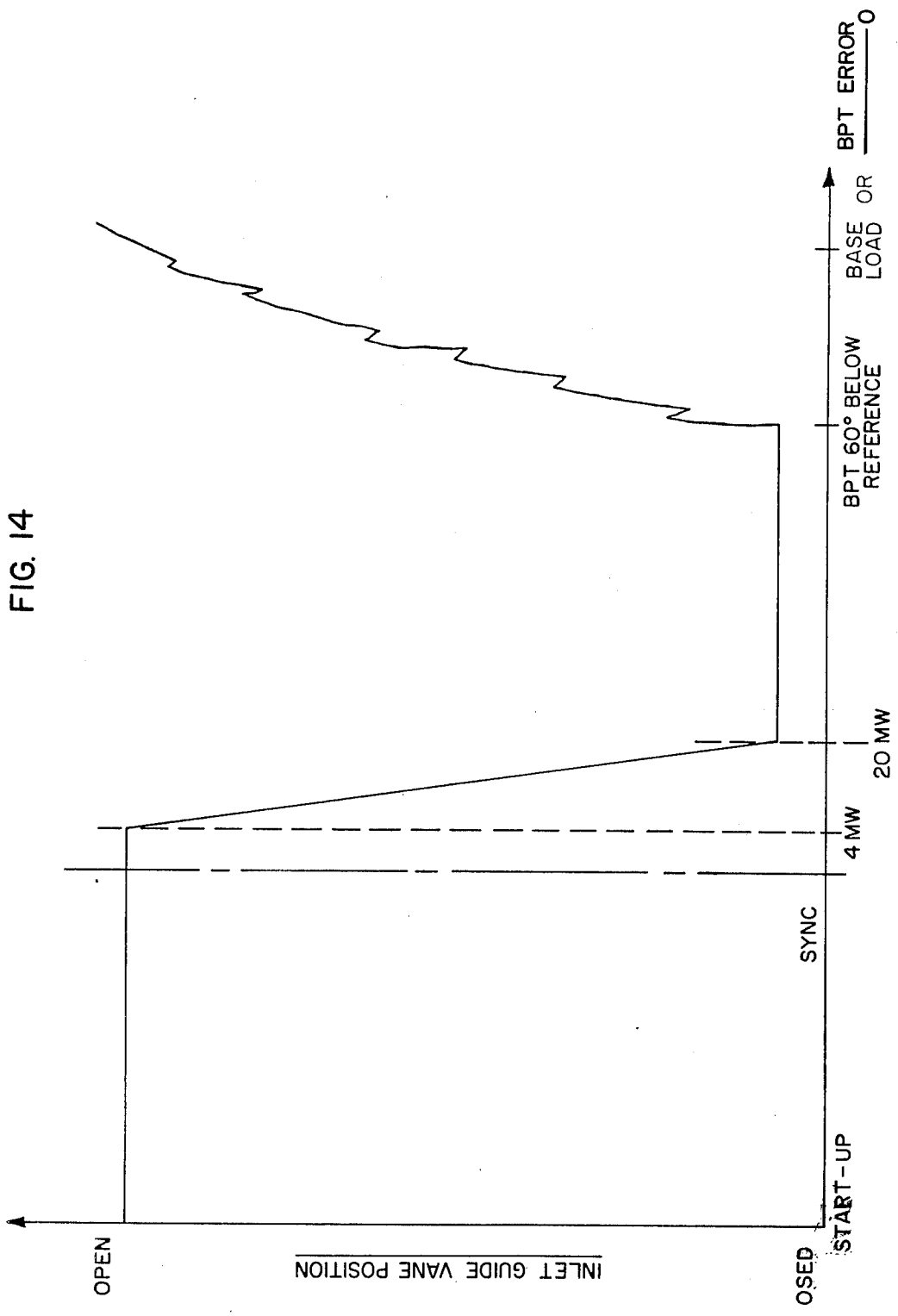
FIG. 14 graphically illustrates the position of the inlet guide vanes from start-up to base load under automatic control of the apparatus as shown in FIG. 11.

The variable inlet guide vane mechanism 15 previously described in connection with the gas turbine 12 is controlled by an inlet guide vane control apparatus 1500G which is illustrated in FIG. 11. The inlet guide vane control apparatus 1500G includes an inlet guide vane operator's station 1502G, an automatic control block 1504G and a manual control block 1506G. As shall be hereinafter discussed in greater detail, the inlet guide vane control apparatus 1500G is operable either in an automatic or a manual mode. Further, the inlet guide vane control apparatus 1500G, as is graphically illustrated in FIG. 14, is operable from startup to achievement of base load for its associated gas turbine 12.

The operator'station 1502G is cross-coupled to both the automatic and manual control blocks 1504G and 1506G, respectively. In addition, the operator's station 1502G, the automatic control block 1504G and the manual control block 1506G are connected to the inlet guide vane manual/automatic interface block 1508G which, in turn, outputs on line 1517G a control signal for determining the position of the inlet guide vanes of gas turbine 12. The output control signal from interface block 1508G is determined by a selected or forced mode of operation of the inlet guide vane control apparatus 1500G.

A speed reference signal, a megawatt reference signal, a blade path temperature reference signal and the actual blade path temperature signal are fed via lines 1501G, 1503G, 1505G and 1507G, respectively, to the automatic control block 1504G. In response thereto, the automatic control block 1504G develops a control signal which is either speed, load or temperature dependent, depending generally upon the degree of loading achieved at the time a particular control signal is developed. The control signal developed by the automatic control block 1504G is subsequently fed to the inlet guide vane actuator mechanism 215 via the inlet guide vane manual/automatic interface block 1508G, line 1517G, high select block 1514G and line 1511G. The manual control block 1506G also develops a control signal for manually positioning the inlet guide vanes, which signal is also forwarded in a simiar manner to output line 1511G and the actuator mechanism 215.

Under certain conditions, the inlet guide vane control apparatus 1500G will be placed in the manual mode of operation either by operator action or by reason of a manual mode initiate signal developed in block 1510G. When this occurs, the control signal generated in manual control block 1506G is the signal forwarded to actuator mechanism 215. On the other hand, if the inlet guide vane control apparatus 1500G is operating in the automatic mode, the the control signal developed by the automatic control block 1504G is the one that is ultimately utilized to position the inlet guide vanes via the action of the actuator mechanism 215. The control signals developed in the automatic and manual blocks 1504G and 1506G, respectively, are forwarded to line 1511G through the inlet guide vane manual/automatic interface block 1508G. Line 1513G provides a feedback path from the inlet guide vane manual/automatic interface block 1508G so that the automatic control block 1504G is constantly updated and advised as to the value of the analog control signal being forwarded to the inlet guide vane actuator mechanism 215. Thus, for tracking purposes, even though the inlet guide vane control apparatus 1500G may be in the manual mode of operation, the automatic control block 1504G is constantly appraised of the magnitude of the manual control signal and is thereby able and ready to assume operational command.

Gas turbine exhaust flow matching is provided by block 1512G in response to a compressor average inlet temperature signal received via line 1509G. This block is employed in order to prevent increased mass flow from the gas turbine exhaust to its associated steam generator 18, which increased mass flow would result in the generation of lower temperature steam whenever less than an optimum ambient temperature level exists. To prevent this from occurring, the gas turbine exhaust flow matcher 1512G develops a guide vane control signal which is forwarded via line 1515G to high select block 1514G. Normally, the inlet guide vane control signal received by the high select block 1514G from the manual/automatic interface block 1508G will be higher than the control signal received from the gas turbine exhaust flow matcher 1512G. Consequently, high select block 1514G will pass, via line 1511G to actuator mechanism 215, the signal received from the manual/automatic interface block 1508G. However, whenever the ambient temperature or the compressor inlet temperature level falls below the predetermined optimal point and the turbine closes in on synchronous speed, the inlet guide vane control signal developed by the gas turbine exhaust flow matcher 1512G will be the higher of the two signals received by the high select block 1514G. In such a case, the high select block 1514G will pass the higher signal developed by the gas turbine exhaust flow matcher 1512G to actuator mechanism 215. When this occurs, the inlet guide vanes are kept open even though the automatic or manual mode of operation would otherwise call for partial or full closure. In this manner, at lower ambient temperature levels, and as the gas turbine approaches synchronous speed or is being loaded, the exhaust flow from the gas turbine 12 is matched to the requirements and operating criteria of the steam generator 28 with which it is associated.

The inlet guide vane control apparatus 1500G illustrated in FIG. 10 controls the operation of the variable inlet guide vane mechanism 15 located at the air intake end of the gas turbine 12. Identical control apparatus is provided for the gas turbine 22 and its associated variable inlet guide vane mechanism 25. Consequently, no further discussion of the inlet guide vane control apparatus associated with turbine 22 is necessary. It should also be noted that while the following description of the preferred embodiment of the inlet guide vane control apparatus 1500G illustrates the use of a combined digital and analog system, modifications and alterations thereof may be embodied or implemented in other form.

H. Inlet Guide Vane Control Apparatus—Automatic Mode Functional Description

As previously noted, the inlet guide vane control apparatus 1500G is capable of operation in an automatic mode. The following discussion presents the details of the automatic mode of operation. It should be noted, that while the following description of the preferred embodiment of the automatic mode of operation is implemented in a digital manner, that alternative implementation or modifiction thereof is within the reach of one having ordinary skill in the art.

Figure 12:
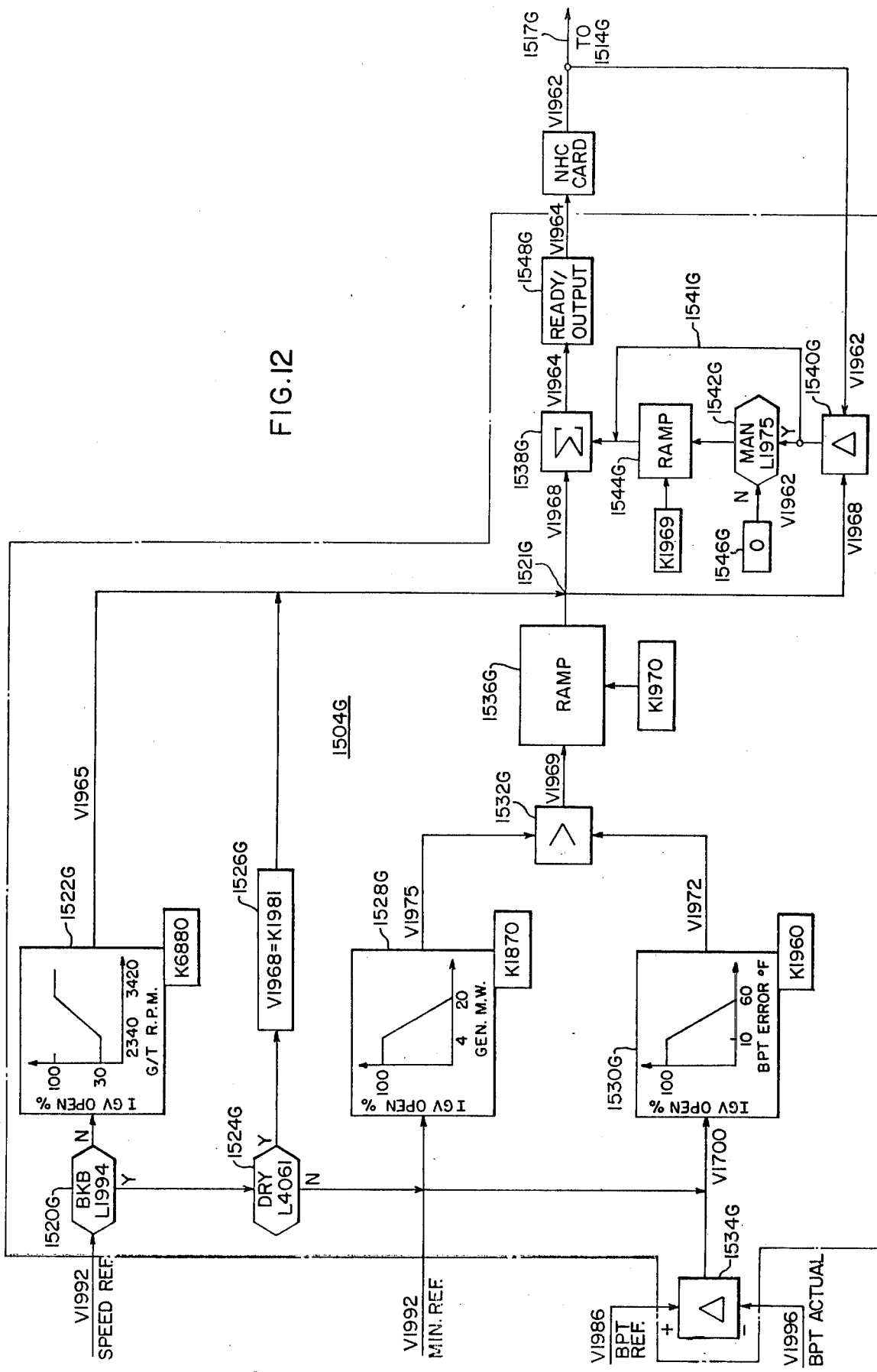
FIG. 12 represents a functional illustration of the automatic mode operational elements of the control apparatus as shown in FIG. 11.
Figure 13:
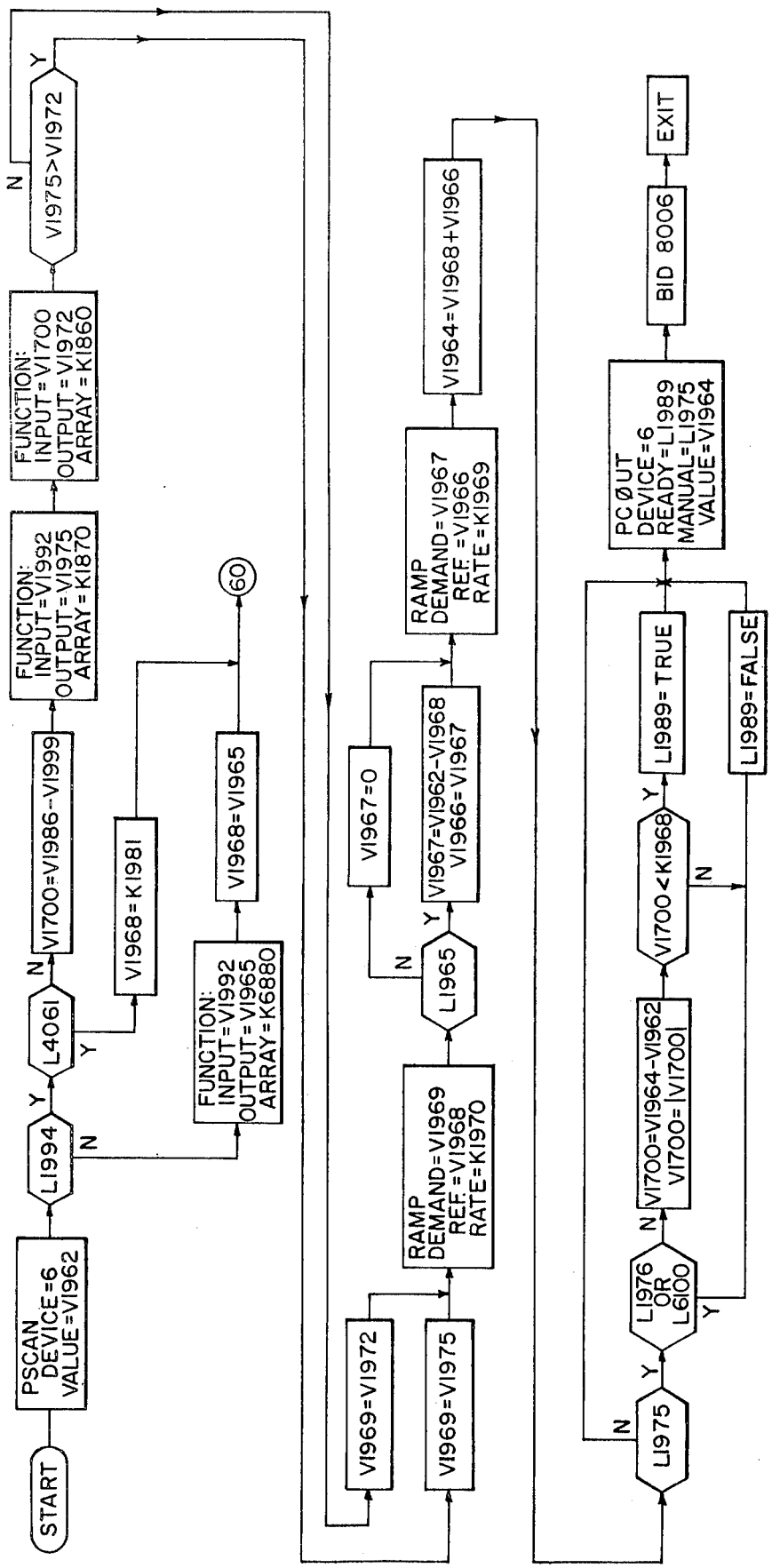
FIG. 13 is a flow chart representation of the functional operation illustrated in FIG. 12.

The functional and operational interaction of the various elements of the inlet guide vane automatic control block 1504G are illustrated in FIG. 12. From the point of startup, automatic control block 1504G receives a speed reference signal denominated as the process real variable V1992. If the breaker flip-flop L1994 has not been set, then decision block 1520G is exited NO, to speed characterizing block 1522G. As can be seen from the curve drawn within that block, the inlet guide vanes are held at 30 percent fully open until a speed of 2340 rpm is reached by the gas turbine. When that speed is reached, the guide vanes are ramped further open until a speed of 3420 rpm, or 92 percent of sync speed, is reached at which time the guide vanes will be 100 percent open. The guide vanes are then held at the 100 percent open position until such time as different action is dictated by other elements within the automatic control block 1504G as will be hereinafter explained. The curve shown in the speed characterizing block 1522G is determined by the array K6880. The characterized signal is denominated as a process real variable V1965. If the gas turbine is operating within the initial startup period to 92 percent synchronous speed, then the process real variable V1965 is equal to V1968 at point 1521G.

If decision block 1520G indicates that the breaker has been closed, that synchronization has been reached, then decision block 1524G is interrogated to determine the status of the process logical variable L4061, the dry boiler contact input. If the boiler is, in fact, found to be dry, decision block 1524G is exited via the YES line and V1968 is set equal to K1981 in block 1526G. K1981 is a constant which reflects a fully open inlet guide vane position for dry boiler operation. The output from block 1526G is forwarded to point 1521G.

If the interrogation of block 1524G results in a determination that the boiler is not being operated in a dry condition, then a megawatt reference signal denominated as V1992 is inputted to the characterizing block 1528G. As shown in FIG. 12, block 1528G includes a curve generated by array K1870, the curve determining the inlet guide vane position for the degree of generator loading. As illustrated, the guide vanes are kept at a 100 percent open position until a four megawatt loading point is reached. From there to 20 megawatts, the inlet guide vanes are ramped closed until they reach the fully closed position. This modulation of the inlet guide vanes is graphically depicted in FIG. 14. The output signal or the megawatt characterized inlet guide vane positioning signal V1975 which results are forwarded from block 1528G to a high signal select block 1532G.

After the dry boiler interrogation has taken place and has been answered in the negative, the input V1700 to block 1530G, the blade path temperature error characterizing block, is also actuated. Input V1700, an internal real variable, is generated by taking the difference between the blade path temperature reference V1986 and the actual blade path temperature V1996 in difference block 1534G. The difference or error between the blade path reference and actual signals is forwarded from block 1534G, as V1700, to block 1530G. As is illustrated in FIG. 12, block 1530G develops a curve through the use of array K1860 which characterizes signal V1700 as a function of the blade path temperature error signal. Thus, as is shown therein, the inlet guide vanes are kept 100 percent open as the blade path temperature error decreases from 10° Fahrenheit to zero. The guide vanes are ramped from a closed position to a fully open position as the blade path error temperature signal decreases from 60° to 10° Fahrenheit. Alternatively stated, the inlet guide vanes are kept closed until the blade path temperature error signal represents a difference of 60°. At that point, the inlet guide vanes are ramped from a closed to an open position until the error reaches 10°, at which time the inlet guide vanes are fully open and maintained so as the error diminishes to zero. As is shown in FIG. 14, the guide vanes are kept closed from the point at which generator loading reaches 20 megawatts to the point at which the blade path temperature error signal represents a difference of 60° between the reference signal V1986 and the actual blade path temperature signal V1996. When the 60° difference point is reached the guide vanes begin to open. Due to the fact that the blade path temperature error does not uniformly change in one direction the period between the point at which a 60° difference is reached and base load loading is achieved, is characterized, as shown in FIG. 14, by a series of jagged lines when the inlet guide vanes are modulated or controlled by the output control signal which exits characterizing block 1530G as V1972. V1972, the inlet guide vane positioning signal developing block 1530G, is forwarded therefrom to the high signal select block 1532G.

The high signal select block 1532G compares signal V1975, the megawatt characterize guide vane positioning signal, and signal V1972, the blade path temperature error characterized inlet guide vane positioning signal, and selects the higher one of the two. As will be visually appreciated from FIG. 14 and the prior discussion, the high select block 1532G will be passing as signal V1969, the higher signal V1975, that signal generated by block 1528G during the period of operation from a four megawatt loading point until such time as the 60° differential between the blade path temperature reference signal and the actual blade path temperature is reached. At that point, the automatic control block 1504G begins to control in accordance with the characterization imposed by the blade path temperature error curve which is nested in block 1530G.

Because the signals V1972 and V1975 for modulating the position of the inlet guide vanes can undergo appreciable swings, in the order of 10 to 20 percent, a filtering or damping action is required. Consequently ramp block 1536G receives the guide vane positioning control signal V1969 and ramps this signal at a rate determined by K1970 so that swings thereof in either direction are damped or filtered to reduce their effect on the inlet guide vanes. Without such damping by the ramp block 1536G, the resultant abrupt and significant movement of the guide vanes will shock the turbine resulting in deleterious performance and possible turbine damage. The output of the ramped inlet guide vane positioning signal is denominated as V1968 and passes through point 1521G.

From point 1521G the guide vane positioning signal V1968 is passed to summing block 1538G and differencing block 1540G. At this time, the mode status of the inlet guide vane control apparatus 1500G is interrogated in decision block 1542G. If the control apparatus 1500G is in the automatic mode, or alternatively not in the manual mode, then a zero level signal is outputted by the constant generating block 1546G and forwarded to ramp block 1544G. Ramp block 1544G drives its output then to zero at a rate dictated by K1969 and adds the resultant value to the inlet guide vane positioning signal V1968 at the summing block 1538G. If the control apparatus 1500G is in the manual mode of operation block 1542G passes to the ramp block 1544G, a difference signal V1967 which represents the desparity between V1962, the actual signal being fed to the inlet guide vane actuating mechanism 215, and V1968, the inlet guide vane positioning signal developed by the automatic control block 1504G. Difference signal V1967 is generated in the differencing block 1540G. The difference signal V1967 is fed to the input of ramp block 1544G and primes that block for subsequent operation when control system 1500G is transferred to the automatic mode of operation. As will be noted in FIG. 12, the inlet guide vane bias signal V1967 is also passed via line 1541G directly to the output of ramp block 1544G and one input of the summing block 1538G. Consequently, the output signal V1964 from summing block 1538G represents the total of the tracking bias signal V1967 and the inlet guide vane positioning control signal V1968 at all times.

If control apparatus 1500G is in the automatic mode of operation, block 1542G passes a zero signal from block 1546G to the input of ramp block 1544G. Ramp block 1544G then reduces the inlet guide vane bias signal V1967 at a rate of 10 percent per minute towards zero. While this is occurring, the inlet guide vane bias signal is not passed to the output of the ramp block 1544G via line 1541G. Consequently, when in the automatic mode of operation, the output of summing block 1548G represents the sum of the inlet guide vane control signal V1968 and the decreasing tracking bias signal developed by the ramp 1544G.

If the control apparatus 1500G is in the automatic mode of operation signal, V1964 is passed through the ready output block 1548G directly to the input of inlet guide vane manual/automatic interface block 1508G. From there the inlet guide vane positioning signal is passed to the high select block 1514G as previously mentioned in connection with FIG. 11. If the control apparatus is in the manual mode of operation, then the ready/output block 1548G forwards a signal to the manual/automatic interface block 1508G to prime it for automatic mode operation to enable an indicator light at the operator's station 1502G which visually informs the operator that control can be transferred to the automatic mode.

FIG. 12 illustrates a lower level and more detailed arrangement of the automatic control block 1504G. The flow chart shown in FIG. 12 corresponds to the functional arrangement depicted in FIG. 11. The flow and utilization of the various real and logical variables employed therein as well as the different constants used in the flow chart is illustrated in FIG. 12. As previously mentioned, it will be readily apparent to one having skill in this art that the automatic control block 1504G, as depicted functionally and in a flow chart manner in FIGS. 11 and 12, is susceptable of many modifications and alterations including alternative implementation without departing from the spirit and scope of the present invention.

I. Inlet Guide Vane Control Apparatus—Manual Mode Functional Description

As previously noted, the inlet guide vane control apparatus 1500G is capable of operation in a manual mode. The following discussion presents the details of the manual mode of operation. It should be noted, that while the following description of the preferred embodiment of the manual mode of operation is generally implemented in an analog manner, alternative implementation or modification thereof is within the reach of one having ordinary skill in the art.

The functional and operational interaction of the various elements of inlet guide vane manual control block 1506G is illustrated in FIGS. 14A and 14B. It will be assumed, for discussion purposes, that the inlet guide vane control apparatus 1500G will be used to manually modulate the position of the guide vanes of gas turbine 12 from startup to base load conditions.

At startup, the operator will actuate manual pushbutton 1550G which is located at the inlet guide vane operator station 1502G. Once depressed or actuated, the manual pushbutton 1550G forwards a logical HI signal to the manual mode gate 1554G. This action sets the output of gate 1554G HI and, in turn, sets the output of OR gates 1556G to a logical HI. When this occurs, the input to the inlet guide vane manual-/automatic interface block 1508G is set. This action places the interface block 1508G in a manual mode condition and causes the manual output thereof to be set to a logical HI. When the manual output of the interface block 1508G is set HI, it causes the input to decision block 1560G to be likewise set which, in turn, forwards a logical HI signal to the inlet guide vane automatic control block 1504G (or the control computer) to inform it that the inlet guide vane control apparatus 1500G has been set to operate in the manual mode. At the same time, when the manual output of interface block 1508G is set HI, one input to AND gate 1558G is also set to a logical HI. Another input to AND gate 1558G is set HI through inversion gate 1568G, which reflects the fact that the inlet guide vane control apparatus 1500G has not been set to operate in the automatic mode of operation.

At startup, the analog center forwards a signal to OR gate 1556G, which input reflects the fact that turbine speed is less than 92 percent of synchronous speed. When this condition obtains, the output of OR gate 1556G is set HI, thereby setting the final input to AND gate 1558G to a logical HI. This causes the output of AND gate 1558G to be set HI which sets the inlet guide vane open contact of the interface block 1508G and primes it for subsequent action. In addition, when the output of AND gate 1558G is set HI, the output of the OR clock gate 1570G is also likewise set, which results in the internal clock of interface block 1508G being started. As a result, an analog output signal is generated which varies at a rate determined by the clock rate of the previously mentioned internal clock. The output from the interface block 1508G is passed via voltage-to-voltage isolation block 1572G and line 1517G to the high select block 1514G.

When the output of AND gate 1558G is set HI in the manner previously described, it also causes one input to OR gate 1574G to be similarly set, thereby causing indicator lamp 1564G at the operator station 1502G to be illuminated. This visually informs the operator that the guide vanes are being opened. When the gas turbine reaches 92 percent speed, the input line to OR gate 1556 changes state to a logical LO thereby disabling AND gate 1558G. As a result, the guide vanes will remain at the position they have reched due to the prior action of the open guide vane demand generated for the period between startup and the attainment of 92 percent gas turbine speed. When AND gate 1558G is disabled, it causes the output of OR gate 1574G to be set to a logical LO extinguishing indicator lamp 1564G. At this point then, the operator is aware that the guide vanes have been set to an open position corresponding to the attainment of 92 percent of synchronous speed by the gas turbine. To further open the guide vanes if necessary, the operator can now depress or actuate pushbutton 1562G on the operator's station 1502G.

When pushbutton 1562G is depressed, it causes the other input to OR gate 1556G to be set to a logical HI and as a result, enables AND gate 1558G in the manner previously described. In consequence thereof, the open demand line is set HI, the "open" input to interface block 1508G is set and the internal clock thereof is started, In addition, as also previously described, indicator light 1564G is illuminated by the toggling of OR gate 1574G. It should be noted that as soon as the operator lifts his finger from the pushbutton 1562G, OR gate 1556G will be disabled, the open guide vane demand signal will go to zero and the indicating light 1564G will go out. When the upper limit or the fully open position of the inlet guide vanes has been reached, an apropriate signal indicative thereof is generated in the interlamp 1564G at the operator station 1502G to be illuminated. This visually informs the operator that the guide vanes are being opened. When the gas turbine reaches 92 percent speed, the input line to OR gate 1556 changes state to a logical LO thereby disabling AND gate 1558G. As a result, the guide vanes will remain at the position they have reached due to the prior action of the open guide vane damand generated for the period between startup and the attainment of 92 percent gas turbine speed. When AND gate 1558G is disabled, it causes the output of OR gate 1574G to be set to a logical LO extinguishing indicator lamp 1564G. At this point then, the operator is aware that the guide vanes have been set to an open position corresponding to the attainment of 92 percent of synchronous speed by the gas turbine. To further open the guide vanes if necessary, the operator can now depress or actuate pushbutton 1562G on the operator's station 1502G.

When pushbutton 1562G is depressed, it causes the other input to OR gate 1556G to be set to a logical HI and as a result, enables AND gate 1558G in the manner previously described. In consequence thereof, the open demand line is set HI, the "open" input to interface block 1508G is set and the internal clock thereof is started. In addition, as also previously described, indicator light 1564G is illuminated by the toggling of OR gate 1574G. It should be noted that as soon as the operator lifts his finger from the pushbutton 1562G, OR gate 1556G will be disabled, the open guide vane demand signal will go to zero and the indicating light 1564G will go out. When the upper limit or the fully open position of the inlet guide vanes has been reached, an appropriate signal indicative thereof is generated in the interface block 1508G and is forwarded from the "upper limit" terminal thereof to the other input of OR gate 1574G. This will turn on the indicating light 1564G, even though the pushbutton 1562G has been deactuated. Thus, when the upper limit or fully open position is reached by the inlet guide vanes the operator is made aware of this fact by the continued illumination of lamp 1564G even though pushbutton 1562G is no longer being depressed to call for further opening action.

In the manual mode of operation, unlike the automatic mode of operation, it is the operator's responsibility to close down the inlet guide vanes after synchronization and minimal loading has been achieved. Thus, referring to FIG. 14, once the guide vanes have reached their fully open position and the 4 megawatt loading point have been reached, the operator so informed by the previously described indicating meters and/or indicating lamps will start to close down the inlet guide vanes until the 20 megawatt loading point is reached. At that time the operator will manually maintain the inlet guide vanes in a closed position until a point is reached at which the actual blade path temperature increases to within 60° of the blade path temperature reference. This point occurs at approximately 50 megawatts below base load, although this may vary according to ambient conditions.

In order for the operator to close or modulate the inlet guide vanes once the 4 megawatt loading point is reached, he will depress the close pushbutton 1578G which is physically located at the operator station 1502G. When this occurs, one input to AND gate 1578G is set HI, as is a second input thereto by the action of inversion gate 1576G, which action reflects the fact that AND gate 1558G is disabled. The third and final input to AND gate 1578G is set HI by the fact that the manual pushbutton 1550G has been actuated and the inlet guide vane control apparatus 1500G is in the manual mode of operation. With all three inputs set to a logical HI, AND gate 1578G is enabled which triggers the clock gate 1570G in a manner similar to that previously described for the open pushbutton 1562G operation and also sets the "close" input to the interface block 1508G. In addition, when AND gate 1578G is enabled, it sets one input to OR gate 1582G which, in turn, illuminates or turns on the indicating lamp 1580G associated with pushbutton 1578G. This serves as a visual indication to the operator that the requested action of closing the inlet guide vanes is being accomplished. When the lower limit or fully closed position of the inlet guide vanes has been reached, the interface block 1508G generates a signal indicative thereof which is forwarded to OR gate 1582G. Now, also as in the manner previously described with respect to the indicating lamp 1564G, indicating lamp 1580G is maintained in a lit state even though the operator may have lifted pushbutton 1578G. This action visually informs the operator that the lower limit or fully closed position of the inlet guide vanes has been reached and that further depression or actuation of the close pushbutton 1578G is no longer needed.

Figure 15A:
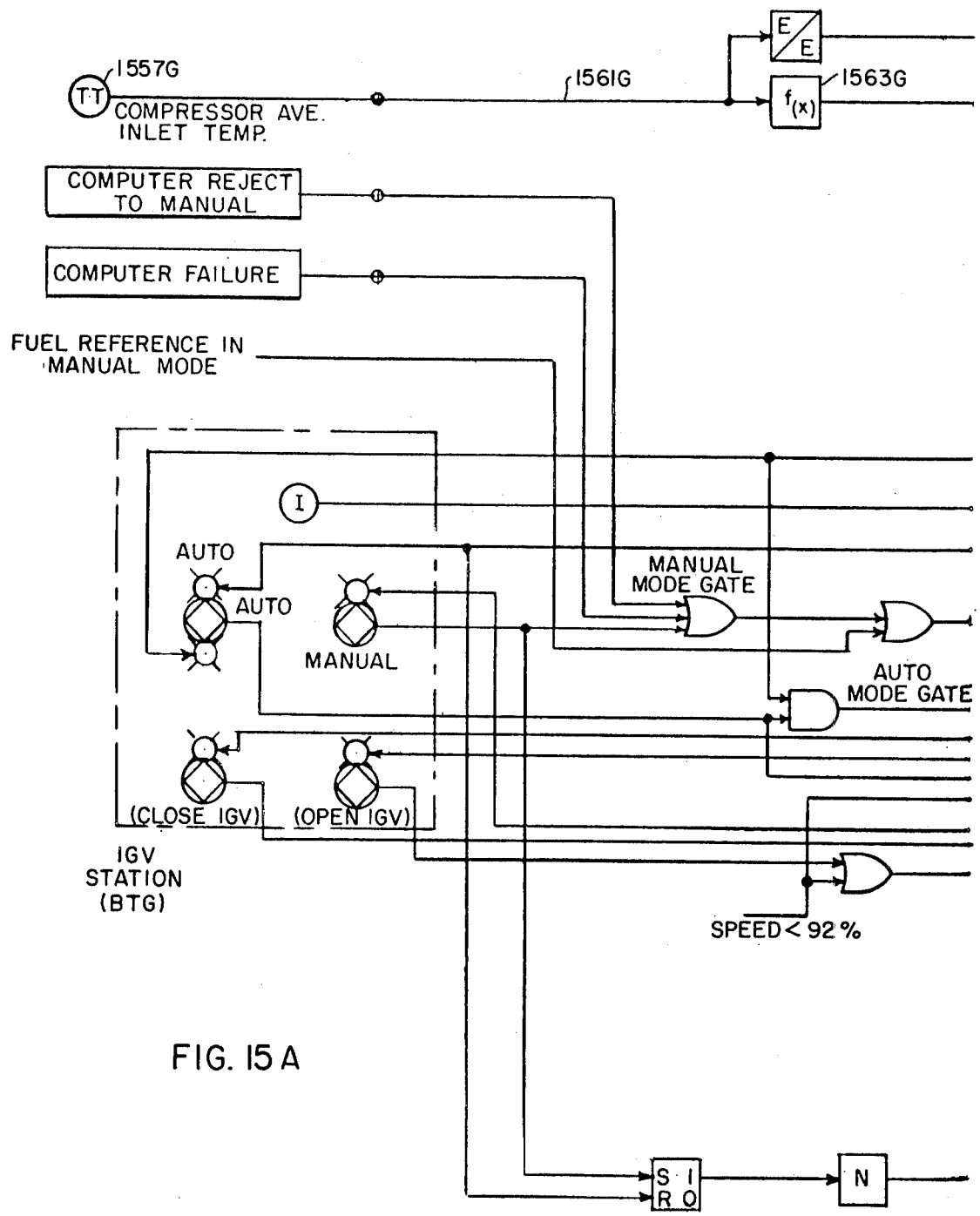
FIGS. 15A, 15B and 15C functionally illustrate the operation of the MANUAL mode of the apparatus shown in FIG. 11.

The manual mode of operation for the inlet guide vane control apparatus 1500G may also result from the enabling of manual mode gate 1554G for a reason other than actuation of the manual pushbutton 1550G. As is shown in FIGS. 15A, B and C, for example, if the inlet guide vanes were being controlled in the automatic mode and a computer failure occured, a computer reject to manual signal would be generated thereby setting one of the inputs to manual mode gate 1554G to a logical HI causing the inlet guide vane control apparatus 1500G to be shifted from the automatic to the manual mode of operation. Similarly, computer failure itself may cause another input of the manual mode gate 1554G to be set to a logical HI also causing a shift from automatic to manual mode of operation. In addition, if the fuel reference or control has been placed in its manual mode of operation, another input to OR gate 1556G is set to a logical HI which again results in a transfer of the inlet guide vane control apparatus 1500G to its manual mode of operation.

The inlet guide vane positioning signal is forwarded from the "analog" output of the interface block 1508G via line 1517G to the high signal select block 1514G. Assuming that this is the higher of the two signals received by HI select block 1514G, it is passed via line 1511G and the voltage-to-current isolating block 1582G to the inlet guide vane actuating mechanism 215. The signal which appears on line 1511G is also fed back to the operator's station 1502G, via the voltage-to-voltage isolation block 1584G. It is received at the operator's station 1502G and utilized to actuate indicator 1586G, which gives the operator a visual indication of the position of the inlet guide vanes since it is calibrated in degrees of position thereof.

Alternatively, at startup, the operator may choose to have the inlet guide vanes positioned automatically. Once he ascertains by reference to the ready light 1594G that automatic control is possible, he will depress the automatic mode pushbutton 1588G. As previously noted in the foregoing discussion of the operation of the inlet guide vane automatic control block 1504G, ready light 1594G is illuminated by the interface block 1508G to visually indicate to the operator that the inlet guide vane control apparatus 1500G can be placed in its automatic mode of operation. Actuation of the automatic mode pushbutton 1588G sets one input of the automatic mode gate 1592G to a logical HI. The other input of the automatic mode gate 1592G has already been set HI by the same signal which enables the ready light 1594G. As a result of this action, the output of the automatic mode AND gate 1592G is set HI causing the "auto" input to interface block 1508G to be set. This action, in turn, causes an auto signal to be generated by the interface block 1508G, which signal is returned to the operator's station 1502G and employed thereat to enable indicating lamp 1590G which visually informs the operator that the inlet guide vane control apparatus 1500G is now operating in its automatic mode.

In automatic operation, if the inlet guide vane automatic control block 1504G (the control computer) does not update the interface block 1508G within a predetermined time period, the control apparatus 1500G is returned to the manual mode of operation by an internal keep-alive circuit housed within the interface block 1508G. This return to the manual mode of operation is accomplished in the following manner. When the manual pushbutton 1550G is depressed, in addition to the action previously described as a result thereof, the set input of flip-flop 1591G is actuated causing the output thereof to be set to a logical HI. As a result, signal inversion block 1593G forwards a logical LO to one input of AND gate 1595G. The other input to AND gate 1595G reflects the state or mode of operation of the inlet guide vane control apparatus 1500G. When the keep-alive circuit is actuated as a result of not having received an update within the allowed time period, the interface block 1508G outputs a signal on its "manual" line which sets the second input to AND gate 1595 to a logical HI. Simultaneously, the "auto" output of the interface block 1508G is reset from a logical HI to a logical LO. This causes the reset input to flip-flop 1591G to be triggered which, in turn, causes the output thereof to be set to zero or a logical LO. When this occurs, the inversion action of block 1593 sets the other input of AND gate 1595 to a logical HI and enables AND gate 1595G since its other input has previously been set HI by the action of the keep-alive circuit. Once enabled, AND gate 1595G forwards a logical HI signal through decision block 1597G which informs the automatic control block 1504G that an unrequested manual mode call has been made. This alarms the inlet guide vane automatic control block 1504G so that it may be made aware of the fact that transfer to manual mode of operation has occurred. Once the automatic control block 1504G has finished whatever housekeeping chore might have prevented the updating of the interface block 1508G, the inlet guide vane control apparatus is made ready for a return to the automatic mode of operation.

Figure 15B:
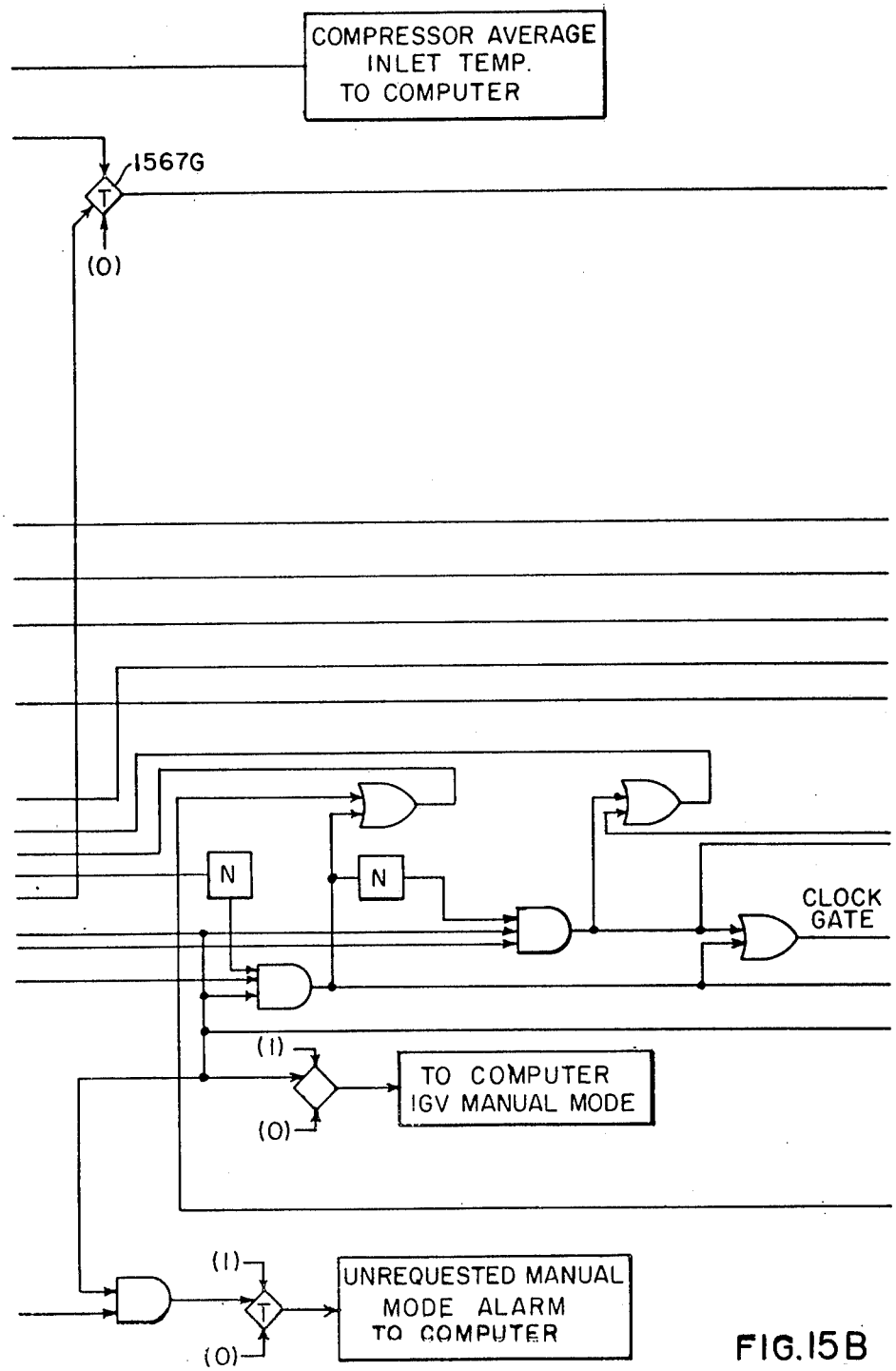
Figure 15C:
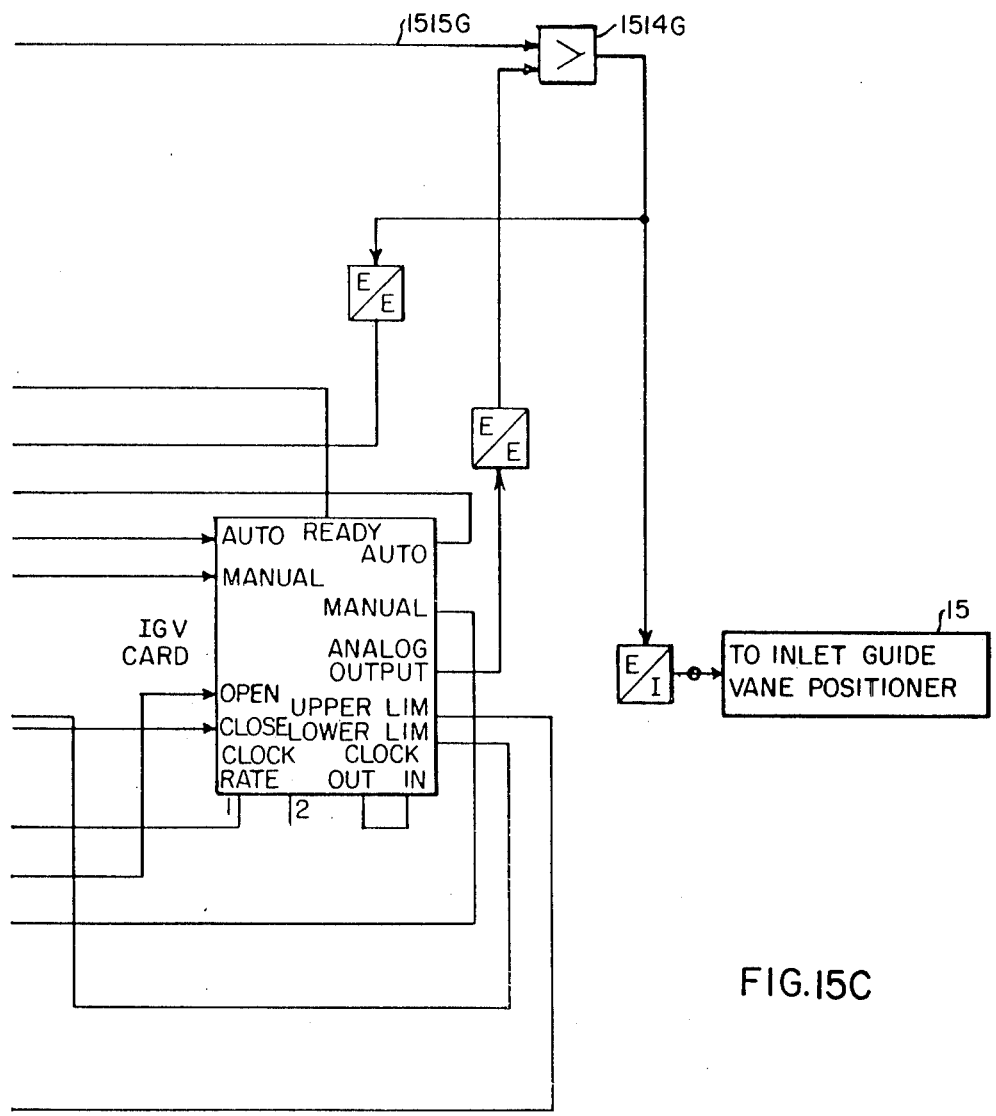

As previously explained, FIGS. 15A, B and C illustrate the interconnection and functional cooperation of the various elements which assist in or comprise the manual control block 1506G of the inlet guide vane control apparatus 1500G. A more detailed and exhaustive illustration of the electromechanical interconnections and wiring can be found in FIGS. 15A, 15B and 15C of the above-identified application Ser. No. 495,727, incorporated herein by reference. Reference may be had thereto for the mechanics of interconnection wiring and such other selected details.

J. Inlet Guide Vane Control Apparatus—Gas Turbine Exhaust Flow Matching

Figure 16A:
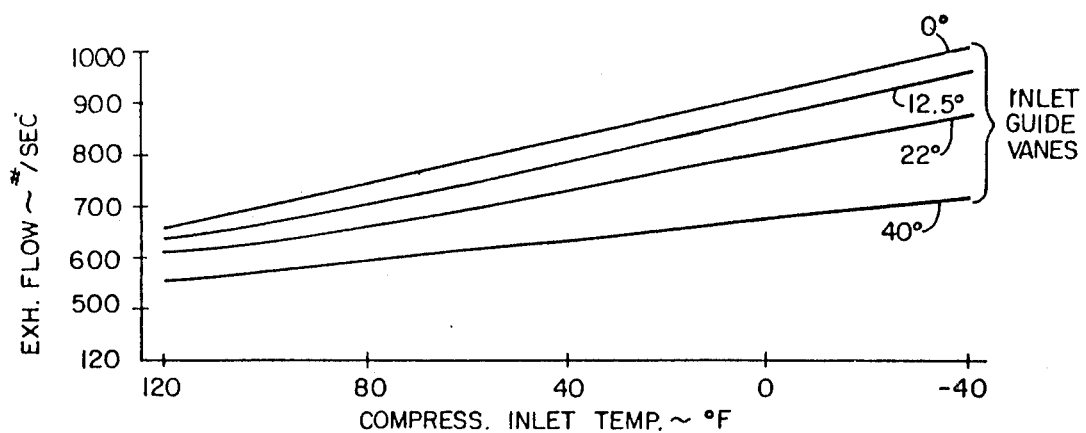
FIG. 16A graphically illustrates the effect of reduced compressor inlet temperature on gas turbine exhaust flow.

As previously noted, the design of a combined cycle power generating plant requires proper matching between an included gas turbine and its associated steam generator. One item in connection therewith which requires special attention is that of gas turbine exhaust flow. As is illustrated in FIG. 16A, for a constant setting of the inlet guide vane position, the mass flow exhausted from the gas turbine increases as the compressor inlet temperature or the ambient temperature decreases. For example, at a 0° setting of the inlet guide vanes, the mass of the exhaust flow will increase at 40° Fahrenheit from approximately 840 pounds per second to a flow of 1000 pounds per second at −40° Fahrenheit. Since the afterburner firing rate is held constant in the control scheme utilized in the previously described combined cycle plant, the increased mass flow as compressor inlet temperature decreases will result in an increased steam flow from the boiler but with a lower steam temperature. The subsequent downstream effect of such lowered steam temperature will result in the condensation of a portion of the steam and a water problem within the steam turbine.

Figure 16B:
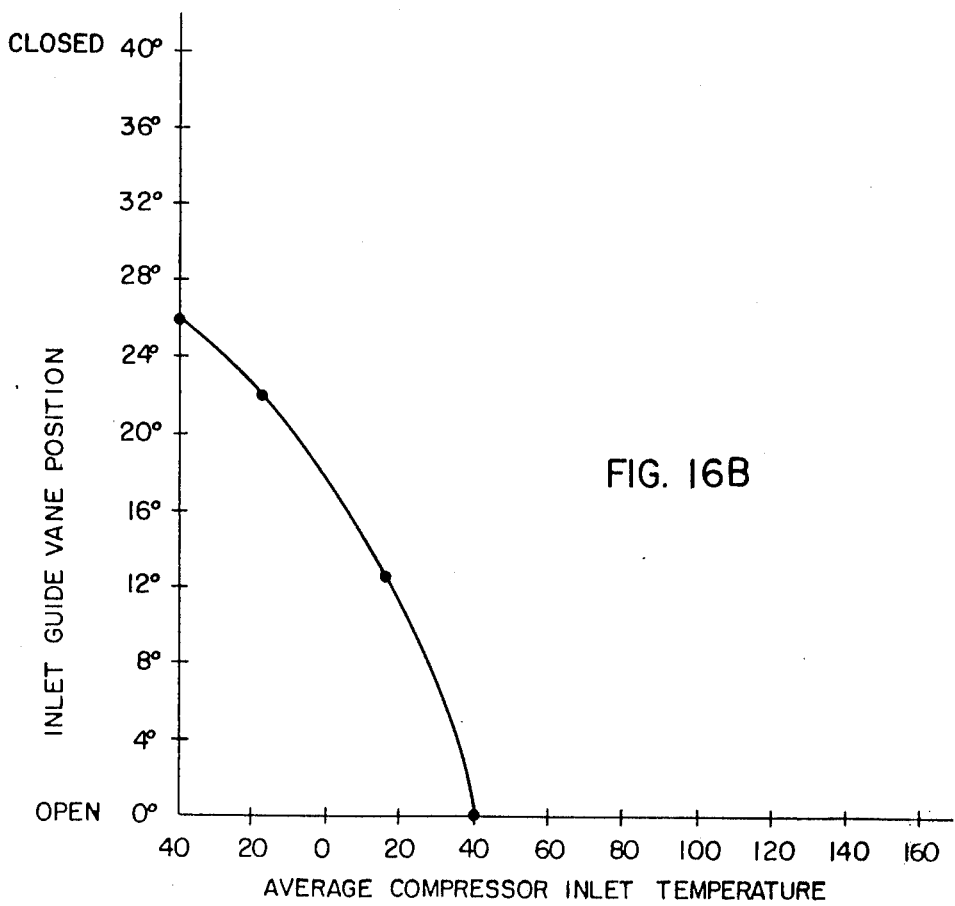
FIG. 16B graphically illustrates a preferred curve for characterizing the average compressor inlet temperature for use in the exhaust flow matcher shown in FIGS. 11 and 15A, 15B and 15C.

To avoid this potential problem, the inlet guide vane control apparatus is provided with a gas turbine exhaust flow matching block 1512G (FIG. 11) which prevents the occurrence of condensation or water problems in the steam turbine. The gas turbine exhaust flow matching block 1512G operates in the following manner. Referring again to FIGS. 15A, B & C, there is illustrated a compressor average inlet temperature sensor 1559G which forwards via line 1561G a signal indicative of the average compressor inlet temperature. This signal representative of compressor average inlet temperature is characterized in function generator 1563G in accordance with the curve shown in FIG. 16B. This curve can be approximated by a three straight line function generator or may be made linear or nonlinear depending upon the degree of accuracy desired. Once characterized by the function generator 1563G, the compressor average inlet temperature signal is forwarded to decision block 1567G. If the gas turbine speed is below 92 percent of synchronous speed, decision block 1567 passes a zero signal via line 1515G to the HI signal select block 1514G. Under conditions of less than 92 percent of synchronous speed, the Hi select block 1514G will pass the signal it receives from the interface block 1508G to the inlet guide vane positioning mechanism 215. However, once the gas turbine reaches 92 percent of synchronous speed desision block 1567G will pass an inlet guide vane characterized temperature signal via line 1515G to the HI select block 1514G. When the 92 percent speed condition or higher obtains, the HI select block 1514G will then pass whichever is the higher one of the two signals it receives to the inlet guide vane positioning mechanism 215.

Reference is made to co-pending application Ser. No. 495,731, identified above and incorporated herein be reference and in particular to sections H and I thereof, for a detailed description of the manual/automatic interface (NHC card) and the Control and Logic Chains employed in association with the inlet guide vane control described above.

K. Superheated Steam Temperature Control

As generally illustrated in FIG. 7, there is illustrated the method and apparatus for effecting superheated steam temperature control of a steam generator as particularly adapted for use in a "conbined" electric power plant. Generally, a gas temperature setpoint is derived either from a digital computer or as manually set by the operator, and is applied to the superheated steam temperature control to provide a reference against which the temperature of the gases heated by the after burner are compared, to control the afterburner gas temperature and eventually the temperature of the superheated steam.

Figure 17:
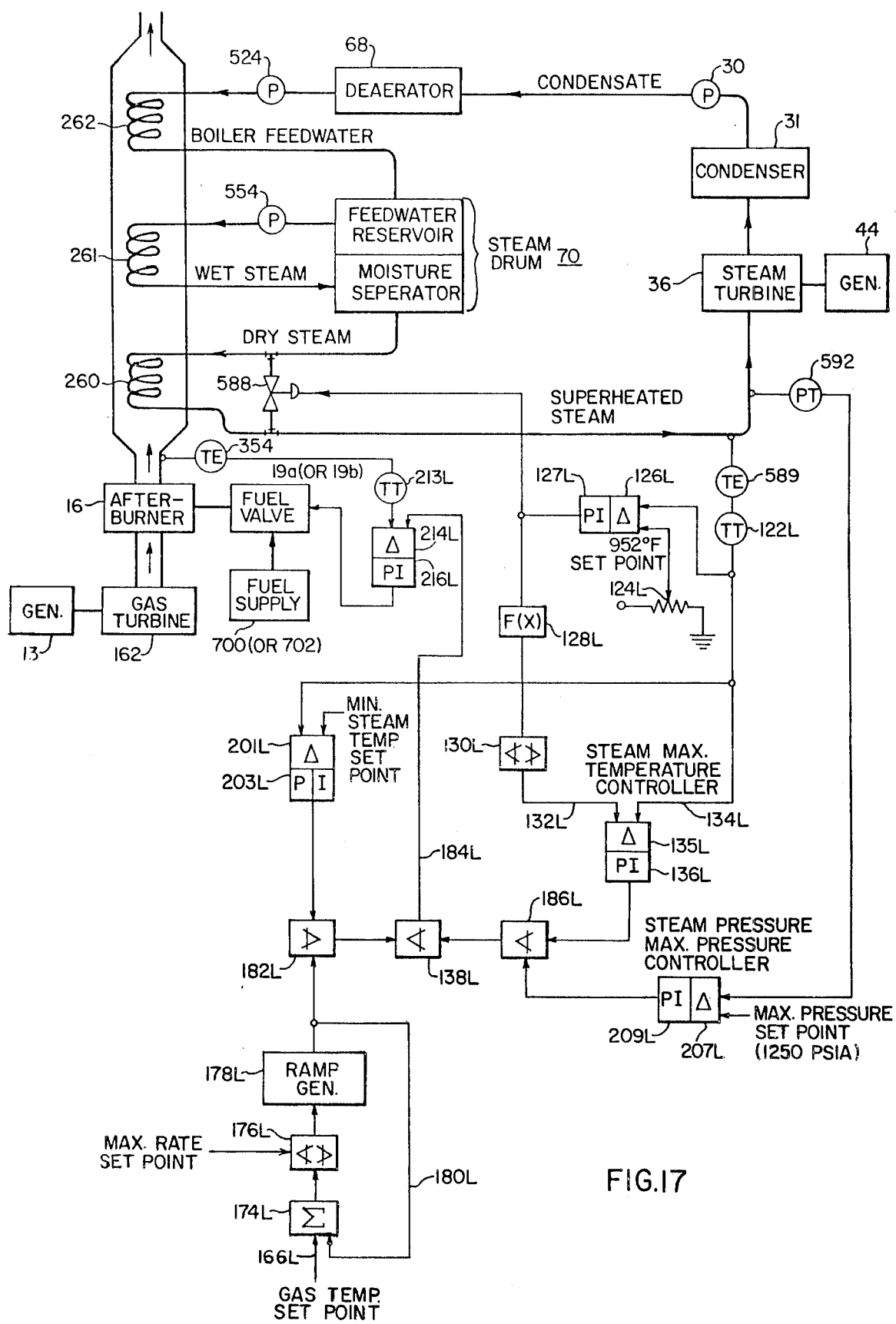
FIG. 17 is a simplified, schematic illustrating selected parts of the combined cycle electric power plant and the afterburner temperature control system therefor.

The superheated steam temperature control of this invention is particularly adapted for use with a combined cycle electric power plant as shown in FIG. 17, which includes the steam turbine 36 and the heat recovery steam generator 18 to which condensate or feedwater is supplied to be heated into steam which is returned to drive the steam turbine. The electric generator 44 is coupled to the steam turbine 36 to provide electrical power. The combined cycle electric power plant further includes the gas turbine 162, which drives the electric power generator 13. The heated exhaust gases from the gas turbine 162 pass through the afterburner 16 to the steam generator 18. The steam generator 18 includes three sets of boiler tubes, i.e. the superheater tube 260, the high pressure evaporator tube 261 and the economizer tube 262, listed in the order in which the exhaust gases of the turbine 162 pass therethrough. As shown in FIG. 7, the superheated steam as derived from the superheater tube 260 is passed to and serves to drive the steam turbine 36. Further, an afterburner 16 serves to additionally heat the exhaust gases derived from the gas turbine 162 and directed to the heat recovery steam generator 18, whereby under relatively high load conditions, turbine exhaust gases contain sufficient heat to supply the superheated steam required to meet this load.

The superheated stream temperature control operates in cooperation with the gas turbine inlet guide vane control as explained above to effectively maintain the temperature of the superheated stream as directed to the steam turbine 36 at a precise level controlled in accordance with the gas temperature setpoint. To this end, the supply of fuel to the afterburner is controlled. In particular, a fuel valve 19a (or 19b) serves to regulate the flow of fuel from a supply 700 (or 702). Further, a second control action is used whereby a portion of the steam directed to superheater tube 260 is diverted thereabout along a bypas conduit; the bypassed fluid, cooler than the fluid passing through the superheater tube 260, is combined with the superheater tube fluid in a proportion to control the temperature of the superheated steam. In particular, a superheater bypass control valve 588 is disposed within the bypass conduit to regulate the bypass fluid and therefore the temperature of the superheated steam. For example, if the temperature of the superheated steam is above a desired value, the superheater bypass control valve 588 is further opened, whereby a larger portion of fluid is bypassed and as a result, the temperature of the superheated steam is reduced.

Through the combined cycle electric power plant has been described in detail with respect to FIGS. 6A to 6F, significant portions thereof are shown in FIG. 17 as it particularly relates to the subject matter of this invention. To complete the description of the combined cycle electric power plant as it relates to this invention, the spent steam derived from the steam turbine 36 is passed to the condenser 31, whereby it is converted into condensate to be directed by the condensate pump 30 to the deaerator 68, which serves to remove air from the condensate as well as to preliminarily heat it before it is passed to the economizer tube 262. The condensate water is directed by the boiler feed pump 524 from the deaerator 22, through the economizer tube 262 and into the hot water storage section 70a of the steam druum 70. The boiler feedwater leaving the economizer tube 262 is at a temperature of approximately 550° Fahrenheit. The high pressure circulation pump 554 serves to pump the hot water from the storage section 70a into the evaporator tube 261. In the evaporator tube 261, the hot water is converted into steam, the latter being supplied through the moisture separator section 70b of the steam drum 70 at a temperature of approximately 675° Fahrenheit. The dry steam from the moisture separator section 70b then enters the superheater tube 260, wherein it is superheated to a temperature in the order of 952° Fahrenheit. This superheated steam is supplied to the steam turbine 36 for driving its associated electric generator 44. The spent steam leaving the steam turbine 36 passes into the condenser 31, which converts it into water at a temperature of approximately 100° Fahrenheit. The recirculation path from the steam turbine 36 to the heat recovery steam generator 18 and back, is now complete.

Primarily, the superheated steam temperature control, as shown in FIG. 17, operates to control the superheated steam temperature by regulating the position of the fuel valve 19a in response to a measurement of the exhaust gas turbine gases as heated by the afterburner 16. As will be explained in detail later, the temperature of the superheated steam follows that of the gas turbine exhaust gases as heated by the afterburner 16, which temperature is precisely maintained. In particular, the temperature of the exhaust gases is sensed by the temperature emitter 354 and a corresponding signal is generated and applied by a temperature transmitter 213L to a subtraction circuit 214L, whose output is applied by way of a proportional plus integral circuit 216L to control the position of the fuel valve 19a. The subtraction circuit 214L compares the gas temperature signal with the gas temperature setpoint as derived by way of conductor 184L, low-select circuit 138L, high-select circuit 182L and conductor 318L. The gas temperature setpoint is determined as a function of the load imposed upon the electric power generating system either by the digital computer or as entered manually by the operator, and is applied to a summing circuit 174L, whose output is limited by a high-low limiting circuit 176L in accordance with a predetermined maximum rate setpoint. In turn, the limited signal is applied to a ramp generator 178L, whose output increases at a rate proportional to its limited input. In turn, the output of the ramp generator 178L is applied back by way of connector 180L to the second input of the summing circuit 174L. Thus, the gas temperature setpoint is applied to the summing circuit 174L, whereby the ramp generator 178L produces a signal varying at a corresponding rate until its output is equal to that of the gas temperature setpoint, at which time the output of the summing circuit 174L goes to zero and the output of the ramp generator 178L is set according to the desired gas temperature setpoint, to be applied by conductors 318L and 184L to the subtraction circuit 214L. Further, a limit is set upon the rate at which the gas temperature setpoint and the position of the fuel valve 19a may be decreased or increased. In particular, a maximum rate setpoint is applied to the limiting circuit 176L which limits the amplitude of the summing circuit 174L output and therefore the rate at which the ramp generator 178L may increase or decrease.

As will be explained now, appropriate override signals are generated to provide the gas temperature setpoint, whereby a minimum steam temperature is maintained, and maximum steam temperature and pressure are not exceeded. In particular, the temperature emitter 589 senses the temperature of the superheated steam supplied to the steam turbine 36 and a corresponding output signal is generated by and applied by the temperature transmitter 122L to a minimum steam temperature controller comprised of a substration circuit 201L whose output is applied by a proportional plus integral circuit 203L to a high-select circuit 182L, the other input thereto being derived from the ramp generator 178L. The subtraction circuit 201L compares the steam temperature signal with a minimum steam temperature setpoint applied to other input of the subtraction circuit 201L to generate a difference signal when the temperature of the superheated steam falls below the desired minimum temperature, e.g. 700° Fahrenheit. Under that condition, the high-select circuit 182L applied to override signal generated by the minimum steam temperature controller by way of the low-select circuit 138L and the connector 184L to the subtraction circuit 214L, whereby an output from the proportional plus integral circuit 216L is developed to increase the position of the fuel valve 19a; as a result, an increased supply of fuel is directed to the afterburner and the temperatures of the exhaust gas turbine gases supplied to the steam generator 18 and of the superheated steam are increased, to maintain the superheated steam temperature above the predetermined minimum of 700° Fahrenheit.

Figure 20:
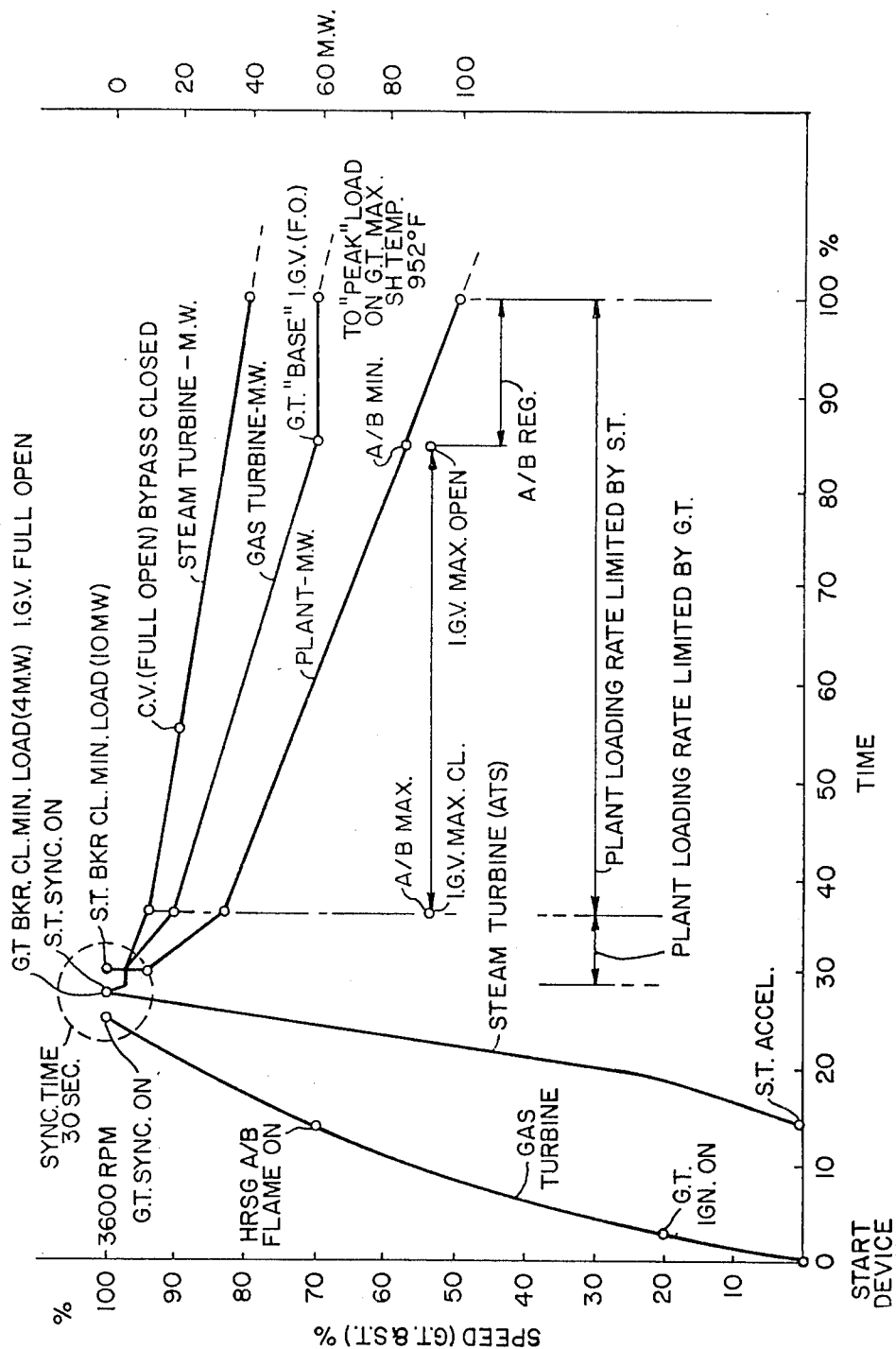
FIG. 20 shows a graph of the sequence of the plant operations.

As the load imposed upon the combined cycle electric power generating plat is increased toward its maximum load as shown in FIG. 20, the temperature of the superheated steam likewise is raised toward a maximum limit, e.g. 952° Fahrenheit. To maintain the integrity of the fluid circulation system and in particular the heat recovery steam generator 18, the steam turbine 36 and its condenser 31, the temperature of the superheated steam must not exceed this limit. To ensure that the superheated steam temperature does not exceed this limit, a superheated steam maximum temperature controlller is provided for first regulating the position of the superheated bypass valve 588, and secondly, for developing a trim signal from the function generator 128L to reduce the gas temperature setpoint and applied to the subtraction circuit 214L. More specifically as seen in FIG. 17, the superheated steam maximum temperature controller employs two control loops to achieve the desired control of the superheated steam temperature, the first being used to control the desired opening of the superheater bypass valve 588 and the second to develop a trim signal to decrease the opening of the fuel valve 19a.

Both control loops utilize a temperature sensor 589 for sensing the superheated steam temperature and a temperture transmitter 122L or producing an electrical signal proportional to the steam temperature. The first control loop applies the transmitter output to a bypass valve controller comprised of a substraction circuit 126L and a proportional plus integral block 127L. In particular, the subtraction circuit 126L takes the difference between the measured temperature and a desired value or setpoint of steam temperature, e.g. to 952° Fahrenheit, as set by a signal source 124L illustratively taking the form of a voltage divider. Generally, the proportional plus integral block 127L operates as a differential amplifier with integrating action.

The action of the first or bypass valve control loop is of an inverse nature. If the superheated steam temperature is greater than the setpoint, e.g. 952° Fahrenheit, then a difference signal is developed by the subtraction circuit 126L to be supplied to the superheater bypass valve 588 to increase the degree of opening thereof. As a result, the portion of the cooler bypassed steam is increased with respect to that of the hotter, superheated steam and therefore, the steam temperature is reduced to bring it back toward the setpoint. Conversely, if the steam temperature is less than the setpoint, the subtraction circuit 126L provides an output to decrease the degree of opening of the superheater bypass valve 588, whereby more steam is permitted to pass through the superheater tube 260, thus increasing the temperature of the steam supplied to the steam turbine 36. The first or bypass valve control loop is the primary control loop in that the second control loop relating to the opening and closing of the fuel valve 19a, begins to function only after the effectiveness of opening and closing the superheater bypass valve 588 is lost. In particular, as the superheated steam temperature continues to rise, the output of the first control loop as derived from the proportional plus integral function block 127L drives the superheater bypass valve 588 towards its maximum position. At this point, it still may be necessary to effect some additional control action to reduce the temperature of the superheated steam. In particular, the second control loop begins to function, as now will be described with respect to FIG. 17.

The second temperature control loop includes a subtraction circuit 135L and a proportional plus integral block 136L. The output of the proportional plus integral function block 136L is supplied by way of a low-select circuit 138L to set the position of the fuel valve 19a. Further, the output of the temperature transmitter 122L indicative of the superheated steam temperature is supplied along connector 134L to one input of the subtraction circuit 135L. The other input to the subtraction circuit 135L is a signal indicative of the variably-controlled setpoint as supplied thereto along connector 132L. In particular, the output of the proportional plus integral function block 127L, indicative of the desired position of the superheater bypass valve 588, is supplied by way of a function generator 128L and a high-low limiter circuit 130L.

Figure 18:
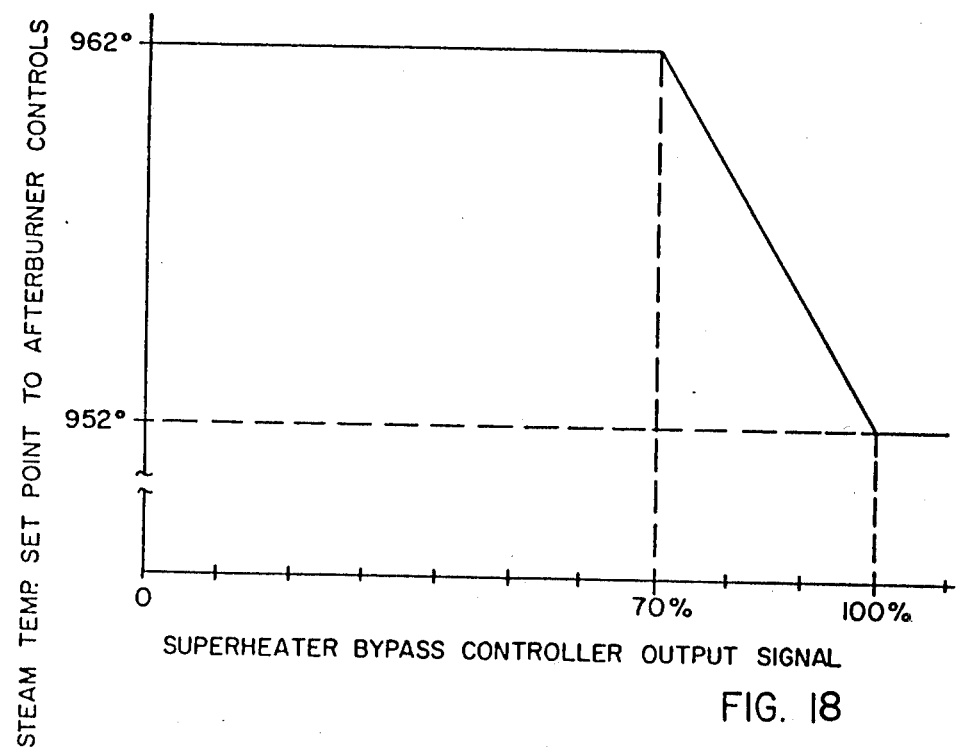
FIG. 18 is a graph illustrating the output of the function generator coordinating the first and second control loops, as generally shown in FIG. 17.

Significantly, this setpoint is not fixed, but is variable in accordance with the operation of the superheater bypass valve 588. The function generator 128L produces an output as shown in FIG. 18, which decreases in a linear manner as the amplitude of the output signal from the proportional plus integral function block 127L increases. The high-low limiter circuit 130L limits the signal from the functional generator 128L so that the resultant signal supplied to the subtraction circuit 135L cannot fall below a first value corresponding to the setpoint of the first control loop, e.g. 952° Fahrenheit, or exceed a second value corresponding to the setpoint of the second control loop, e.g. 962° Fahrenheit. The function generator 128L and the high-low limiter 130L combine to produce an output signal as graphically shown in FIG. 18. The horizontal axis of FIG. 18 represents the output signal amplitude as derived from the proportional plus integral block 127L, representing the position of the superheater bypass valve 588, as applied to the input of the function generator 128L, whereas the vertical axis represents the variable setpoint signal supplied to the input of the subtraction circuit 135L. As graphically demonstrated in FIG. 18, a variable setpoint is supplied to the second control loop as a function of the opening of the superheater bypass valve 588. In particular, the setpoint for the second control loop controlling the position of the fuel valve 19a is maintained substantially constant as the superheater bypass valve 588 is opened from its closed position until it achieves 70% open position, at a level higher than the setpoint at which the first control loop is set. For example, the setpoint of the first control loop is set at an illustrative value of 952° Fahrenheit, whereas for the described range, the setpoint of the second control loop is set at 962° Fahrenheit. When the superheater bypass control valve 588 has reached an opening in the order of 70% of its fully opened position, it tends to lose its effectiveness to decrease the superheated steam temperature; at that point as shown in FIG. 11, the setpoint as applied to the second control loop is decreased from a relatively high value, e.g. 962° Fahrenheit, toward a second, lower value, e.g. 952° Fahrenheit, i.e. the value of the first setpoint as imposed upon the first control loop. The relationships of the setpoints is significant in that if both control loops use the same setpoint, the total control system would "hunt" in an oscillating manner. On the other hand, if the setpoint of the second control loop controlling the afterbuner fuel supply was set lower than that of the superheater bypass valve, the bypass valve would never open. Thus, by choosing the setpoints in the manner as described with respect to FIG. 18, the steam generator 36 is capable of producing a maximum steam flow at a maximum temperature without risk of overtemperature operation.

As shown in FIG. 17, the second temperature control loop includes the subtraction circuit 135L and the proportional plus integral function block 136L, the output of which is applied to the low-select circuit 138L. The gas temperature setpoint of load demand signal is applied to the other input of the low-select circuit 138L from the ramp generator 178L, as explained above. The low-select circuit 138L passes the lesser of the two input signals to the fuel valve 19a. Thus the load demand signal as determined by the operator in a MANUAL mode of operation or by the digital computer in an AUTOMATIC mode of operation, controls the operation of the fuel valve 19a, when the temperature of the superheated stream is less than the variable setpoint value, e.g. 952° Fahrenheit, as determined by the output of the subtraction circuit 135L of the second control loop. Thus, if the superheated steam temperature is less than the variable value (from 962° Fahrenheit to 952° Fahrenheit), the ramp generator output controls the operation of the fuel valve 19a and the superheated steam maximum temperature controller is inoperative. However, when the superheated steam temperature approaches a critical value, i.e. the variable setpoint, the second control loop is rendered effective to control the operation of the fuel valve 19a to hold the steam temperature at the setpoint value as determined by the output of the proportional plus integral circuit 136L.

The operation of the second or afterburner control loop is inverse in that if the superheated steam temperature becomes greater than the variable setpoint, then the output of the proportional plus integral function block 136L is reduced in order to decrease the degree of opening of the fuel valve 19a and to correspondingly reduce the amount of heat provided by the afterburner 16. This control action brings the superheated steam temperature back down to the setpoint value as established by the second control loop. Conversely, if the steam temperature is too low, the degree of opening of the fuel valve 19a is increased to cause the afterburner 16 to supply even a greater amount of heat to the exhaust gases of the gas turbine 162 passed to the steam generator 18.

As shown in FIG. 17, a further controller is provided for preventing the pressure of the superheated steam from exceeding a predetermined point, e.g. 1250 PSIA. In particular, the superheated steam maximum pressure controller includes a pressure transmitter 592 for sensing and providing an output signal indicative of the pressure of the superheated steam, to be applied to one input of a subtraction circuit 207L the other input being provided according to the maximum pressure setpoint. The difference output therefrom is applied by way of a proportional plus integral circuit 209L to one input of a low-select circuit 186L. The other input to the low-select circuit 186L is derived from the proportional plus integral circuit 136L of the superheated steam maximum temperature controller. The low-select circuit 186L applies the lower of its two input signals by way of the low-select circuit 138L and the connector 184L to the subtraction circuit 214L to thereby control the position of the fuel valve 19a and therefore the exhaust gas turbine gas temperature. This, if the sensed pressure of the superheated steam exceeds a predetermined maximum, an override signal is developed and applied to the subtraction circuit 214L whereby the position of the fuel valve 19a and therefore the temperature of the gas at the inlet of the steam generator 18, herein referred to as the gas turbine exhaust gas temperature, is reduced.

Figure 19:
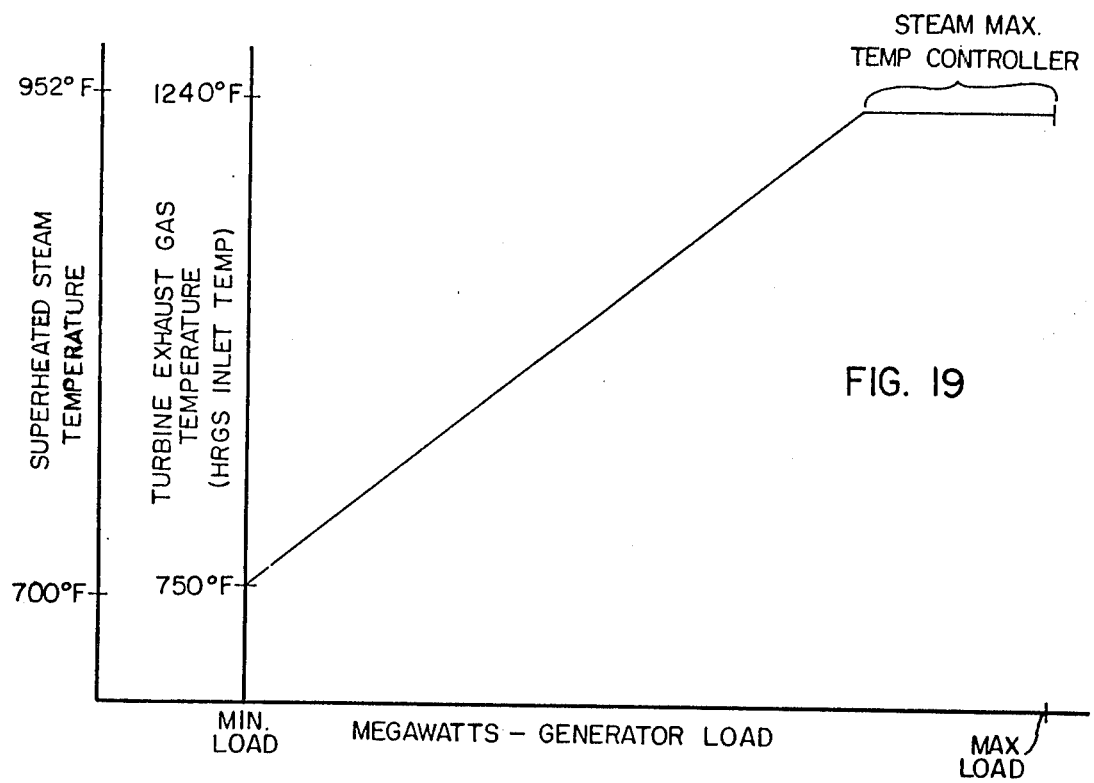
FIG. 19 is a graph illustrating the control of the superheated steam temperature as a function of generator load.

The operation of the superheated steam temperature control as shown in FIG. 17, will be explained with respect to the graph of FIG. 19. In FIG. 19, the superheated steam temperature and the turbine exhaust gas temperature (note correspondence) are plotted as a function of the generator load in megawatts as placed upon the combined cycle electric power plant. Initially at minimum load, the temperature of the superheated steam must not be below a predetermined minimum, e.g. 700° Fahrenheit. To this end, the steam minimum temperature controller is provided for sensing the temperature of the superheated steam and for generating an override signal when the temperature is less than the predetermined minimum to be applied by the high-select circuit 182L, the low-select circuit 138L and the connector 184L to the subtraction circuit 214L, whereby the position of the fuel valve 19a is increased. As a result, more fuel is supplied to the afterburner 16 to increase the temperature of the gas turbine exhaust gases, thus raising the temperature of the superheated steam.

As indicated in FIG. 19, there is a close correspondence between the temperature of the gs turbine exhaust gases and the superheated steam temperature. Thus, the control of this invention operates to control precisely the temperature of the turbine exhaust gases and therefore the temperature of the superheated steam. Significantly improved control is provided in this manner, i.e. the temperature of the superheated steam is maintained within extremely closed tolerances, whereby improved power generation efficiency is achieved. For example, by this invention, a 0.5% regulation of the superheated steam temperature may be achieved whereby the power output of the combined cycle electric power plant may be maintained within reduced limits of the desired output as determined by the applied gas temperature setpoint. In comparison for a steady-state load demand, only a 1% regulation may be achieved by prior art temperature control, whereby there may be a corresponding variation in the plant power output. For transient conditions whereby the load imposed upon the combined cycle electric power generating plant and the gas temperature setpoint is correspondingly varied, the superheated steam temperature control of this invention maintains both the superheated steam temperature and therefore the power output within a range of approximately 0.5%, whereas the prior art temperature regulators experience a corresponding variation in the power output. This precise temperature control is provided by measuring the temperature of the gas turbine exhaust gases and in comparing same with a gas temperature setpoint to adjust the flow of fuel to the afterburner 16. In this manner, the gas temperature setpoint may be varied from a minimum to a maximum load condition to achieve a nearly linear increase in the resulting temperatures of the gas turbine exhaust gases and the superheated steam.

As the gas temperature setpoint and therefore the generated load increases, the temperature of the superheated steam reaches a maximum limit, at which time the superheated steam maximum temperature controller begins to operate to generate an override signal whereby the control of the fuel valve 19a is taken away from the computer or the manually set value as derived from the output of the ramp generator 178L and is assumed by the superheated steam maximum temperature controller. In particular, the output of the superheated maximum steam temperature controller is selected and applied by the low-select circuit 138L to the subtraction circuit 214L to decrease the position of the fuel valve 19a. Initially when the superheated steam temperature approaches its predetermined limit, e.g. 952° Fahrenheit, the first or bypass valve control loop responds to the superheated steam temperature to increase the position of the superheated bypass valve 588 to decrease the temperature of the superheated steam. As the effectiveness of the first control loop and in particular, the bypass valve 588, to limit the superheated temperature, decreases, the second control loop is rendered effective to effect a different action, e.g. to close the afterburner fuel valve 19a. A signal is derived from the first control loop and in particular from the proportional plus integral controller 127L and is used to bias or to vary the setpoint of the second control loop in a manner that the second or afterburner control loop is increasingly made effective, i.e. its setpoint is gradually reduced and is made equal to the first or bypass valve control loop setpoint, i.e. 952° Fahrenheit. Thus, an override signal is generated by the subtraction circuit 135L and the proportional plus integral circuit 136L to be applied by way of the low-select circuit 138L and the connector 184L to the subtraction circuit 214L, whereby the position of the fuel valve 19a and therefore the fuel supply to the afterburner 16 is reduced. As shown in FIG. 19, the temperature of the superheated steam is increased toward its maximum limit, at which time the superheated steam maximum temperature controller becomes effective to limit the superheated steam temperature as the generator load increases toward its maximum load. As explained above, a further override signal is developed by the steam maximum pressure controller to prevent the superheated steam pressure from exceeding a maximum value, e.g. 1250 PSIA.

Reference is made to the above identified application Ser. No. 495,723, incorporated herein by reference, for a further more detailed description of the functional operation as well as the detailed circuitry of the superheated steam temperature control described above.

L. Coordinated Operation of the Inlet Guide Vane Control and an Afterburner

Initially, as shown in FIG. 20, the gas turbine is rotated on gear and by a starting motor at increasing speeds up to approximately 20% of full speed, at which time the gas turbine ignition is turned on. The fuel inlet valves are controlled to introduce increasing amounts of fuel to the gas turbine burners whereby the speed of the gas turbine is increased. At a speed corresponding to approximately 70% of the synchronizing or full speed of the gas turbine, the afterburner 16 is lit. Thereafter, the speed of the gas turbine is increased by introducing an increasing amount of fuel to its burners whereby its speed is brought up to snychronous or full speed, e.g. 3600 rpm.

An object of this invention is to bring the combined cycle power plant up to full load in a minimum time period, e.g. 1 hour. Initially, the combined cycle electric power plant is operated at a hot standby condition and the two gas turbines are then started. Shortly thereafter, the steam turbine is started as the gas turbines continue to be accelerated toward synchronous speed. Within a time frame of several minutes all the generators normally reach a speed near the synchronous value and the synchronizer system as explained in detail as to its logic and functional operation in the above-identified application Ser. No. 495,728, entitled "Snychronization System for a Combined Cycle Electric Power Plant", sequentially synchronizes the generators, closes the generator breakers and minimally loads the turbines through the speed/load controls, and then the turbine speed/load controls proceed to load the gas and steam turbines to produce the selected plant load up to a maximum value. The entire plant sequence normally takes about 1 hour, i.e. the plant is able to move from hot standby to rated output of about 260 megawatts in 1 hour. If the plant configuration is other than normal, for example if one of the turbines is down, the automatic plant sequence is made as required by the plant configuration change. If the operator selects any mode other than the coordinated control mode, the plant synchronization sequencing is placed under operator direction for all plant configurations.

In order to minimize startup time, the operation of the steam turbine is begun while the gas turbine is being brought to its cynchronous speed. First, as explained above, the afterburner is lit and with the inlet guide vanes positioned as required for surge protection the afterburner fuel valves are opened fully to maximize the rate at which the exhaust gases passing from the gas turbine to the heat recovery steam generator, are heated, thereby tending to maximize the rate of heating of the steam passing to the steam turbine. At the time the afterburner is lit, the temperature of the exhaust gases leaving the gas turbine may be about 450° Fahrenheit. One of the preliminary conditions for operation of the steam turbine is that the steam passing thereto has a minimum temperature in excess of 700° Fahrenheit. As explained above with regard to FIG. 17, a minimum temperature steam temperature controller is provided to assure that this condition is met during the operation of the steam generator. In particular, the temperature of the steam is measured and compared with a 700° Fahrenheit minimum steam temperature set point. If this condition is not met, the minimum steam temperature set point controller serves to open the fuel valve for controlling the supply of fuel to the afterburner. Thus, in the initial stage of operation, a maximum rate of heating is achieved from the afterburner.

Once minimum steam temperature is reached the speed of the steam turbine is increased until it reaches synchronous speed, e.g. 3600 rpm. At this time, the gas turbines, which have been brought previously to synchronous speed, are placed on-line, i.e. the gas turbine circuit breakers are closed and a minimum load of 4 megawatts is placed on each gas turbine. After a brief period, the steam turbine circuit breakers are closed and a minimum load such as 10 megawatts is placed upon the steam turbine. After either or both gas turbine generators have reached minimum load, the synchronizer sequencer initiates the synchronizing sequence for the steam turbine generator. Once the steam turbine generator is synchronized, the load reference is ramped to the desired value.

At minimum load on the gas turbine, temperature of the exhaust gas derived from the gas turbine is about 450° Fahrenheit, with the remaining amount of heat to be supplied by the afterburners. At this time, the loading as derived from the afterburner control 112C and the gas turbine control 104C, as shown in FIG. 9, is set at maximum limit to increase, respectively, the temperature of the exhaust gases at a rate of 35° per minute and the steam temperature at a rate of 7.25° per minute. These rates are, respectively, the maximum safe rates for firing the gas turbine and the afterburner in the illustrative embodiment of the combined cycle electric power plant described. In a period of approximately 15 minutes, the temperature of the gas turbine exhaust gas is raised to approximately 750° Fahrenheit, whereby the temperature of the steam provided by the heat recovery steam generator is about 700° Fahrenheit, the minimum at which the steam turbine may begin to be operated. At this point, the speed of the steam turbine is slowly increased until synchronization speed is reached, at which time the steam turbine circuit breaker is closed and a minimum load placed thereon.

As shown in FIG. 20, after the gas and steam turbines have synchronized, the plant loading is gradually increased until the maximum load is achieved from the plant, i.e. a distributed loading from each of the generators associated with the steam and gas turbines. A temperature and fuel flow control is provided to operate in conjunction with pushbutton controls on an operator panel, and a digital reference generator is provided to generate a signal equal to a reference megawatt demand or equal to a megawatt value permitted by gas turbine temperature control under base or peak load operation. Initially, during a first time period as the plant loading is increased, the gas turbine serves to limit the rate at which the megawatt output may be increased, until the afterburners are reset at a minimum heating rate, i.e. minimum fuel flow, and the steam temperature is determined by gas turbine exhaust temperature. Thereafter, the plant loading is limited by thermal stress limits of the steam turbine until a point is reached at which the base load of the gas turbine is achieved. If further power output is desired, this is achieved by regulating the afterburner to transfer more thermal energy to the steam turbine, thus increasing the load it may accept. In initially placing a load on the steam turbine, a steam turbine load control operates through a corresponding valve control to operate steam bypass and steam turbine inlet valves until the turbine is loaded to the point where the bypass valves are closed and the turbine inlet valves are wide open with the turbine operating in a turbine follow mode. Suitable backup and protective control action is available during this automatic mode of operation.

In the first period, the afterburners are initially turned fully on and the inlet guide vanes are initially positioned as required for start up surge protection whereby the temperature of the exhaust gases derived from the gas turbine are heated from a temperature of 750° to 940° Fahrenheit at the afterburner outlet providing a corresponding increase in the steam temperature of from 700° to 800° Fahrenheit. When this point is reached, the afterburner is set to a minimum firing level and the inlet guide vane is disposed at its maximum closed position.

As plant loading is continued to be increased during a second interval, the afterburner fuel valve is maintained at its minimum firing level and the loading on both the gas and steam turbines is increased by regulating the gas turbine fuel until the gas turbine exhaust temperature is 60° below base limit temperature, at which time the inlet guide vanes will have moved from a maximum-closed to a maximum-open position, whereby the flow of air is increased. At the same time, the gas turbine fuel valves are operated to increase load toward the base valve. The inlet guide vanes are positioned as a function of gas turbine blade path temperature such that 60° Fahrenheit below base temperature equals closed and base temperature equals fully open, as explained above with respect to FIG. 14. During this period, the afterburner supplies a minimum additional heating and the increased generation from the steam turbine is dependent upon the increase in temperature of exhaust gases to the heat recovery steam generator. The minimum afterburner firing rate is controlled in a manner as shown in FIG. 17, wherein the temperature setpoint or load as applied via the summing block 174L, the selectors 182L and 138L, the difference circuit 214L and the proportional plus integral controller 216L to set the afterburner fuel valve 19, is controlled in such a manner that the fuel valve 19 remains at its minimum position. In particular, the gas temperature setpoint as applied to the afterburner fuel valve controller is maintained at a value not to exceed the temperature of the exhaust gases directed to the afterburner.

Figure 21:
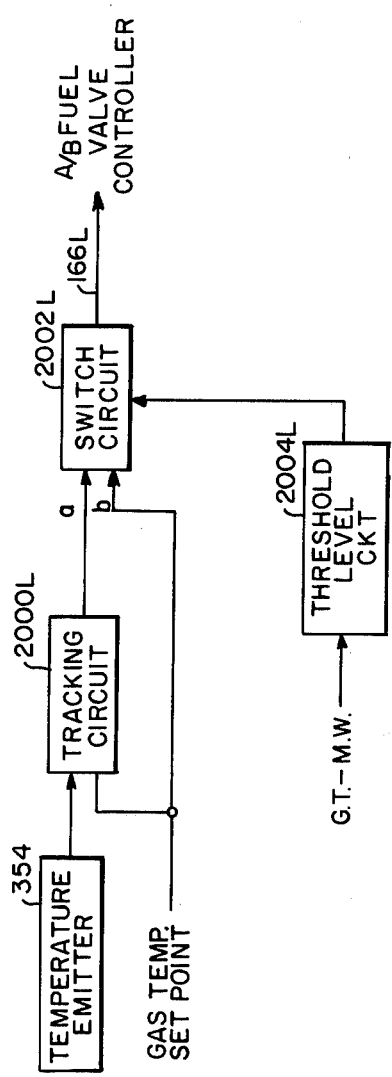
FIG. 21 illustrates by way of a circuit diagram the operation of a tracking circuit to limit the gas temperature set point as applied to the afterburner temperature control system of FIG. 17.

As shown in FIG. 21, a signal indicative of the temperature of the exhaust gases exited from the gas turbine 162 and supplementarily heated by the afterburner 16, is derived from the temperature emitter 354 disposed as generally shown in FIG. 17. The exhaust gas temperature signal is provided to a first input of a tracking circuit 2000L, whereas the gas temperature set point indicative of the load to be placed upon the steam turbine 36 is derived from the afterburner control 112C as generally shown in FIG. 9. The tracking circuit 2000L operates to compare the gas temperature setpoint with the measured exhaust gas temperature signal and limits the magnitude of the gas temperture setpoint so as not to exceed that of the sensed temperature. In a sense, the gas temperature setpoint is considered to track the sensed temperature, never exceeding its value, and a corresponding gas temperature setpoint so limited is applied via a switching circuit 2002L to the afterburner fuel valve controller and in particular the summing circuit 174L (FIG. 17) to set the position of the fuel valve 19 in accordance therewith. In this manner, the fuel valve is maintained at a minimum setting during the second period of increasing plant loading. In particular, the difference circuit 214L provides a difference signal between the measured gas temperature and the tracked setpoint, and the proportional plus integral circuit 216L provides an output forcing the fuel valve 19 toward its minimum position. The slaving of the gas temperature setpoint for the afterburner fuel valve is continued until the inlet guide vane is disposed at its maximum open position and the gas turbine is loaded at its base rate.

At the point at which the inlet guide vane has achieved its maximum opening, the gas turbine is disposed at its base loading and normally, no further power is obtained from the gas turbine. Additional loading, if desired, is obtained from the steam turbine by additionally heating the gas turbine exhaust gases by opening the afterburner fuel valve from its minimum position and regulating it. During this third period, the gas temperature setpoint is no longer slaved to the measured temperature of the gas turbine exhaust gases, but is increased at a rate up to a maximum of 7.5° per minute whereby the exhaust gases derived from the gas turbine are heated from the gas turbine base temperature of 940° Fahrenheit to a temperature of about 1240° Fahrenheit, whereby a corresponding increase in steam temperature is effected from 840° to 952° Fahrenheit. At the maximum rate, this process of further steam turbine loading may be achieved in about 15 minutes. The manner of afterburner regulation is achieved by increasing the gas temperature setpoint in ramp fashion, whereby the fuel valve is set as by the afterburner controller as shown in FIG. 17 to follow the increasing gas temperature setpoint.

As shown in FIG. 21, the megawatt output of the generator 13 associated with the gas turbine 162 is applied to a threshold level circuit 2004L which provides an output when the power output of the generator 13 exceeds the level corresponding to its base load. This output in turn actuates the switching circuit 2002L to disconnect the output of the tracking circuit 2000L applied to the input $a$ and in turn, to apply the gas temperature setpoint applied to input $b$, via the conductor 166L to the afterburner fuel valve controller. In this manner, the increasing gas temperature setpoint, unlimited by the tracking circuit 2000L, is applied to the afterburner controller to increase the firing rate of the afterburner 16 and in particular to increase the steam flow and temperature and thus the loading that may be placed upon the steam turbine 36. Maximum steam pressure and temperature control are provided as shown in FIG. 17, whereby corresponding limits are not exceeded, as explained above. During this third period, the further heating of the gases is achieved by the afterburner 16 as the normal limits of heat transfer from the gas turbine have been reached. After maximum afterburner firing, peak plant loading is achieved by raising the gas turbines from base load to peak load operation as shown by the dotted lines in FIG. 20.

Thus, there has been shown a manner of coordinated control wherein the inlet guide vanes are operated to achieve power regulation by positioning the inlet guide vanes as a function of gas turbine, exhaust gas temperature, while increasing the air flow. In conjunction with this control, the afterburners are initially controlled to achieve a minimum level of steam temperature and further control is exercised to achieve further power generation from the steam turbine by increasing the temperature of the exhaust gases derived from the turbine to be supplied to the heat recovery steam generator. At this higher level of power generation, maximum limits of temperature and pressure are imposed by the afterburner controller on the temperature and pressure of the steam supplied to the steam turbine. This process is achieved in a relatively small period of time; for example, the gas and steam turbines may be successively brought to synchronization in a total period of approximately one-half hour, whereas plant loading by regulation of the inlet guide vanes may be achieved in approximately 15 minutes, and further loading by afterburner fuel valve regulation may be achieved in an additional 15 minutes.

What is claimed is:

1. A load control system for a combined cycle electric power plant including a gas turbine having an exit through which heated exhaust gases pass, a variable inlet guide vane assembly for controlling the flow of air to said gas turbine and actuating means therefor, means for generating steam coupled to said gas turbine exit for transferring heat from the exhaust gases to a fluid passing through said steam generating means, a steam turbine coupled to said steam generating means and driven by the steam by the steam supplied thereby, means for generating electric power by the driving power of each of said turbines, an afterburner for supplying additional heat to the exhaust gases passing from said gas turbine to said steam generating means, and valve means for controlling the fuel flow to said afterburner, said load control system comprising means for controlling the fuel flow to said gas turbine in response to inputs including a plant load demand to provide for plant load changes between gas turbine minimum load and gas turbine base load at a relatively fast rate limited by gas turbine limitations until minimum afterburner firing occurs and at a slower rate limited by steam turbine limitations after minimum afterburner firing, means for controlling the position of said afterburner fuel valve means to provide steam under predetermined temperature conditions as the gas turbine loading is increased at the gas turbine limited rate between the gas turbine minumum load and a first higher gas turbine load at and above which minimum afterburner firing occurs, means for controlling the position of the gas turbine inlet guide vanes, and means for controlling the flow of steam to said steam turbine in a follow mode.

2. A load control as set forth in claim 1 wherein said inlet guide vane controlling means provides reduced gas flow by relatively reduced opening of the vanes over a gas turbine load range between a second gas turbine operating level value and a third gas turbine load value, said second operating level value being lower than said first load value and said third load value being between said second level value and the gas turbine base load value.

3. A load control as set forth in claim 1 wherein said inlet guide vane controlling means provides increased gas flow by relatively increased opening of the vanes above the third load value and at the gas turbine base load value.

4. A load control as set forth in claim 2 wherein said second operating level is post-synchronization operating level which is a load level higher than the minimum turbine load level.

5. A load control as set forth in claim 1 wherein said inlet guide vane controlling means is operative to hold said inlet guide vanes fully open when gas turbine base load is needed and said afterburner control means is further operative in response to load demand to control afterburner fuel and plant load after gas turbine base load is reached.

6. A load control as set forth in claim 5 wherein said gas turbine fuel flow controlling means drives the gas turbine toward peak load in response to increasing plant load demand after said afterburner fuel valve controlling means reaches maximum firing level.

7. A load control as set forth in claim 6 wherein said afterburner fuel valve controlling means includes means for sensing generated steam temperature and a maximum steam temperature control to provide for afterburner fuel cutback if the steam temperature reaches the maximum value.

8. A load control as set forth in claim 1 wherein means are provided for operating said afterburner fuel valve controlling means at the maximum firing level at least until gas turbine synchronization.

9. A load control as set forth in claim 1 wherein means are provided for sensing boiler entry gas temperature, and said afterburner controlling means responds to said gas temperature sensing means and a gas temperature setpoint based on plant load demand.

10. A load control as set forth in claim 9 wherein means are provided for holding the afterburner at a minimum firing level after the boiler inlet gas temperature has increased to the point where said afterburner controlling means drops the afterburner fuel to the minimum value, and means are provided for tracking the gas temperature setpoint to the actual gas temperature during minimum afterburner fuel operation.

11. A load control as set forth in claim 9 wherein means are provided for holding the afterburner at a maximum firing level at least until the boiler entry gas temperature rises to the point where the steam temperature reaches a predetermined minimum value.

12. A load control as set forth in claim 11 wherein said afterburner fuel controlling means progressively cuts back on the afterburner firing after the boiler entry gas temperature rises above the value needed to supply steam with a temperature above the minimum steam temperature value.

13. A load control as set forth in claim 9 wherein means are provided for operating said afterburner controlling means and said steam generating means to prevent the steam flowing to the turbine from exceeding a predetermined maximum value.

14. A load control as set forth in claim 9 wherein means are provided for increasing the gas temperature setpoint after the gas turbine has reached base load so as to increase afterburner firing and provide further steam turbine loading.

* * * * *